(12) United States Patent
Kibler et al.

(10) Patent No.: US 10,913,383 B2
(45) Date of Patent: Feb. 9, 2021

(54) METHOD OF DECREASING STRESS AND DEFORMATION IN A BULK TANK

(71) Applicant: MAC TRAILER MANUFACTURING, INC., Alliance, OH (US)

(72) Inventors: Scott A. Kibler, Kensington, OH (US); Allen Gordon, Canfield, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 180 days.

(21) Appl. No.: 15/979,565

(22) Filed: May 15, 2018

(65) Prior Publication Data

US 2019/0300297 A1 Oct. 3, 2019

Related U.S. Application Data

(60) Provisional application No. 62/648,694, filed on Mar. 27, 2018.

(51) Int. Cl.

| B60P 3/22 | (2006.01) |
|---|---|
| B60P 3/24 | (2006.01) |
| B60P 1/56 | (2006.01) |
| B65D 88/54 | (2006.01) |
| B65G 67/04 | (2006.01) |
| B65G 67/24 | (2006.01) |

(52) U.S. Cl.
CPC ............... *B60P 3/2245* (2013.01); *B60P 1/56* (2013.01); *B60P 3/221* (2013.01); *B60P 3/225* (2013.01); *B60P 3/24* (2013.01); *B60P 3/243* (2013.01); *B65D 88/548* (2013.01); *B65G 67/04* (2013.01); *B65G 67/24* (2013.01); *B60P 3/22* (2013.01); *B60P 3/2205* (2013.01); *B60P 3/2265* (2013.01); *B65G 2201/04* (2013.01)

(58) Field of Classification Search
CPC ......... B60P 3/2245; B60P 3/221; B60P 3/225; B60P 3/24; B60P 3/243; B60P 3/22; B60P 3/2265; B60P 1/56; B65D 88/548; B65G 67/04; B65G 67/24; B65G 2201/04
See application file for complete search history.

(56) References Cited

U.S. PATENT DOCUMENTS

| 1,718,507 A | 6/1929 | Wenzel et al. |
|---|---|---|
| D90,896 S | 10/1933 | Perkins et al. |
| D93,190 S | 8/1934 | Thwaits |

(Continued)

*Primary Examiner* — Saul Rodriguez
*Assistant Examiner* — Ashley K Romano
(74) *Attorney, Agent, or Firm* — Sand, Sebolt & Wernow Co., LPA

(57) ABSTRACT

A dry bulk tank and a method of carrying a load and discharging a load therefrom. The dry bulk tank includes a tank assembly having a first wall that bounds and defines a first compartment for carrying a load therein and a second wall spaced outwardly from at least a portion of the first wall; wherein a second compartment is defined between the first wall and the second wall. The tank assembly includes an air piping system that is selectively actuated to place the first compartment and the second compartment under substantially similar or substantially equal air pressure. In one example the air piping system pumps air into the first compartment and the second compartment. In another example the air piping system evacuates air from the first and second compartments.

20 Claims, 24 Drawing Sheets

(56) References Cited

U.S. PATENT DOCUMENTS

| | | | |
|---|---|---|---|
| D94,790 S | 3/1935 | Thwaits | |
| 2,185,030 A | 12/1939 | Lockwood | |
| 2,460,159 A | 1/1949 | White | |
| 2,508,762 A | 5/1950 | Lapple | |
| 2,595,743 A | 5/1952 | Young | |
| 2,616,758 A | 11/1952 | Meyers | |
| D170,969 S | 12/1953 | Clough | |
| 2,703,607 A | 3/1955 | Simmonds | |
| 2,715,548 A | 8/1955 | Fish | |
| 2,848,281 A | 8/1958 | Avard | |
| 2,943,890 A | 7/1960 | Hrabovszky | |
| 2,955,877 A | 10/1960 | Ecal | |
| 2,971,679 A | 2/1961 | Pavia | |
| D193,294 S | 7/1962 | Mendez | |
| 3,043,599 A | 7/1962 | Meyer | |
| 3,058,753 A | 10/1962 | Carlsen | |
| 3,080,173 A | 3/1963 | Johnson et al. | |
| 3,088,777 A | 5/1963 | Aller | |
| 3,090,593 A | 5/1963 | Pro | |
| D196,427 S | 10/1963 | Anderson et al. | |
| 3,115,278 A | 12/1963 | Mylting | |
| 3,115,894 A | 12/1963 | Marx | |
| 3,207,203 A | 9/1965 | Mack | |
| D204,751 S | 5/1966 | Mendez | |
| 3,252,431 A | 5/1966 | Phillips | |
| 3,295,895 A | 1/1967 | Latham, Jr. | |
| 3,297,366 A | 1/1967 | Kauffman | |
| 3,311,269 A | 3/1967 | Mendez | |
| 3,325,177 A | 6/1967 | Welinder | |
| 3,374,910 A | 3/1968 | Wilhelm | |
| 3,380,780 A | 4/1968 | Allen | |
| D211,163 S | 5/1968 | Mendez | |
| 3,419,310 A | 12/1968 | Gramlich | |
| 3,421,663 A | 1/1969 | Paton | |
| 3,424,501 A | 1/1969 | Young | |
| 3,469,888 A | 9/1969 | Aller et al. | |
| 3,543,692 A | 12/1970 | Stark | |
| 3,543,693 A | 12/1970 | Thornton et al. | |
| 3,566,416 A | 3/1971 | Altieri et al. | |
| 3,580,420 A * | 5/1971 | Kennedy | B08B 9/0321 |
| | | | 222/1 |
| 3,612,083 A | 10/1971 | Kronk | |
| 3,644,003 A | 2/1972 | Von Funk | |
| 3,679,082 A | 7/1972 | Gramlich | |
| D229,041 S | 11/1973 | Norton | |
| 3,780,446 A * | 12/1973 | Frimberger | B29B 13/065 |
| | | | 34/581 |
| 3,804,303 A | 4/1974 | Fassauer | |
| 3,858,772 A | 1/1975 | Myers, Jr. | |
| 3,955,853 A | 5/1976 | Rusterholz | |
| 3,987,816 A | 10/1976 | Lange | |
| 3,989,056 A | 11/1976 | Reinartz | |
| 4,005,806 A | 2/1977 | Baldwin | |
| 4,090,530 A | 5/1978 | Lange | |
| 4,111,492 A | 9/1978 | Mraz | |
| 4,138,163 A | 2/1979 | Calvert et al. | |
| 4,155,469 A | 5/1979 | Cole | |
| 4,230,048 A | 10/1980 | Gordon et al. | |
| 4,346,905 A | 8/1982 | Smetanick | |
| 4,348,047 A | 9/1982 | Harshman | |
| 4,355,929 A | 10/1982 | Snowdon | |
| 4,403,783 A | 9/1983 | Henderson | |
| 4,579,271 A | 4/1986 | Fujita et al. | |
| 4,606,570 A * | 8/1986 | Neumann | B60P 3/426 |
| | | | 105/243 |
| 4,676,826 A | 6/1987 | Jortikka | |
| 4,677,917 A | 7/1987 | Dugge | |
| 4,697,962 A | 10/1987 | Dunbar et al. | |
| 4,818,024 A | 4/1989 | Michel | |
| 4,823,989 A | 4/1989 | Nilsson | |
| 4,883,390 A | 11/1989 | Reintjes | |
| 4,884,923 A | 12/1989 | Wellink | |
| 4,925,552 A | 5/1990 | Bateson | |
| 4,955,989 A | 9/1990 | Mink | |
| 5,073,259 A | 12/1991 | Solimar | |
| 5,326,156 A | 7/1994 | Heider et al. | |
| 5,540,257 A | 7/1996 | Guilleux | |
| 5,639,188 A | 6/1997 | Howanski | |
| 5,700,112 A | 12/1997 | Lamm | |
| 5,819,776 A | 10/1998 | Kephart | |
| 5,819,970 A | 10/1998 | Solimar | |
| 5,855,456 A | 1/1999 | Mueller | |
| 5,911,337 A | 6/1999 | Bedeker | |
| 5,996,604 A | 12/1999 | Doelle | |
| 6,196,590 B1 | 3/2001 | Kim | |
| 6,220,791 B1 | 4/2001 | Hutchins | |
| 6,283,327 B1 | 9/2001 | Rubstov | |
| 6,343,896 B1 | 2/2002 | Goodier et al. | |
| 6,350,086 B1 | 2/2002 | Dibble et al. | |
| 6,402,437 B1 | 6/2002 | Gasquet | |
| 6,406,619 B1 | 6/2002 | Donald | |
| 6,457,630 B1 | 10/2002 | Nilsson | |
| 6,533,142 B1 * | 3/2003 | Hynick | B60P 3/2245 |
| | | | 222/136 |
| 6,564,961 B1 | 5/2003 | Klein | |
| 6,606,980 B1 | 8/2003 | Walter | |
| 6,948,887 B1 | 9/2005 | Yielding et al. | |
| 7,530,729 B2 | 5/2009 | O'Callaghan | |
| 7,540,695 B2 * | 6/2009 | Snowdon | B65D 88/128 |
| | | | 406/119 |
| 7,882,897 B2 | 2/2011 | Neumann | |
| 8,113,745 B2 | 2/2012 | Aoki | |
| 8,632,099 B2 | 1/2014 | Conny et al. | |
| 8,668,430 B2 | 3/2014 | Oren et al. | |
| 8,684,448 B2 | 4/2014 | Johnson et al. | |
| 8,794,259 B2 | 8/2014 | Daneshgari | |
| D716,701 S | 11/2014 | Beelman, III | |
| 8,967,673 B2 | 3/2015 | Morgan et al. | |
| 9,090,413 B2 | 7/2015 | Petit | |
| 9,126,772 B2 | 9/2015 | Marchesini et al. | |
| 9,195,238 B2 | 11/2015 | Roden | |
| 9,248,774 B2 * | 2/2016 | Hinde | B60P 1/162 |
| D756,267 S | 5/2016 | Kibler et al. | |
| 9,428,330 B2 * | 8/2016 | Lopez | B65D 88/027 |
| 9,616,799 B1 | 4/2017 | Smith | |
| 9,725,800 B2 | 8/2017 | Kusunoki | |
| 9,758,083 B1 | 9/2017 | Beelman et al. | |
| 9,789,916 B1 | 10/2017 | Beelman, III | |
| 9,802,753 B2 | 10/2017 | Kibler | |
| D803,726 S | 11/2017 | Kibler | |
| 9,821,656 B2 * | 11/2017 | Hinde | F04C 18/126 |
| 10,081,499 B2 * | 9/2018 | Goodier | B65G 53/24 |
| 10,101,751 B2 * | 10/2018 | Sonnenburg | G05D 7/0676 |
| 10,150,062 B2 | 12/2018 | Dawson et al. | |
| 10,155,181 B2 | 12/2018 | Dawson et al. | |
| 10,155,466 B2 | 12/2018 | Kibler | |
| 10,351,043 B1 | 7/2019 | Kibler | |
| 10,427,729 B2 | 10/2019 | Holden et al. | |
| 10,576,866 B2 | 3/2020 | Kibler et al. | |
| 10,653,977 B2 | 5/2020 | Dawson et al. | |
| 2002/0125254 A1 | 9/2002 | Hagano | |
| 2002/0139814 A1 | 10/2002 | Bird | |
| 2003/0038535 A1 | 2/2003 | Tevis | |
| 2004/0154236 A1 | 8/2004 | Kinzer | |
| 2008/0073895 A1 | 3/2008 | Herman et al. | |
| 2008/0209848 A1 | 9/2008 | Kinzer | |
| 2009/0032555 A1 | 2/2009 | Peterson | |
| 2009/0085394 A1 | 4/2009 | Lemmons | |
| 2013/0266411 A1 | 10/2013 | Morgan et al. | |
| 2014/0353999 A1 | 12/2014 | Yielding | |
| 2015/0061318 A1 | 3/2015 | Kibler et al. | |
| 2015/0137501 A1 | 5/2015 | Kibler | |
| 2015/0360856 A1 | 12/2015 | Oren et al. | |
| 2017/0247182 A1 | 8/2017 | Kibler | |
| 2018/0140965 A1 * | 5/2018 | Flora | C11B 1/10 |
| 2018/0178974 A1 * | 6/2018 | Sisk | B60P 3/2245 |
| 2018/0251291 A1 | 9/2018 | Markham | |
| 2019/0233203 A1 * | 8/2019 | Sisk | B60P 3/224 |
| 2019/0299839 A1 | 10/2019 | Kibler et al. | |
| 2019/0300297 A1 | 10/2019 | Kibler et al. | |

* cited by examiner

METHOD OF DECREASING STRESS AND DEFORMATION IN A BULK TANK

CROSS REFERENCE TO RELATED APPLICATION

This application claims the benefit of U.S. Provisional Application Ser. No. 62/648,694, filed on Mar. 27, 2018; the disclosure of which is incorporated herein by reference.

BACKGROUND

Technical Field

The technical field is related generally to bulk tankers or bulk or pneumatic tanks/trailers having a plurality of hoppers. More particularly, the technical field is related to such a tank or trailer having a first compartment for transporting a load therein, a second compartment that is located in abutting contact with the first compartment; and a system for placing the first compartment and second compartment under substantially similar or substantially equal pressure.

Background Information

Bulk tankers and bulk tank trailers or pneumatic tank trailers are amongst the many types of vehicles used for hauling materials over highways and the like. These tankers or tank trailers are used to transport bulk materials, particularly dry, particulate-type bulk materials from one location to another. The types of material transported in these vehicles may include foodstuffs such as sugar and flour, chemicals, silica, plastic pellets, and building materials such as sand or dry cement. The term "trailer" will be used throughout the rest of the specification to identify a bulk tank trailer that is used to transport materials. However, it should be understood that the terms "trailer", "bulk tank trailer", "tanker", "tank", "truck", "vessel" or "vehicle" may be used interchangeably in this description.

The tankers or tank trailers typically include several hoppers or cones that facilitate the discharge of the bulk material from within the tank into a discharge pipe through which pressurized air is pumped to discharge the material to a rear end of the trailer. Valve assemblies are typically located at the bottom of the hoppers whereby the hoppers may be opened or closed to respectively allow the flow of the bulk particulate material from the hoppers into the discharge pipe and to cut off this flow.

The tank itself is a closeable vessel that has a number of manholes provided in a top region of the tank body. Each manhole includes a cover for closing off access to the manhole. The covers are removed when material is to be loaded into a storage compartment defined in the interior of the tank. The tanker or tank trailer is moved into a loading bay and is positioned so that the one or more manholes are aligned with overhead pipes or hoses that are connected to a source of the dry materials to be carried in the vessel. Once the tank's storage compartment is filled to the desired level, the covers are replaced on the manholes and the tanker or tank trailer will travel to its destination.

As indicated above, the bottom region of the tanker or tank trailer is formed into a plurality of hoppers that each terminate in an elongate discharge pipe that extends from the first hopper through to a rear end of the vessel. Each hopper connects via a T-connection to the discharge pipe. A butterfly valve and an aerator are typically provided proximate the T-connection between the hopper and the discharge pipe. The aerators keep the dry materials aerated and help ensure that the materials are fluidized, i.e., that they will flow in a similar manner to a liquid. The butterfly valves control whether there is fluid communication between the hopper and the discharge pipe. When the tanker arrives at its destination, the operator will connect the end of the discharge pipe to an inlet for a storage vessel for the transported dry materials. The operator will go through a series of steps of pressurizing the discharge pipe, aerating the load, opening the butterfly valves sequentially and emptying the transported material from the tank via the discharge pipe. The pressure within the tank and the discharge pipe has to be kept within a certain range to ensure that all the material will be evacuated from the storage compartment defined by the tanker body. Once basically all material has been removed from the storage compartment, the operator will use pressurized air fed from a top region of the tank to blow out the storage compartment to clean the same and will sequentially close the hoppers, shut down the aerators and stop the pressurization of the discharge pipe in a predetermined sequence that ensures safety of the operator and integrity of the tank. In other instances, instead of the tank being pressurized to remove the dry materials therefrom, a vacuum source may be connected to the end of the discharge pipe and a vacuum will be applied to the discharge pipe to suck the dry materials from the hoppers.

Such tankers or trailers typically include a relatively substantial or large frame on which the tank/hoppers are mounted. Such frames are relatively heavy, which may, for instance, decrease gas mileage or reduce the amount of cargo that may be carried in the tank while staying within government weight regulations.

SUMMARY

In one aspect, the present disclosure may provide a dry bulk tank for carrying a load; said dry bulk tank comprising a tank assembly; a first wall provided on the tank assembly; said first wall bounding and defining a first compartment that is adapted to carry a load therein; a second wall spaced outwardly from at least a portion of the first wall; wherein a second compartment is defined between the first wall and the second wall; and an air piping system engaged with the tank assembly; wherein the air piping system is selectively actuated to place the first compartment and the second compartment under substantially similar or substantially equal air pressure.

In one example the tank assembly comprises a vessel that is circular in lateral cross-section. In another example the tank assembly includes a front end housing and a central section that extends rearwardly from the front end housing; and wherein each of the front end housing and the central section are circular in lateral cross-section. The first compartment is defined in the central section and the second compartment is defined partially in the front end housing. In other embodiments the second compartment is also defined partially in the central section.

In other embodiments, the tank assembly further includes a rear end housing that extends rearwardly from the central section; and wherein the rear end housing is circular in lateral cross-section and wherein the second compartment is further defined at least partially in the rear end housing. The second compartment is sealed from contact with air located outside of the tank assembly. The air piping system places the first compartment and second compartment in fluid communication with each other. In one embodiment the air piping system is activatable to place the first and second compartments under pressure and may place the first and second compartments under substantially similar or substantially equal pressure simultaneously. In other embodiment the air piping system is activatable to place the first and second compartments under vacuum. The air piping system may be activatable to simultaneously place the first and second compartments under substantially similar or substantially equal vacuum. When the air piping system is activated the air pressure on a first side of a portion of the first wall in the first compartment is substantially similar or substantially equal to an air pressure on a second side of the portion of the first wall in the second compartment.

In one embodiment the dry bulk tank has a central section includes at least one hopper extending downwardly from a bottom of the central section; and wherein an interior of the at least one hopper forms a part of the first compartment; and wherein a lower region of the at least one hopper extends for a distance below the second compartment.

In another aspect, the present disclosure may provide a method of transporting and unloading dry bulk materials comprising providing a dry bulk tank trailer that includes a first compartment and a second compartment; wherein the first and second compartments are located on opposite sides of a portion of a wall that bounds and defines the first compartment; loading a quantity of dry bulk materials into the first compartment; substantially equalizing air pressure in the first compartment and in the second compartment; and unloading the dry bulk materials from the first compartment while the first and second compartments are under substantially similar or substantially equal air pressure.

In one embodiment substantially equalizing air pressure in the first compartment and the second compartment includes pumping air into the first compartment and the second compartment through an air piping system. The pumping of air into the first compartment and the second compartment occurs substantially simultaneously and pumping the air into the first compartment and the second compartment continues until the air pressure in each of the first and second compartments is from about 10 Psi up to about 15 Psi.

In another embodiment substantially equalizing air pressure in the first compartment and the second compartment includes vacuuming air from the first compartment and vacuuming air from the second compartment until there is substantially similar or substantially equal air pressure in the first and second compartments. The substantially equalizing of the air pressure includes simultaneously vacuuming air from the first compartment and from the second compartment.

In one example the method further comprises forming the dry bulk tank trailer as a vessel that is generally circular in cross-sectional shape when viewed from a front end or a rear end. In another example, the forming of the dry bulk tank includes providing a central section; providing a front end housing longitudinally in front of the central section; providing a rear end housing longitudinally behind the central section; forming the first compartment in the central section; and forming the second compartment partially in the front end housing. The method may further include forming the second compartment partially in the central section below the first compartment. The method in one example may further comprise forming one or more hoppers in the central section and forming the first compartment at least partially in each of the one or more hoppers; extending a portion of each of the one or more hoppers downwardly beyond the part of the second compartment that is located below the first compartment. The method may further comprise placing each of the one or more hoppers in fluid communication with a discharge pipe.

In one example the unloading of the first compartment includes opening a valve assembly on each of the one or more hoppers; and allowing the load in the first compartment to flow from the first compartment into the discharge pipe under pressure. The method may further comprise maintaining substantially similar or substantially equal pressure in the first and second compartments during unloading; and releasing pressure in the first and second compartments after unloading is completed.

In another aspect, the present disclosure may provide a dry bulk tank for transporting a load, said tank comprising a tank assembly having a front end and a rear end and defining a longitudinal axis therebetween; a plurality of ground-contacting wheels provided on the tank assembly; more than one sealable area provided in the tank assembly; a system for changing air pressure; wherein the system is in fluid communication with each of the more than one sealable area; wherein the system is selectively actuated to substantially equalize air pressure in the more than one sealable area. A first one of the more than one pressurized areas comprises a first compartment that is adapted to transport a load therein. A second one of the more than one pressurized areas is located in abutting contact with the first compartment. In one example the second one of the more than one pressurized areas is located forwardly of the first compartment. In another example, the second one of the more than one pressurized areas is located beneath the first compartment. In another example the second one of the more than one pressurized areas is located rearwardly of the first compartment. In another example the second one of the more than one pressurized areas is partially located forwardly of the first compartment; is partially located beneath a portion of the first compartment and is partially located rearwardly of the first compartment.

In one embodiment the tank assembly further comprises at least one hopper and wherein an interior compartment is defined in the at least one hopper and the interior compartment forms a part of the first compartment. In one example the at least one hopper may include a first hopper and a second hopper that are located adjacent each other and wherein a top region of the first hopper is joined to a top region of the second hopper; and wherein a portion of an exterior wall of the tank assembly extends between an exterior surface of the first hopper and an exterior surface of the second hopper.

In one example the dry bulk tank further comprises a rib provided inside the tank assembly; said rib being joined to the top regions of each of the first hopper and the second hopper. In one example the tank assembly is a vessel that is circular in lateral cross-section; and an exterior curved surface of the rib is generally U-shaped and is welded to a complementary interior curved surface of the vessel. The rib defines at least one aperture therein that extends between a front surface and a rear surface of the rib; and wherein a portion of the rib that includes the aperture is located within one of the more than one sealable area in the tank assembly. In one example the one of the more than one sealable area that includes the portion of the rib is located between an exterior surface of the first hopper and an exterior surface of the second hopper.

In one embodiment the system pumps air into the more than one sealable area. In another embodiment the system pumps air out of the more than one sealable area. The system includes piping running from an air intake pipe to each of the more than one sealable area. A first section of the piping terminates in an upper region of one of the more than one sealable area and wherein the one of the more than one sealable area is a first compartment adapted to carry a load therein; and wherein air pressure is applied into the first compartment through the first section of piping and from above the load carried in the storage container. The tank assembly may include at least one hopper extending downwardly from a bottom region of the tank assembly that forms part of the first compartment; wherein the at least one hopper defines an exit opening therein through which the load is removable from the first compartment; and wherein the more than one sealed areas includes a second sealed chamber that at least partially surrounds part of an exterior surface of the at least one hopper; and wherein a second section of piping terminates in the second sealed chamber and wherein air pressure is provided in the second sealed chamber through the second section of the piping and pushes upwardly against the air pressure in the at least one hopper.

In one example the system comprises an air intake pipe adapted to be operatively engaged with a pump; a top air pipe operatively engaged with the air intake pipe; a first valve operatively engaged with the air intake pipe, the first valve being selectively movable between an open position and a closed position; and wherein the top air pipe is selectively placeable in fluid communication each of the more than one sealable area when the first valve is in the open position.

In another aspect, the disclosure may provide a dry bulk tank for transporting a load, said tank comprising a tank assembly having a front end and a rear end and defining a longitudinal axis therebetween; a plurality of ground-contacting wheels provided on the tank assembly; more than one sealable area defined in the tank assembly; and a system for placing all of the more than one sealable area under substantially similar or substantially equal air pressure; and wherein one of the more than one sealable area is adapted to carry a load therein; and another of the more than one sealable area shares a wall in common with the one of the more than one areas that carries the load. In one example, the system pumps air into the more than one sealable area. In another example, the system evacuates air from the more than one sealable area.

In yet another aspect, the disclosure may provide a method of decreasing stress and deformation in a bulk tank trailer comprising forming an exterior wall of the bulk tank trailer into a cylinder; providing one or more hoppers that each individually extend through a region of a bottom end of the exterior wall; defining a first compartment in an interior of the cylinder at the one or more hoppers; defining a sealed compartment in abutting contact with the first compartment; and applying substantially similar or substantially equal air pressure to the first compartment and the sealed compartment. The providing of the one or more hoppers comprises providing a first hopper and a second hopper; and the method further comprises extending a section of the exterior wall of the cylinder between an exterior surface of the first hopper and an exterior surface of the second hopper. In one example, the applying of substantially similar or substantially equal air pressure includes pumping air into each of the first compartment and the sealed compartment. In another example, the applying of substantially similar or substantially equal air pressure includes vacuuming air from each of the first compartment and the sealed compartment.

In another aspect, the present invention may provide a method of minimizing relative movement between component parts of a tank trailer comprising providing a first compartment defined by a first exterior wall, said first compartment being adapted to retain a load therein; providing a second compartment defined by a second exterior wall; positioning the first compartment adjacent the second compartment such that a section of the first exterior wall and a section of the second exterior wall form a common wall that separates the first and second compartments; moving an air pressure in the first compartment and an air pressure in the second compartment in a same direction; and reducing movement in the common wall as the air pressure in the first compartment and the air pressure in the second compartment move toward a similar final air pressure. The method may further include reducing stress in the common wall as the air pressure in the first compartment and the air pressure in the second compartment move toward the similar final air pressure. The moving of the air pressure in the first compartment and moving of the air pressure in the second compartment in the same direction comprises increasing the air pressure in the first compartment and increasing the air pressure in the second compartment. The moving of the air pressure in the first compartment and moving the air pressure in the second compartment in the same direction comprises decreasing the air pressure in the first compartment and decreasing the air pressure in the second compartment. The method may further comprise creating a vacuum condition in the first compartment and creating a vacuum condition in the second compartment. The method may further comprise substantially equalizing air pressure in the first compartment and the second compartment. The moving of the air pressure in the first compartment and the air pressure in the second compartment in the same direction occurs during loading of the first compartment or during unloading of the first compartment. The method may further comprise applying a first force to the common wall with the air pressure in the first compartment and applying a second force to the common wall with the air pressure in the second compartment prior to moving the air pressure in the same direction; wherein the first force and the second force are of an unequal magnitude. The first force and the second force are moved toward a substantially similar or substantially equal magnitude as the air pressure in the first compartment and the air pressure in the second compartment are moved toward in the same direction. The method may further comprise moving a portion of the common wall outwardly away from the first compartment or moving a portion of the common wall inwardly toward the first compartment prior to moving the air pressure in the first compartment and the air pressure in the second compartment in the same direction. The method may further comprise reducing a degree of motion of the portion of the common wall as the air pressure in the first compartment and the air pressure in the second compartment are moved in the same direction. The moving of the air pressure in the first compartment and the air pressure in the second compartment in the same direction comprises placing the first compartment and the second compartment in fluid communication. The placing of the first and second compartments in fluid communication includes providing a pipe that has a first end in the first compartment and a second end in the second compartment. The method may comprise establishing atmospheric pressure in the first compartment and in the second compartment or evacuating air from the first compartment and the second compartment.

In yet another aspect, the invention may provide a method of loading and unloading a dry bulk tank comprising providing a tank assembly defining a first compartment for carrying a load and a second compartment located vertically beneath at least a portion of the first compartment and in abutting contact with the first compartment; placing the first compartment and second compartment in fluid communication with a device for pressurizing air in the first and second compartments or with a device for creating a vacuum in the first and second compartments. The method may further comprise placing the first compartment in fluid communication with the second compartment utilizing an air piping system. The method may further comprise operatively engaging at least one valve with the air piping system; moving the at least one valve from a first position to a second position to place the first and second compartments under vacuum and moving the at least one valve from the second position to the first position to pressurize the first and second compartments. The method may further comprise automatically moving the at least one valve between the first and second positions. The moving of the at least one valve between the first and second positions includes utilizing an operator located on the ground alongside the tank assembly. The method may include creating a vacuum in the first and second compartment without the operator moving hoses between a front end and a back end of the tank assembly.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 8:
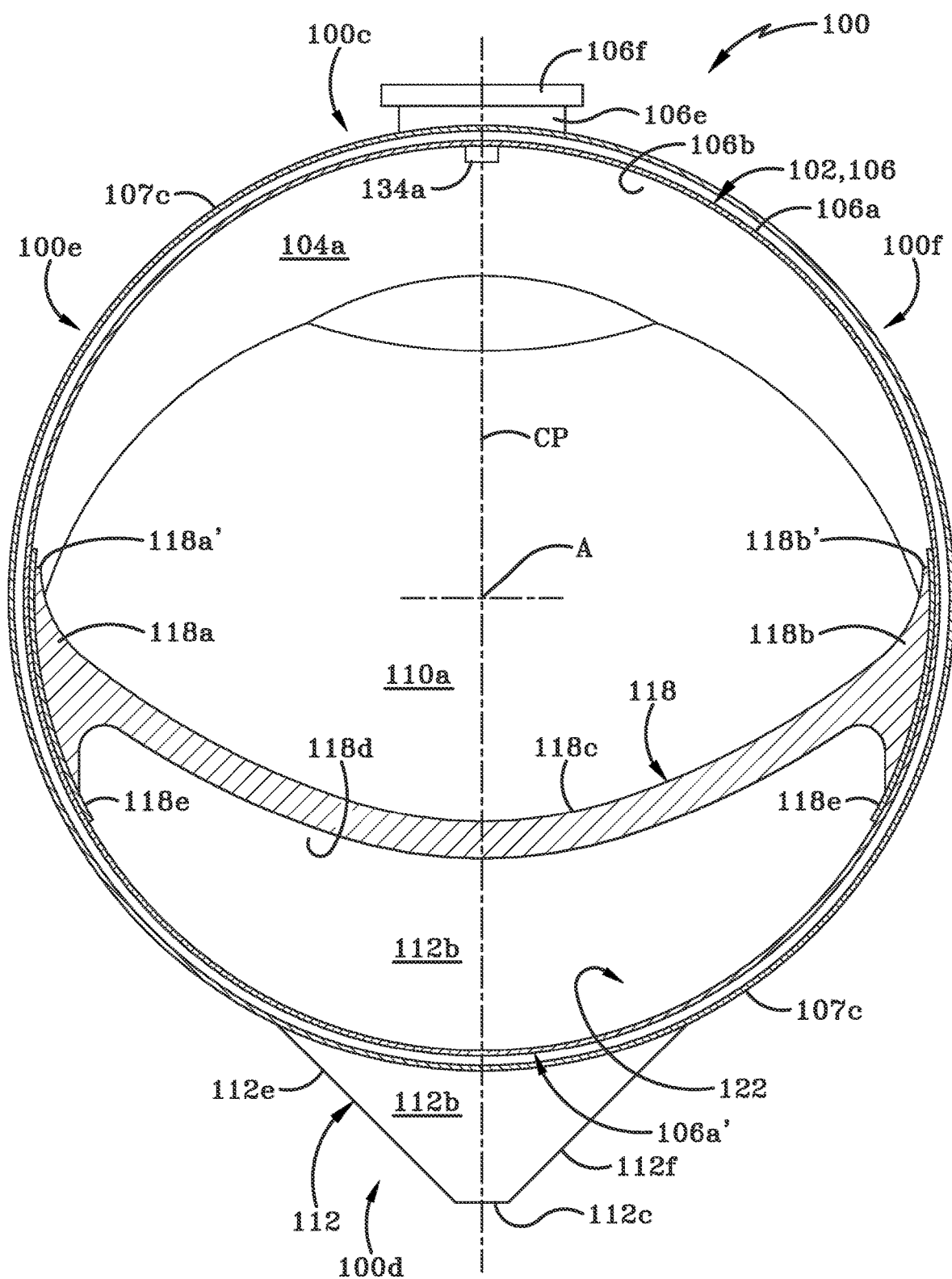
FIG. 8 is a lateral cross-section of the dry bulk tank taken along line 8-8 of FIG. 6.
Figure 9:
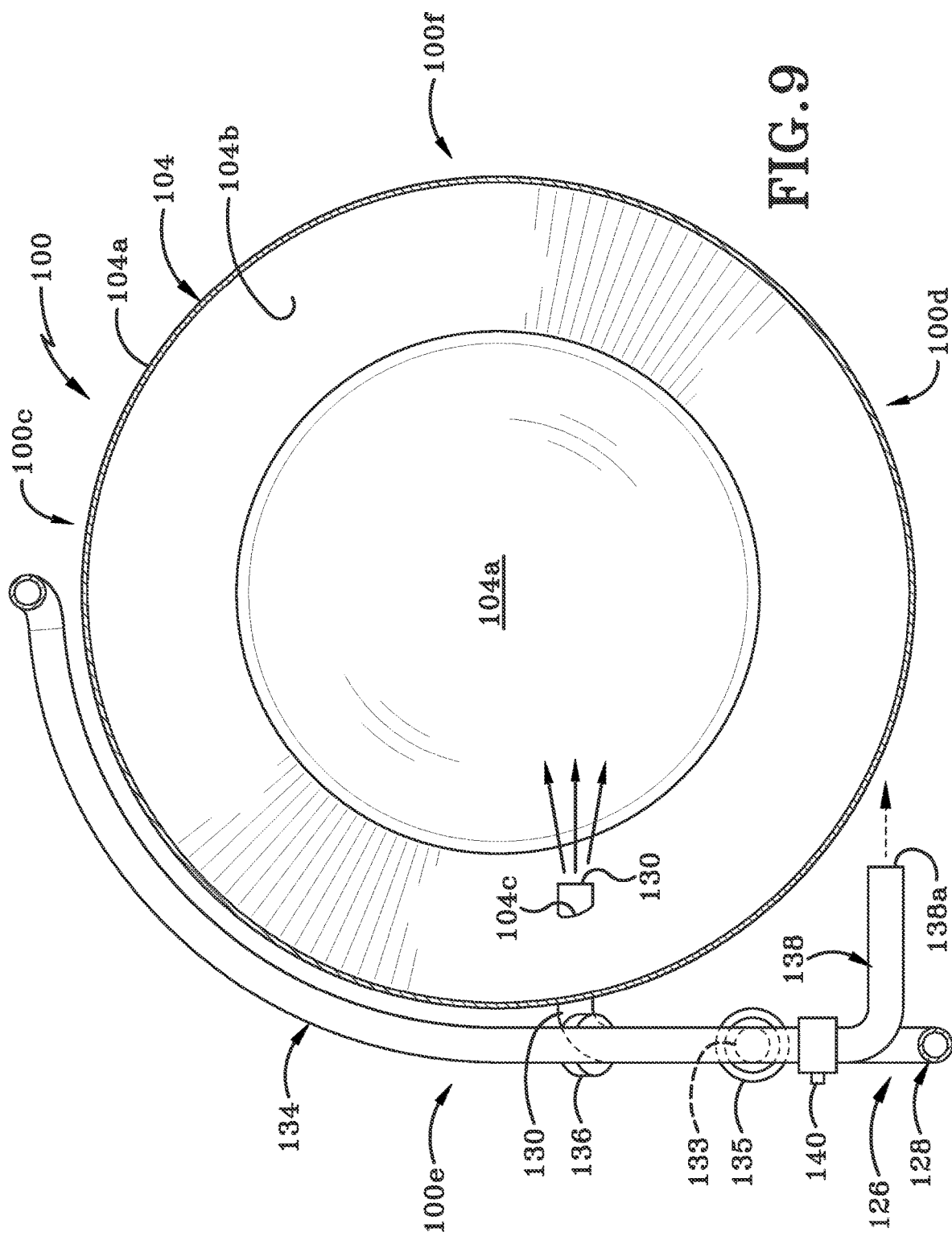
FIG. 9 is a front elevation view of the dry bulk tank of FIG. 5.
Figure 10:
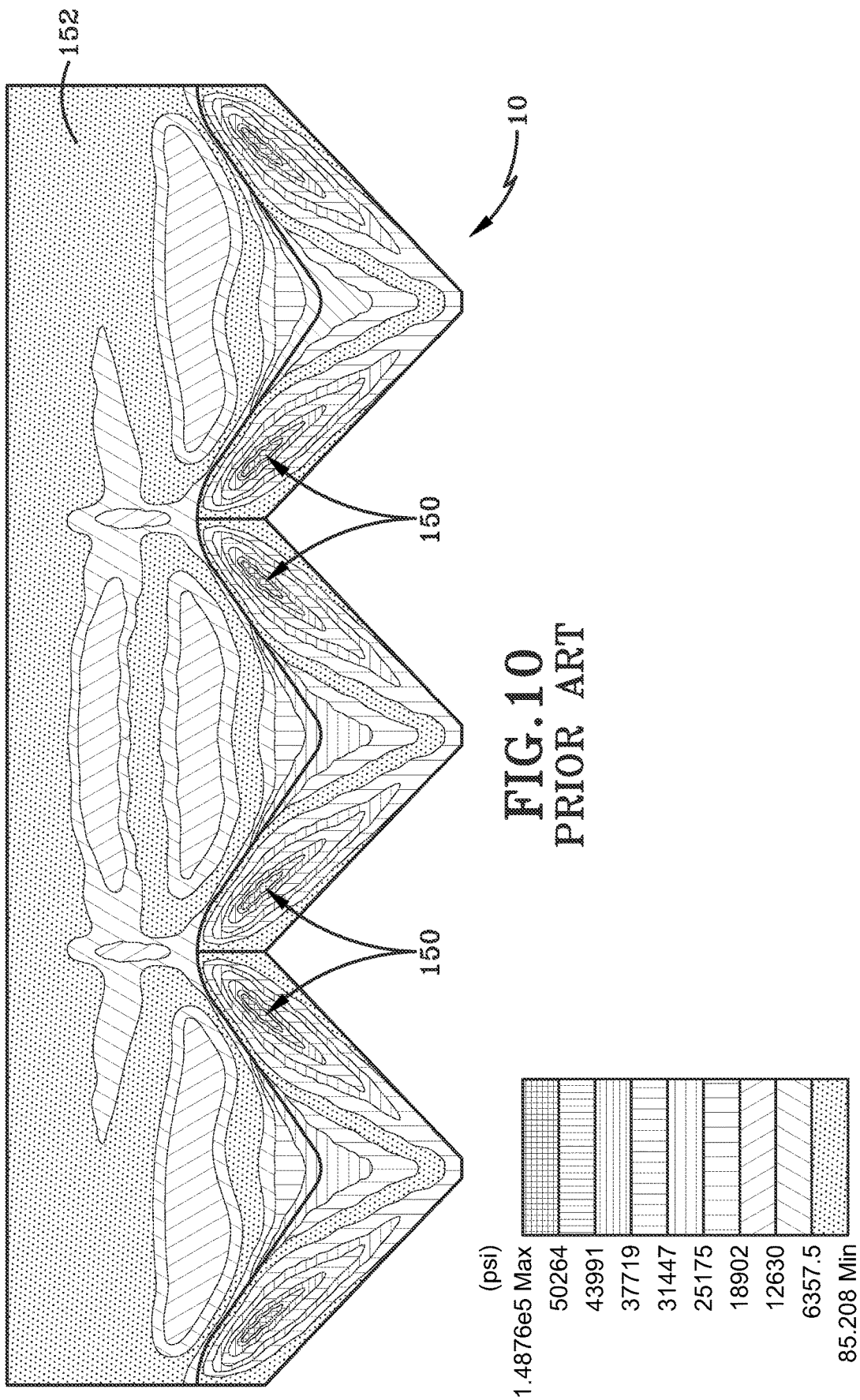
FIG. 10 is executed in color and shows an ANSYS® Deformation Analysis of a PRIOR ART dry bulk tank (ANSYS® is a registered trademark of Ansys, Inc. of Canonsburg, Pa., USA)
Figure 11:
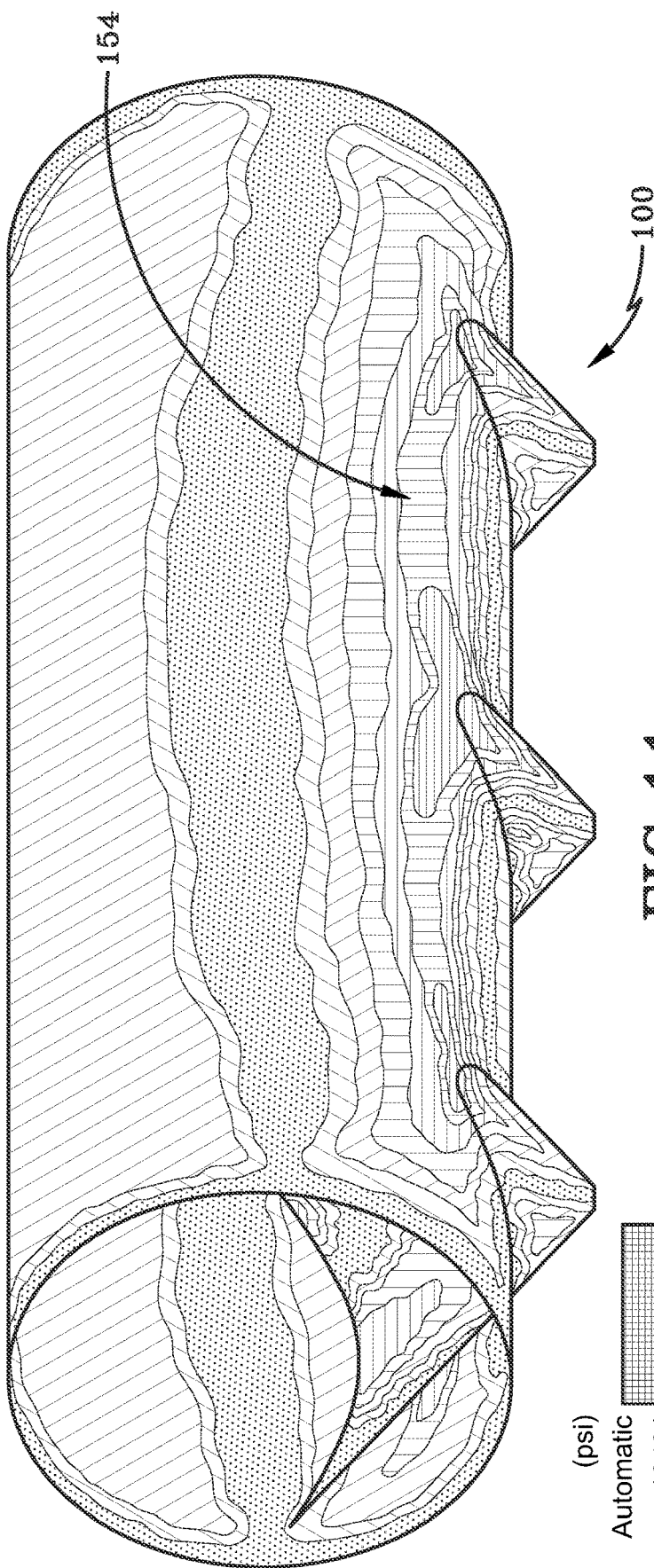
FIG. 11 is executed in color and shows an ANSYS® Deformation Analysis of the dry bulk tank in accordance with the present disclosure.

FIGS. 1-4 show a PRIOR ART bulk tank trailer and FIGS. 5-9 show a first embodiment of a bulk tank trailer in accordance with the present disclosure. FIGS. 10 and 11 show a second embodiment of a bulk tank trailer in accordance with the present disclosure.

The term "trailer" will be used throughout the rest of the specification to reference either of the PRIOR ART bulk tank trailer or the bulk tank trailer in accordance with the present disclosure. However, it should be understood that the terms "trailer", "bulk tank trailer", "tanker", "tank", "truck", or "vehicle" may be used interchangeably herein.

Referring to FIGS. 1-4, the PRIOR ART bulk tank trailer will be described in greater detail and is generally indicated in these figures by the reference number 10. Bulk tank trailer 10 may be similarly configured to a bulk tank trailer described in U.S. patent application Ser. No. 15/056,496 filed Feb. 29, 2016 and assigned to the same Applicant as the present disclosure. U.S. patent application Ser. No. 15/056,496 is entitled "Pneumatic Tank with Tension Bar", and the disclosure of this application is incorporated herein by reference.

Figure 3:
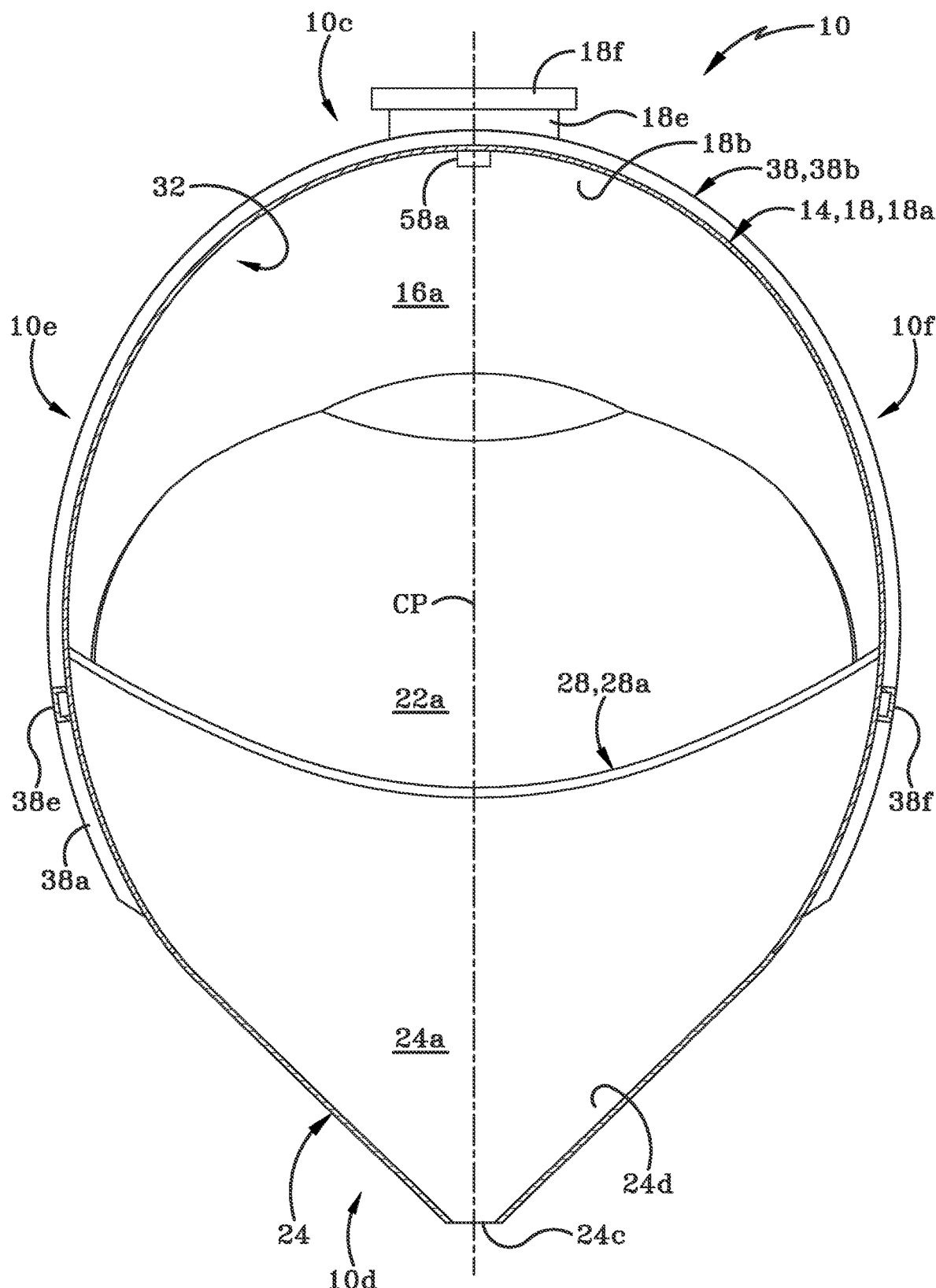
FIG. 3 is a lateral cross-section of the PRIOR ART dry bulk tank taken along line 3-3 of FIG. 1 with several components omitted for clarity of illustration.

Trailer 10 may be a towed vehicle which is towed by a towing vehicle such as an on-road tractor (not shown) whereby trailer 10 and the tractor may form a tractor trailer rig in the form of a dry bulk tanker to transport dry particulate or granular materials. Trailer 10 may have a front end 10a and a rear end 10b defining between them a longitudinal direction. Front end may be pivotally hitched to a rear end of tractor via a hitch member 12. Hitch member 12 may be any suitable type of hitch such as a fifth wheel hitch. Trailer 10 further includes a top 10c, a bottom 10d, a left side 10e and a right side 10f (FIG. 3). Top 10c and bottom 10d define a vertical direction therebetween and left and right sides 10e, 10f define a lateral direction therebetween.

For clarity, an explanation of some terms used herein is provided. Trailer 10 may have an imaginary axial center plane CP (FIGS. 3 and 4) which may be a vertical longitudinally extending plane cutting through the center of trailer 10 midway between the left and right sides 10e and 10f thereof. As is readily evident from the Figures, various components may be axially offset or spaced from center plane CP. The description of trailer 10 may make reference to certain components, sides, surfaces, points and the like as being inboard or outboard of one another, or this may be readily apparent from the Figures even without specific description. Such terms typically relate to the left or right halves of trailer 10 whereby, for instance, with regard to the left half (left of central plane CP), a first point which is outboard of a second point is further to the left than the second point or further outboard than the second point in a first or left outboard direction, and thus the second point is inboard of or to the right of the first point. Thus, within the left half, the first point is further outboard or further from center plane CP than is the second point. Likewise, with regard to the right half (right of central plane CP), a third point which is outboard of a fourth point is further to the right than the fourth point or further outboard than the fourth point in a second or right outboard direction, and thus the fourth point is inboard of or to the left of the third point. Thus, within the right half, the third point is further outboard or further from center plane CP than is the fourth point.

Various surfaces may be said to face axially inward or axially outward, which may respectively mean facing generally toward or away from the imaginary center plane CP. Thus, on the left half of trailer 10, a surface which faces axially inward may be said to face generally to the right or rightward, and a surface which faces axially outward may be said to face generally to the left or leftward. On the right half of trailer 10, a surface which faces axially inward may be said to face generally to the left or leftward, and a surface which faces axially outward may be said to face generally to the right or rightward.

Similarly, various components, surfaces etc. may be said to extend axially inward or axially outward, which may respectively mean extending generally toward or away from center plane CP. Thus, on the left half of trailer 10, a component that extends axially inward may be said to extend generally to the right or rightward, and a component that extends axially outward may be said to extend generally to the left or leftward. On the right half of trailer 10, a component that extends axially inward may be said to extend generally to the left or leftward, and a component etc. which extends axially outward may be said to extend generally to the right or rightward.

Further explanation is provided with respect to references to the longitudinal direction of trailer 10. Certain components of trailer 10 are further forward or rearward of other components, or may be at the same location along a longitudinal axis (where the longitudinal axis extends between front end 10a and rear end 10b. Thus, for example, a reference to two points, surfaces, components or the like being "at the same longitudinal position" or "at the same longitudinal location" means that the two points, surfaces, components or the like are at the same position along the longitudinal axis while they may be at different axial positions, that is, spaced to the left or right of one another, or spaced upwardly or downwardly of one another. Similarly, a reference to two points, surfaces, components or the like being "longitudinally adjacent" one another means that the two points, surfaces, components or the like are at or adjacent the same position along the longitudinal axis while they may be at different axial positions or spaced upwardly or downwardly of one another. It is also noted that the term U-shaped or U-shaped configuration may be used herein to mean an upright U-shape or U-shaped configuration and the term inverted U-shaped configuration may be used herein to mean an upside down U-shaped configuration.

Figure 1:
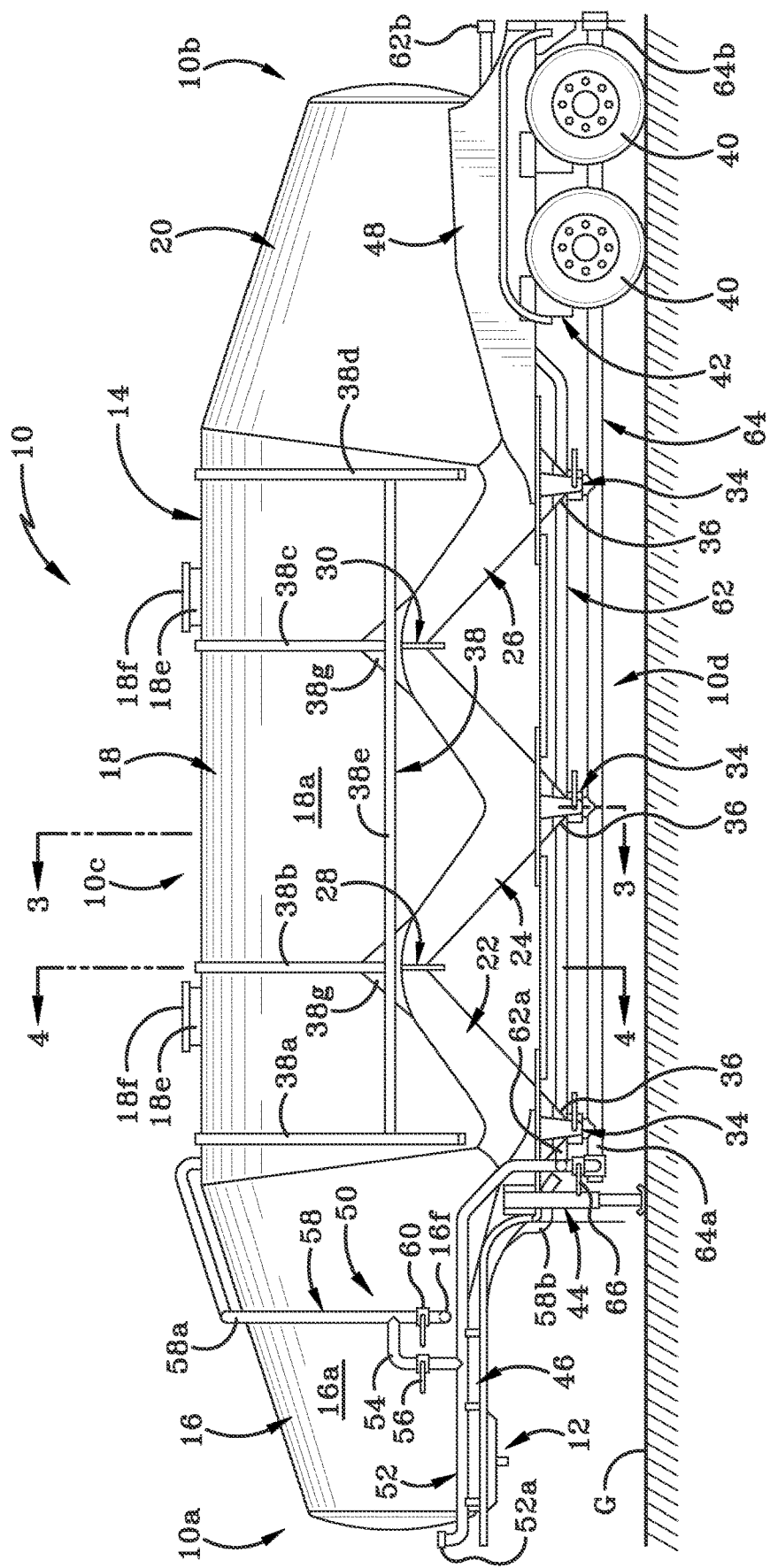
FIG. 1 is a side elevation view of a PRIOR ART dry bulk tank.
Figure 2:
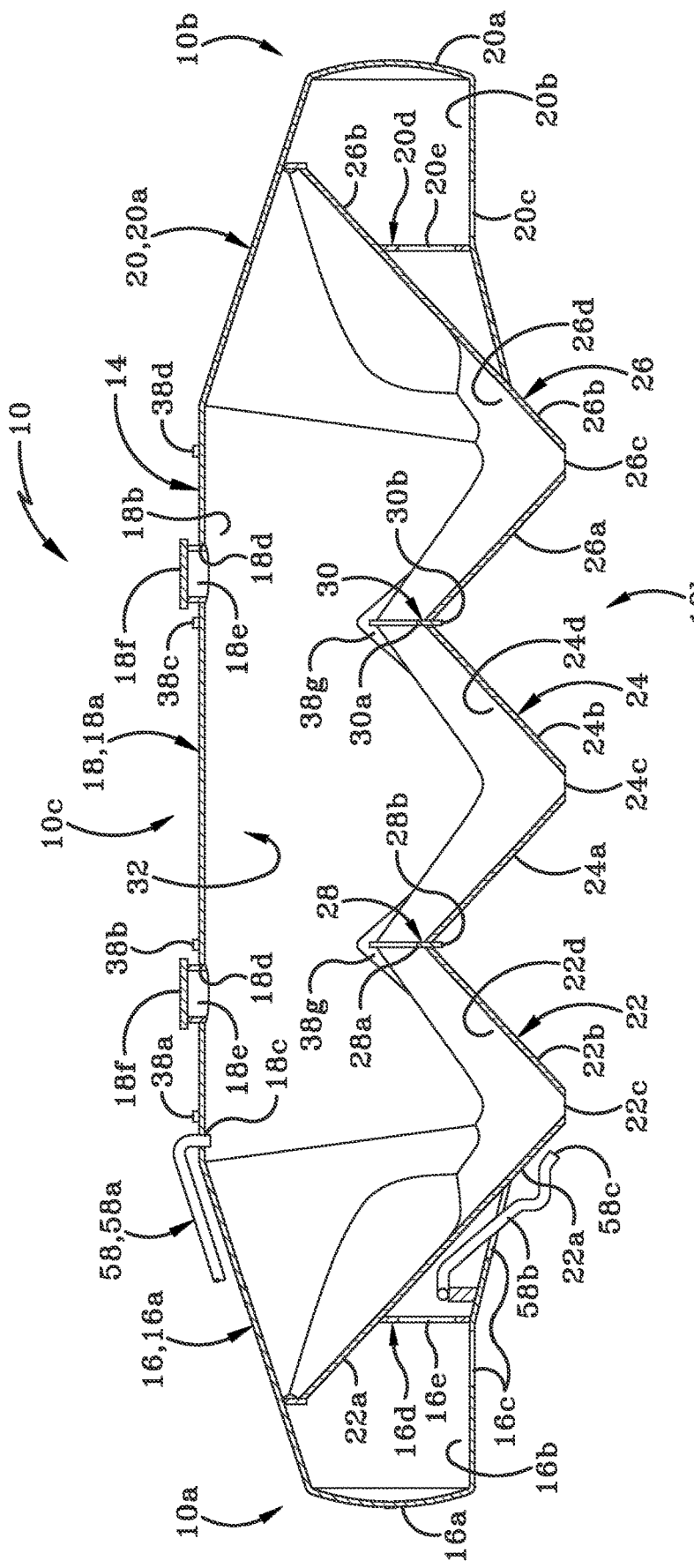
FIG. 2 is a longitudinal cross-section of the PRIOR ART dry bulk tank taken along line 2-2 of FIG. 1 and with several components omitted for clarity of illustration.

With primary reference to FIGS. 1 and 2, trailer 10 comprises a rigid tank assembly 14 that includes a front end housing 16, a central section 18, and a rear end housing 20. Front end housing 16 extends forwardly from the central section 18 and rear end housing 20 extends rearwardly from the central section 18. Front end housing 16, central section 18 and rear end housing 20 are formed from a plurality of differently shaped sheet metal sections that are welded together to form the illustrated exterior shape of tank assembly 14.

Front end housing 16 forms a nose cone on tank assembly 14. Housing 16 includes an exterior wall 16a that bounds and defines an interior front chamber 16b. Wall 16a defines one or more openings 16c that place interior front chamber 16b in fluid communication with the air that surrounds tank assembly 14. Front end housing 16 also includes one or more support walls 16d therein that provide strength and rigidity to front end housing 16. Support wall 16d as illustrated in FIG. 2 may also define an opening 16e therein that allows air to flow between different interior sections of front end housing 16 that are divided by support wall 16d. Air from outside tank assembly 14 may therefore freely circulate into, around and out of inter front chamber 16b. Exterior wall 16a defines an inlet 16f therein, the purpose of which will be described later herein.

Central section 18 includes an inverted, generally U-shaped upper wall 18a. The inverted generally U-shaped upper wall 18a gives the tank assembly 14 a generally ovoid or elliptical shape when tank assembly 14 viewed in cross-section as in FIGS. 3 and 4. Upper wall 18a bounds and defines a generally U-shaped interior space 18b (when viewed in cross-section from a front or rear end of trailer 10). An inlet 18c is defined in upper wall 18a in a top region proximate the top 10c of trailer 10. The top region of upper wall 18a also defines one or more manhole openings 18d therein. Inlet 18c and manhole openings 18d are in fluid communication with interior space 18b. Manholes 18e extend upwardly and outwardly from the top region of upper wall 18a and covers 18f are selectively engageable with manholes 18e. When covers 18f are removed then the manhole openings 18d and thereby interior space 18b are in fluid communication with the air surrounding trailer 10. When covers 18f are engaged on manholes 18e then interior space 18b is no longer in fluid communication with the air surrounding trailer 10. In the figures, inlet 18c is shown located forwardly of the forwardmost manhole 18e but it will be understood the inlet 18c may be provided in any suitable location on upper wall 18a. The purpose of inlet 18c will be described later herein.

Rear end housing 20 extends longitudinally rearwardly from central section 18. Rear end housing 20 has an exterior wall 20a that bounds and defines an interior space 20b. One or more openings 20c may be defined in exterior wall 20a and as a result air within interior space 20b is in fluid communication with the air surrounding tank assembly 14. One or more vertical support walls 20d extends from a top region of rear end housing 20 to a bottom region thereof. Support wall 20d may define one or more openings 20e therein so that the air in a first section of interior space 20b and a second section of interior space 20b can mix with the air outside tank assembly 14.

One or more hoppers are welded to and extend downwardly from a lower end of upper wall 18a of central section 18. Trailer 10 may be configured with one, two, three, or more than three hoppers. As illustrated in FIGS. 1-4, trailer 10 includes a first hopper 22, a second hopper 24, and a third hopper 26. Center plane CP may cut through the axial center of each of hoppers midway between the left and right sides of trailer 10. First hopper 22 may be located closest to front end housing 16, second hopper 24 may be located longitudinally rearwardly of first hopper 22 and generally centrally relative to central section 18, and third hopper 26 may be located longitudinally rearwardly of second hopper 24 and closest to rear end housing 20. First, second and third hoppers 22, 24, 26 may be generally aligned along a longitudinal axis of tank assembly 14, where the longitudinal axis is aligned along central plane "CP" and extends from front end 10a to rear end 10b of trailer 10. Each hopper 22, 24, 26 may be formed with a truncated generally conical exterior wall that tapers in width from the lower end of upper wall 18a towards a bottom 10d of trailer 10. The term "conical" as used herein should be understood to describe a hopper that has a circumferential surface that is curved or that is partially comprised of curved surface and partially comprised of flat surfaces or that is entirely comprised of flat surfaces that are oriented at angles to each other. Hoppers 22, 24, 26 will be further described later herein.

Figure 2A:
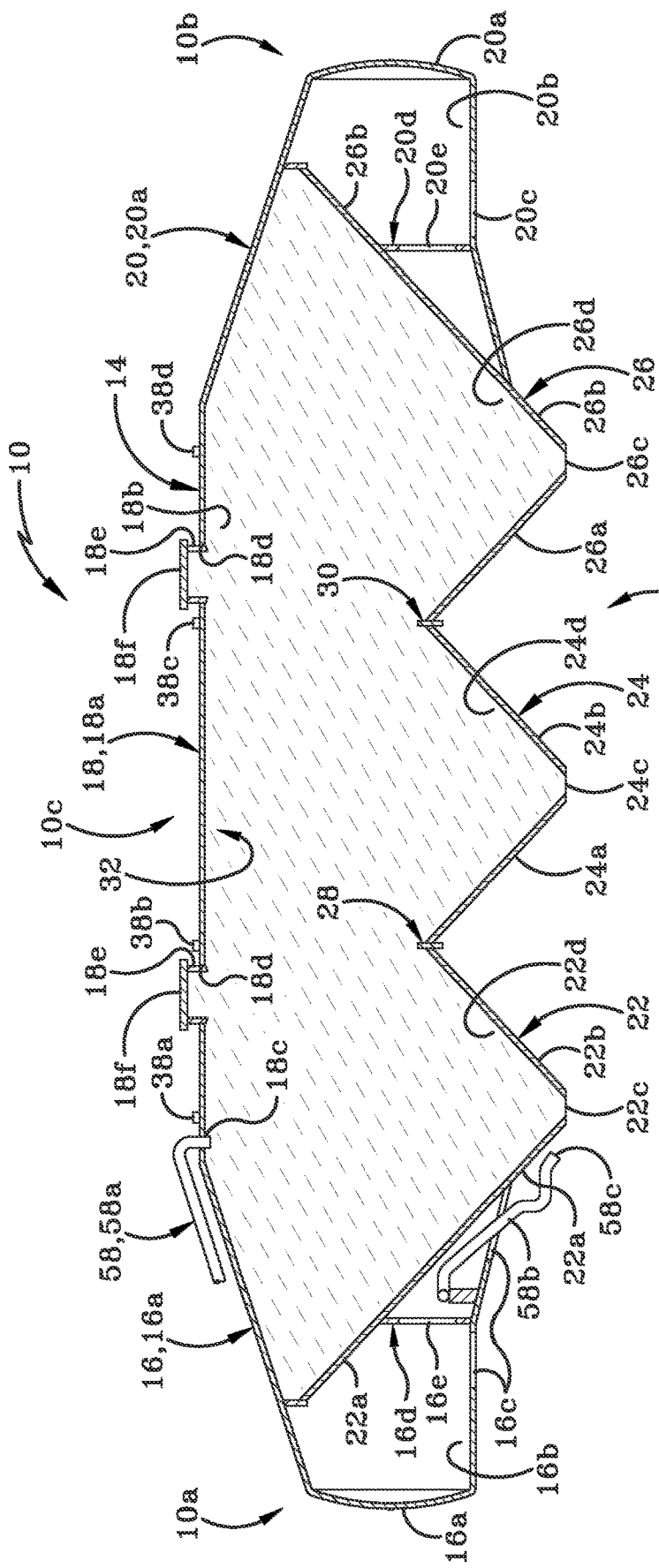
FIG. 2A is a longitudinal cross-section of the PRIOR ART dry bulk tank taken along line 2-2 of FIG. 1 and with several components omitted for clarity of illustration; and showing the bulk material carrying region of the tank trailer.

As best seen in FIGS. 2 and 2A the conical exterior wall of first hopper includes a front region 22a and an opposed rear region 22b. An opening 22c is defined at a bottom end of the conical exterior wall. The conical exterior wall of first hopper 22 bounds and defines an interior space 22d and opening 22c is in fluid communication with interior space 22d. As illustrated in FIGS. 2 and 2A opening 22c is also in fluid communication with the air surrounding trailer 10 although a valve assembly 34 (FIG. 1) is typically provided at the bottom end of first hopper 22 to close off access to interior space 22d. Front region 22a of the conical exterior wall of first hopper 22 angles forwardly and upwardly and is welded at its uppermost end to an interior surface of the top region of upper wall 18a. The front region 22a forms a rearmost wall of front end housing 16.

Referring still to FIGS. 2 and 2A, the conical exterior wall of second hopper 24 includes a front region 24a and a rear region 24b and an opening 24c is defined in the bottom end of the conical wall. The conical exterior wall of second hopper 24 bounds and defines an interior space 24d and opening 24c is in fluid communication with interior space 24d. As illustrated in these figures interior space 24d is also in fluid communication with the air surrounding trailer 10 although a valve assembly 34 (FIG. 1) is typically provided at the bottom end of second hopper 24 to close off access to interior space 24d.

An upper end of rear region 22b of first hopper 22 and an upper end of front region 24a of second hopper 24 may be welded to each other and to a first plate 28. First plate 28 extends transversely across the interior of tank assembly 14. The ends of first plate 28 are welded to opposing regions of the interior surface of upper wall 18a. First plate 28 may be of a substantially constant height from an upper end 28a thereof to a lower end 28b thereof. First plate 28 may comprise a substantially solid and substantially uninterrupted piece of metal (i.e., substantially no holes, openings or slots being defined therein).

The conical exterior wall of third hopper 26 includes a front region 26a and a rear region 26b. An opening 26c is defined in the bottom end of the conical wall. The conical exterior wall of third hopper 26 bounds and defines an interior space 26d and opening 26c is in fluid communication with interior space 26d. As illustrated in FIGS. 2 and 2A opening 26c is also in fluid communication with the air surrounding trailer 10 although a valve assembly 34 (FIG. 1) is typically provided at the bottom end of third hopper 26 to close off access to interior space 26d.

An upper end of rear region 24b of second hopper 24 and an upper end of front region 26a of third hopper 26 may be welded to each other and to a second plate 30. Second plate 30 may be of a substantially identical configuration to first plate 28 and second plate 30 extends transversely across the interior of tank assembly 14 and the ends of second plate 30 are welded to opposing regions of the interior surface of upper wall 18a. Second plate 30 may be of a substantially constant height from an upper end 30a thereof to a lower end 30b thereof. Second plate 30 may comprise a substantially solid and substantially uninterrupted piece of metal (i.e., substantially no holes, openings or slots being defined therein). First plate 28 and second plate 30 may be substantially parallel to each other and at right angles to the longitudinal axis of trailer 10. First plate 28 and second plate 30 are also longitudinally spaced a distance apart from each other. Most of first plate 28 and most of second plate 30 is located within the interior of tank assembly 14. However, a portion of first plate 28 projects downwardly from the junction between rear region 22b of first hopper 22 and front region 24a of second hopper 24 and a portion of second plate 30 projects downwardly from the junction between rear region 24b of second hopper 24 and front region 26a of third hopper 26. This can be seen in FIGS. 1 and 2A.

Rear region 26b of third hopper 26 extends upwardly and rearwardly from the bottom 10d of trailer 10 to the interior surface of a top region of upper wall 18. Rear region 26b is welded to the interior surface of upper wall 18 and forms a rearmost wall of central section 18 and a frontmost wall of rear end housing 20.

Interior space 18b defined by upper wall 18a, interior space 22d defined by first hopper 22, interior space 24d defined by second hopper 24 and interior space 26d defined by third hopper 26 form a storage compartment 32 for tank assembly 14. Storage compartment 32 is suitable for carrying dry bulk materials therein. The one or more manholes 18e provide a way for dry bulk materials to be loaded into storage compartment 32 and the openings 22c, 24c, 24d provide a way for those dry bulk materials to be removed from storage compartment 32.

As is evident from FIG. 2A chamber 16b of front end housing 16 is completely separate from storage compartment 32. Furthermore, chamber 20b of rear end housing 16 is completely separate from storage compartment 32. Both of chamber 16b and chamber 20b are open to the air surrounding tank assembly 14. Storage compartment 32, on the other hand, is able to be sealed from contact with the air surrounding tank assembly 14 by covers 18f being engaged on manholes 18e and by valve assemblies 34 (FIG. 1) that are engaged with hoppers 22, 24, 26. Each valve assembly 34 is individually movable between an open position and a closed position. For example, with respect to first hopper 22, when the associated valve assembly 34 is moved to the open position, bulk material from interior space 22d of first hopper 22 is able to flow through opening 22c. When the associated valve assembly 34 is closed, bulk material can no longer flow out of opening 22c. An aerator 36 is also engaged with each the bottom end of each hopper 22, 24, 26. The aerators 36 are provided to selectively agitate the bulk materials stored in the associated hopper. The aerator 36 on a particular hopper, such as first hopper 22, will be actuated prior to opening the associated valve assembly 34. The aerator 36 will stir up the particulate materials within first hopper 22 and effectively fluidize them, thereby making it easier for the particulate materials to flow out through opening 22c when the associated valve assembly 34 is moved to the open position.

As shown in FIGS. 1 and 3, a strengthening assembly 38 is welded to the exterior surface of central section 18. Assembly 38 includes a plurality of inverted U-shaped ribs 38a, 38b, 38c, and 38d; a pair of horizontally oriented bars 38e and 38f (FIG. 3), and a plurality of gusset plates 38g. Typically, four generally triangular gusset plates 38g will be provided as part of strengthening assembly 38 with each gusset plate 38g being located where two adjacent hoppers are connected to each other. Gusset plates 38g also strengthen the area of the exterior of tank assembly 14 where the first and second plates 28, 30 are welded to upper wall 18a and the front and rear regions of the adjacent hoppers 22, 24 or 26.

Ribs 38a, 38b, 38c and 38d are welded to the exterior surface of upper wall 18a and are spaced at intervals longitudinally from each other. Ribs 38a-38d may be oriented at right angles to the longitudinal axis. Bars 38e, 38f are located on opposite sides 10e, 10f of trailer 10 and are welded to upper wall 18a, to ribs 38a-38d and to gusset plates 38g. As indicated above, each gusset plate 38g is located at the intersection of two adjacent hoppers, such as first hopper 22 and second hopper 24 or second hopper 24 and third hopper 26. Gusset plates 38g are welded to upper wall 18a, one of the ribs 38b or 38c and portions of the adjacent hoppers conical exterior walls. Each gusset plate 38g may be positioned exteriorly of the location where an end of first plate 28 or second plate 30 is welded to the upper wall 18a and associated hopper conical exterior walls. Strengthening assembly 38 is provided to help the exterior wall of tank assembly 14 withstand the stresses and strains placed on it during transportation of a load and during loading and unloading of the storage compartment 32.

Front end housing 16, central section 18, rear end housing 20, hoppers 22, 24, 26, strengthening assembly 38 amongst other components on tank assembly 14 may be formed primarily of a metal, for instance, an aluminum alloy or any other suitable metal.

Left and right sets of ground engaging wheels 40 may be rotatably mounted on tank assembly 14 about respective horizontal axially extending axles and via a suitable suspension assembly 42 which may be secured to rear end housing 20 and extend downwardly therefrom adjacent rear end 10b of trailer 10. Trailer 10 may include landing gear 44 generally adjacent front end 10a. Landing gear 44 may be any suitable type known in the art and may be configured to move between a lowered position (FIG. 1) in contact with the ground "G" for supporting front end 10a of trailer 10 when disconnected from the tractor or other towing vehicle; and a raised position (not shown) out of contact with the ground "G" when trailer 10 is hitched to the tractor/towing vehicle for over the road travel.

Tank assembly 14 may include a front frame 46, which may be referred to as a hitch mounting frame (for mounting hitch member 12 thereon), a landing gear mounting frame (for mounting landing gear 44 thereon) or a hitch and landing gear mounting frame (for mounting hitch member 12 and landing gear 44 thereon). Front frame 46 may be a rigid structure and may be formed primarily of an aluminum alloy or other suitable metal. Front frame 46 may be rigidly secured to and extend downward from a lower portion of front end housing 16 and front region 22a of first hopper 22. Tank assembly 14 and suspension assembly 42 may include a rear/suspension frame 48, which may be referred to as a wheel mounting frame on which wheels 40 are rotatably mounted. Rear suspension frame 48 may be a rigid structure and may be formed primarily of an aluminum alloy or other suitable metal. Rear suspension frame 48 may be rigidly secured to and extend downward from a lower portion of rear end housing 20 and a lower rear region 26b of third hopper 26.

An air piping system 50 is provided on trailer 10. Air piping system is provided to aid in the removal of the bulk load carried within storage compartment 32 of tank assembly 14. Air piping system 50 includes a plurality of different pipes, hoses, lines and valves (as will be discussed hereafter). Assembly 50 may be connected to an air/pneumatic pump or compressor (not shown) which may be mounted on the towing vehicle or tractor or elsewhere. The pump typically will be located upstream of air piping system 50 and storage compartment 32.

Air piping system 50 includes an air intake pipe 52 that may be selectively placed in fluid communication with the upstream pump. A hose (not shown) may be engaged with the pump at one end and with a first end 52a of air intake pipe 52 at the other end. A top air pipe 54 branches off air intake pipe 52 and a first valve 56 is engaged with top air pipe 54. Top air pipe 54 terminates in a blowdown pipe 58 and is in fluid communication therewith. A first branch 58a of blowdown pipe 58 extends upwardly from top air pipe 54 and first branch 58a terminates in the interior of storage compartment 32. First branch 58a of blowdown pipe 58 enters tank assembly 14 through inlet 18c (FIG. 2) defined in central section 18. A second branch 58b of blowdown pipe 58 enters front end housing 16 through inlet 16f and subsequently exits front end housing 16 through one of the openings 16c in a lower wall of front end housing 16. Second branch 58b terminates at an open end 58c (FIG. 2). A second valve 60 is engaged with second branch 58b of blowdown pipe 58.

First and second valves 56 and 60 may each be selectively and individually moved between an open position and a closed position. When first valve 56 is in the open position and second valve 60 is in the closed position, air may flow from air intake pipe 52, through top air pipe 54, through first branch 58a of blowdown pipe 58 and into storage compartment 32. The pump may be activated to pressurize storage compartment 32 by pumping air through top air pipe 54 and the first branch 58a of blowdown pipe 58 and into the interior of storage compartment 32. Storage compartment 32 is pressurized from the top to push particulate material out of the openings in the bottom end of the hoppers as will be discussed later herein. Air is pumped into storage compartment 32 until the pressure is in the range of about 10-15 Psi. The cross-hatching used in FIG. 2A indicates the parts of tank assembly 14 that are pressurized in this manner. As is evident from FIG. 2, only storage compartment 32 is pressurized. Front end housing 16 and rear end housing 20 are open to the atmosphere because of the openings 16c and 20c respectively. Both of front end housing 16 and rear end housing 20 are therefore under atmospheric pressure. There is therefore a pressure differential across all of the walls that define and bound storage compartment 32. That pressure differential is the difference between atmospheric pressure outside of storage compartment 32 and the increased pressure inside storage compartment 32.

When first valve 56 is moved to the closed position, air no longer can flow through top air pipe 54, through first branch 58a of blowdown pipe 58 and into storage compartment 32. When first valve 56 is in the closed position and second valve 60 is also in the closed position, air pressure within storage compartment 32 remains substantially constant. If it is desired to depressurize storage compartment 32, first valve 56 is maintained in the closed position and second valve 60 is moved to the open position. This allows air to flow out of storage compartment 32, through first branch 58a of blowdown pipe 58, through second branch 58b of blowdown pipe 58 and out of the open end 58c thereof and into the air below tank assembly 14.

Referring still to FIG. 1, air piping system 50 further includes an aerator supply pipe 62 that originates at 62a in air intake pipe 52 and connects to aerators 36 engaged with the bottom ends of each of the first, second and third hoppers 22, 24, 26 and terminates in an end 62b. When one of the aerators 36 is activated, air will flow through aerator supply pipe 62 and into the chamber of the associated hopper 22, 24 or 26 to stir up the bulk material in the chamber. This helps to fluidize the bulk material so that is more readily able to flow out of an opening at the bottom of the associated hopper 22, 24 or 26.

Air piping system 50 further includes a discharge pipe 64 that originates in air intake pipe 52. A discharge valve 66 is engaged with air intake pipe 52 proximate a first end 64a thereof and discharge valve 66 is movable between an open position and a closed position. Discharge pipe 64 is also engaged with the valve assemblies 34 located at the bottom end of each of the first, second and third hoppers 22, 24, and 26. Each valve assembly 34 is selectively movable between an open position and a closed position. Discharge pipe 64 terminates in an open end 64b that is located at a rear end 10b of trailer 10. When one of the valve assemblies 34 is moved to the open position, the chamber of the associated hopper 22, 24 or 26, and thereby storage compartment 32, is placed in fluid communication with discharge pipe 64. When the valve assembly 34 is moved to the closed position then fluid communication between discharge pipe 64 and the chamber of the associated hopper 22, 24 or 26 and thereby with storage compartment 32 is broken.

When discharge valve 66 is in the open position, discharge pipe 64 is placed in fluid communication with air intake pipe 52 and air may flow from the pump through air intake pipe 54 and through discharge pipe 64 under pressure.

If the valve assembly 34 associated with first hopper 22, for example, is moved to the open position, bulk material will flow out of the storage compartment 32 through the valve assembly 34 of first hopper 22 and into discharge pipe 64. The pressurized air flowing through discharge pipe 64 will entrain some of the bulk material and cause the bulk material to flow through discharge pipe 64 and out of open end 64b.

PRIOR ART trailer 10 is used in the following manner. When trailer 10 arrives at a facility to be loaded with particulate bulk material, trailer 10 is positioned so that at least one of manholes 18e is located directly under an opening of a loading hose or pipe. Cover 18f of the at least manhole 18e is removed and dry, particulate, bulk material is loaded into storage compartment 32 through the at least one manhole 18e. Cover 18f is then replaced on each of the at least one manhole 18e to seal storage compartment 32. Trailer 10 is then driven across the roads to a second facility where the bulk particulate material is to be delivered.

The operator will connect a hose from a storage bin at the second facility to end 64b of discharge pipe 64. Discharge valve 66 is moved to the closed position if it is not already in that position. First and second valves 56 and 60 are also placed in the closed position if they were not already in that position. A hose is connected from a pump to first end 52a of air intake pipe 52 and the pump is actuated. Air flows through air intake pipe 52 and because discharge valve 66 is closed, the air will flow through aerator supply pipe 62. In one example method, a first one of the aerators 36 is activated to agitate the particulate material within the associated hopper 22, 24 or 26. Air will therefore flow from air intake pipe 52 through the activated aerator 36 and into the chamber of the associated hopper 22, 24 or 26. When the aerator 36 has been running for a few minutes, discharge valve 66 is moved to the open position and the valve assembly 34 on the hopper 22, 24 or 26 that has been aerated will be moved to the open position. (The aerator 36 will be deactivated prior to or after the valve assembly 34 on that hopper has been moved to the open position.) The first valve 56 may also be moved to the open position so that air flows in to the upper end of storage compartment 32 to pressurize storage compartment 32. The bulk material in the opened hopper 22, 24 or 26 flows out through the opened valve assembly 34 and into the discharge pipe 64. The air flowing through discharge pipe 64 picks up the bulk material from the hopper and carries it through the discharge pipe 64, out of the open end 64b, and into and through the hose connected to the storage tank in the second facility.

When substantially all of the loose material in the opened hopper has flowed into the discharge pipe 64 the valve assembly 34 associated with that opened hopper will be closed as will the discharge valve 66. The aerator 36 engaged with another one of the hoppers will be activated and the process will be repeated until that hopper is substantially emptied. The steps will be repeated once again for the final hopper. When substantially all of the bulk material has been removed from the storage compartment 32 through the three hoppers 22, 24, 26, discharge valve 66 will be kept in the open position so that air continues to flow through discharge pipe 64. The operator will leave first valve 56 in the open position for a while to ensure that air continues to be moved from air intake pipe 52 through top air pipe 54, through blowdown pipe 58 and into storage compartment 32. The air flowing into storage compartment 32 through blowdown pipe 58 will help dislodge any material that remains in any of the hoppers 22, 24, 26. That dislodged material will flow into the discharge pipe 64 and through open end 64b thereof and into the hose connected to end 64b.

First valve 56 will then be closed and second valve 60 will be opened to depressurize storage compartment 32. The pump will be switched off, all valves 56, 60 and 66 will be closed and the hoses engaged with first end 52*a* of air intake pipe 52 and with end 64*b* of discharge pipe 64 will be disengaged. Trailer 10 is then free to travel back to the loading facility to take on its next load.

It will be understood that in other example methods of emptying a load from trailer 10, more than one of the aerators and more than one of the hoppers may be opened at the same time instead of opening the aerators and hoppers in sequence one at a time. In some example methods, the rearmost hopper (i.e., hopper 26 in the PRIOR ART figures) may be opened first and then the middle hopper (second hopper 24) and then the first hopper 22. In other example methods, the hoppers may be opened in the opposite sequence starting with the first hopper 22, then the second hopper 24 and finally the third hopper 26.

Figure 4:
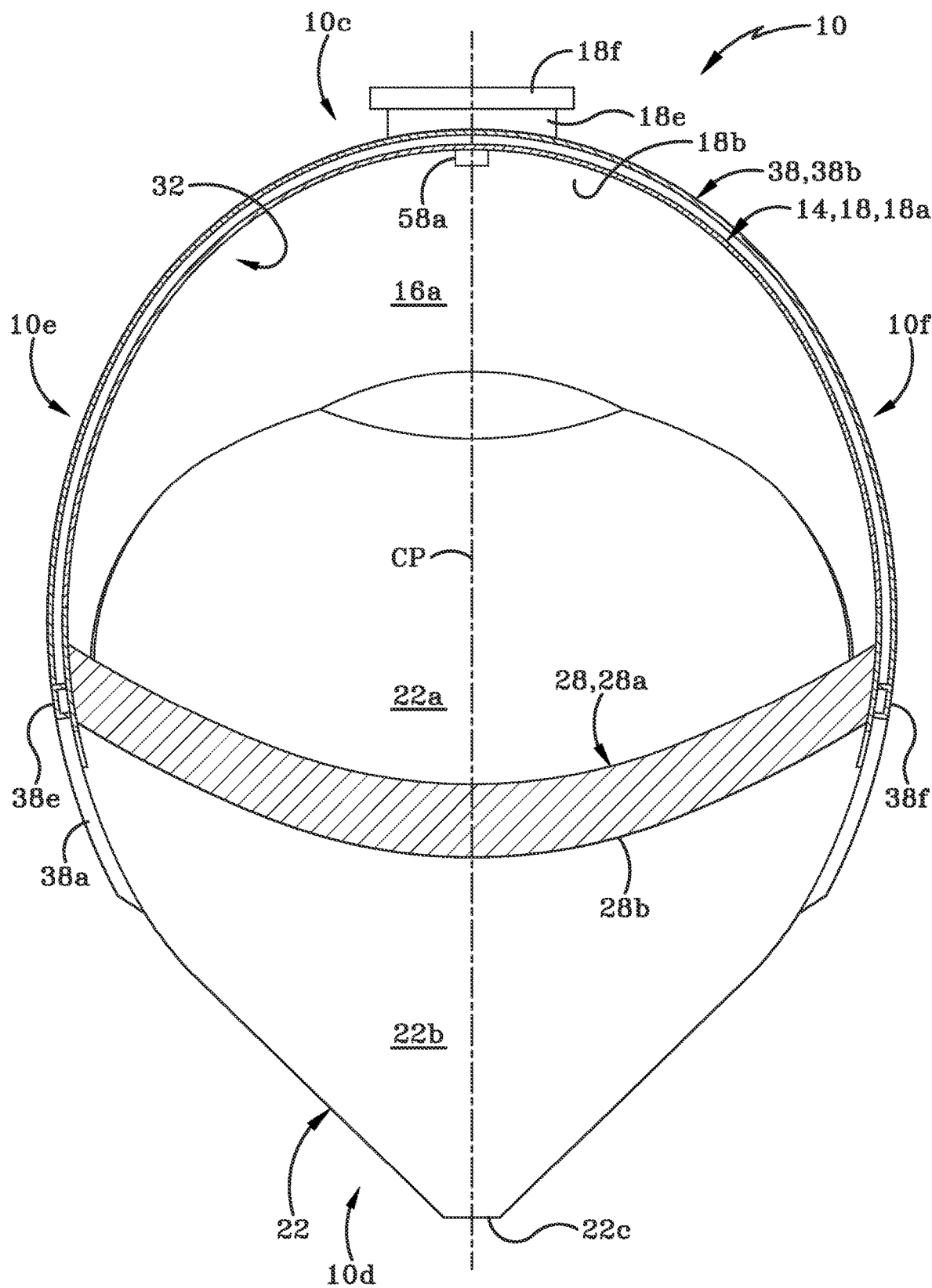
FIG. 4 is a lateral cross-section of the PRIOR ART dry bulk tank taken along line 4-4 of FIG. 1 with several components omitted for clarity of illustration.

One of the issues with PRIOR ART tank trailers such as bulk tank trailer 10 is that the regions of the trailer where the hoppers 22, 24, 26 join the upper wall 18 and where adjacent hoppers are joined to each other tend to experience high stress when the storage compartment 32 is pressurized. This is particularly true because trailer 10 is generally elliptical in shape (or generally ovoid) as can be seen in FIGS. 3 and 4. The stresses are particularly high where the conical wall of each hopper 22, 24, 26 joins the upper wall 18. The regions where the conical wall of each hopper 22, 24, 26 joins upper wall 18*a* may experience pressures in the range of about 15 Psi because of the internal pressure in storage compartment 32. Still further, there may be quite a lot of relative movement between the generally elliptical upper wall 18 and the hoppers 22, 24, 26 and the ribs 38. In order to help tank assembly 14 to withstand these stresses due to pressure and to stabilize the component parts of the trailer against too much relative movement, strengthening assembly 38 is provided. Ribs 38*a*-38*d*, bars 38*e*, 38*f*, plates 38*g* and first and second plates 28, 30 and the relatively thick exterior wall are provided to ensure tank assembly 14 can withstand the pressurization of storage compartment 32.

FIGS. 5-9 illustrate a tank trailer in accordance with the present invention, generally indicated at 100. Trailer 100 is similar to the PRIOR ART trailer 10 in some respects but is also very different in other respects. The differences between the PRIOR ART trailer 10 and trailer 100 will be described in detail hereafter.

Figure 5:
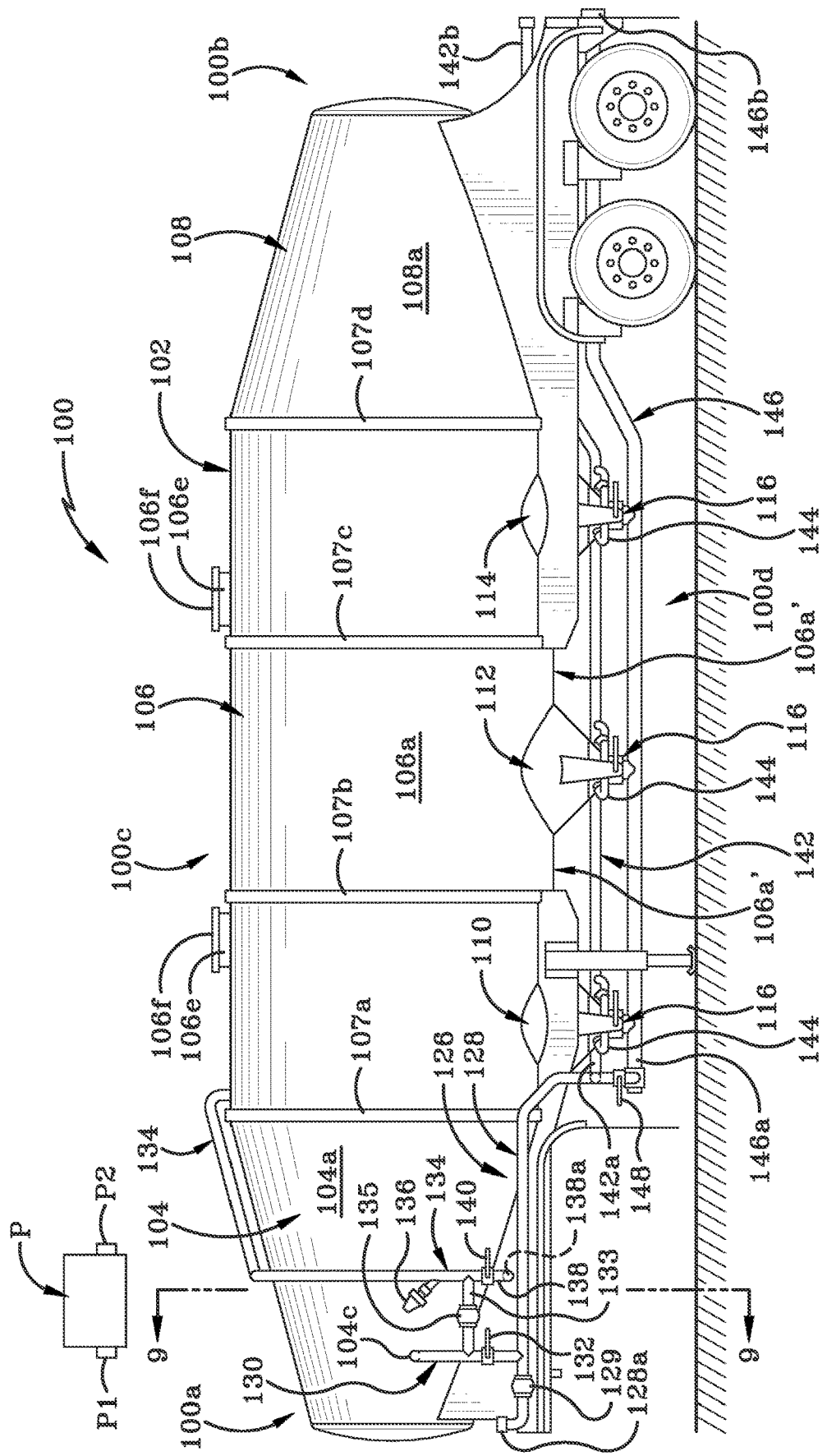
FIG. 5 is a side elevational view of a dry bulk tank in accordance with the present disclosure.

Trailer 100 has a front end 100*a*, a rear end 100*b*, a top end 100*c*, a bottom end 100*d*, a left side 100*e* (FIG. 7) and a right side 100*f*. Trailer 100 like PRIOR ART trailer 10 comprises a tank assembly 102 that includes a front end housing 104, a central section 106 and a rear end housing 108. However, as is most evident when comparing FIGS. 3 and 7, trailer 100 is generally circular in lateral cross-section while PRIOR ART trailer 10 is generally elliptical or ovoid in lateral cross-section. As illustrated in FIG. 5, trailer 100 may be mounted on a frame that includes left and right sets of ground engaging wheels similar to wheels 40. The wheels are mounted to a frame of tank assembly 102 and are rotatable about respective horizontally extending axles. The wheels are engaged to the frame via a suitable suspension assembly (similar to suspension 42) that may be secured to rear end housing 108 and extend downwardly therefrom adjacent rear end 100*b* of trailer 100. Trailer 100 may include landing gear (similar to landing gear 44) generally adjacent front end 100*a*. The landing gear may be any suitable type known in the art and may be configured to move between a lowered position (FIG. 5) in contact with the ground for supporting front end 100*a* of trailer 100 when disconnected from the tractor or other towing vehicle; and a raised position (not shown) out of contact with the ground when trailer 100 is hitched to the tractor/towing vehicle for over the road travel.

Front end housing 104 is located proximate front end 100*a* of trailer, central section 106 extends longitudinally rearwardly from front end housing 104 and rear end housing 108 extends longitudinally rearwardly from central section 106. Front end housing 104, central section 106 and rear end housing 108 are aligned along a longitudinal axis of trailer 100. A rib assembly is welded to an exterior surface of central section 106. The rib assembly 107 includes a plurality of ribs 107*a*, 107*b*, 107*c*, 107*d* that are spaced at intervals longitudinally from each other along central section 106. The ribs 107*a*, 107*b*, 107*c*, 107*d* may be substantially parallel to each other. Some or all of ribs 107*a*-107*d* may be circumferential in nature and may circumscribe substantially the entire circumference of central section 106. Others of ribs 107*a*-107*d* may not extend the entire way around the circumference of central section 106. Ribs 107*a*-107*d* are oriented at right angles to the longitudinal axis of tank assembly 102 (where the longitudinal axis extends between front end 100*a* and rear end 100*b*). Ribs 107*a*-107*d* are provided to strengthen central section 106.

Trailer 100 may have an imaginary axial center plane CP (FIGS. 7 and 8) which may be a vertical longitudinally extending plane cutting through the center of trailer 100 midway between the left and right sides 100*e* and 100*f* thereof. The circumferential ribs of rib assembly 107 are oriented at right angles to the longitudinal plane. As is readily evident from the Figures, various components may be axially offset or spaced from center plane CP. The description of trailer 100 may make reference to certain components, sides, surfaces, points and the like as being inboard or outboard of one another, or this may be readily apparent from the Figures even without specific description. Such terms typically relate to the left or right halves of trailer 100 whereby, for instance, with regard to the left half (left of central plane CP), a first point which is outboard of a second point is further to the left than the second point or further outboard than the second point in a first or left outboard direction, and thus the second point is inboard of or to the right of the first point. Thus, within the left half, the first point is further outboard or further from center plane CP than is the second point. Likewise, with regard to the right half (right of central plane CP), a third point which is outboard of a fourth point is further to the right than the fourth point or further outboard than the fourth point in a second or right outboard direction, and thus the fourth point is inboard of or to the left of the third point. Thus, within the right half, the third point is further outboard or further from center plane CP than is the fourth point.

Various surfaces may be said to face axially inward or axially outward, which may respectively mean facing generally toward or away from the imaginary center plane CP. Thus, on the left half of trailer 10, a surface which faces axially inward may be said to face generally to the right or rightward, and a surface which faces axially outward may be said to face generally to the left or leftward. On the right half of trailer 10, a surface which faces axially inward may be said to face generally to the left or leftward, and a surface which faces axially outward may be said to face generally to the right or rightward.

Similarly, various components, surfaces etc. may be said to extend axially inward or axially outward, which may respectively mean extending generally toward or away from center plane CP. Thus, on the left half of trailer 100, a component that extends axially inward may be said to extend generally to the right or rightward, and a component that extends axially outward may be said to extend generally to the left or leftward. On the right half of trailer 10 a component that extends axially inward may be said to extend generally to the left or leftward, and a component etc. which extends axially outward may be said to extend generally to the right or rightward.

Further explanation is provided with respect to references to the longitudinal direction of trailer 100. Certain components of trailer 100 are further forward or rearward of other components, or may be at the same location along a longitudinal axis (where the longitudinal axis extends between front end 100a and rear end 100b. Thus, for example, a reference to two points, surfaces, components or the like being "at the same longitudinal position" or "at the same longitudinal location" means that the two points, surfaces, components or the like are at the same position along the longitudinal axis while they may be at different axial positions, that is, spaced to the left or right of one another, or spaced upwardly or downwardly of one another. Similarly, a reference to two points, surfaces, components or the like being "longitudinally adjacent" one another means that the two points, surfaces, components or the like are at or adjacent the same position along the longitudinal axis while they may be at different axial positions or spaced upwardly or downwardly of one another. It is also noted that the term U-shaped or U-shaped configuration may be used herein to mean an upright U-shape or U-shaped configuration and the term inverted U-shaped configuration may be used herein to mean an upside down U-shaped configuration.

Figure 6:
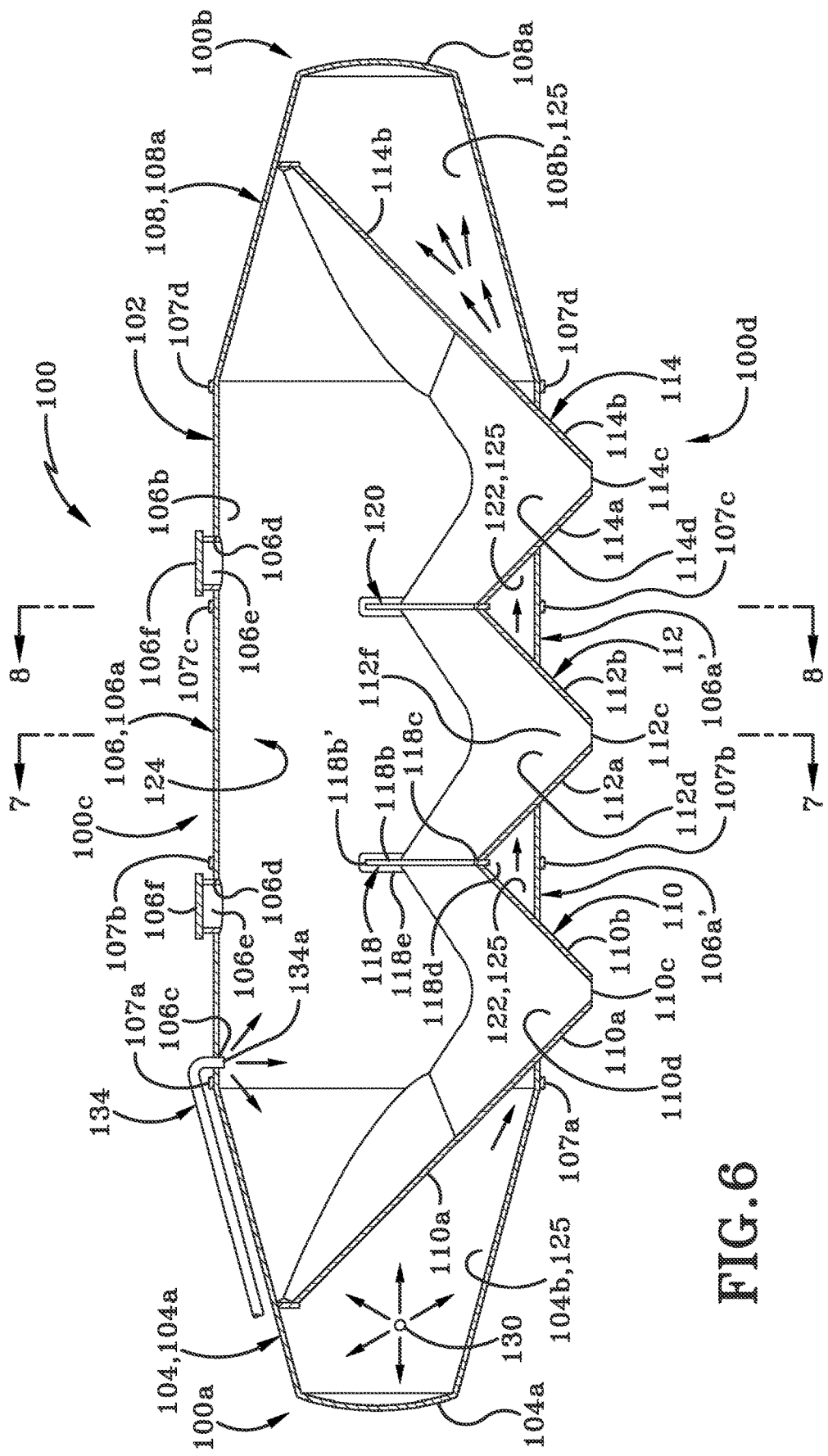
FIG. 6 is a longitudinal cross-section taken along line 6-6 of FIG. 5 and showing the openings for piping used to pressurize the front end housing and bulk material carrying region.
Figure 7:
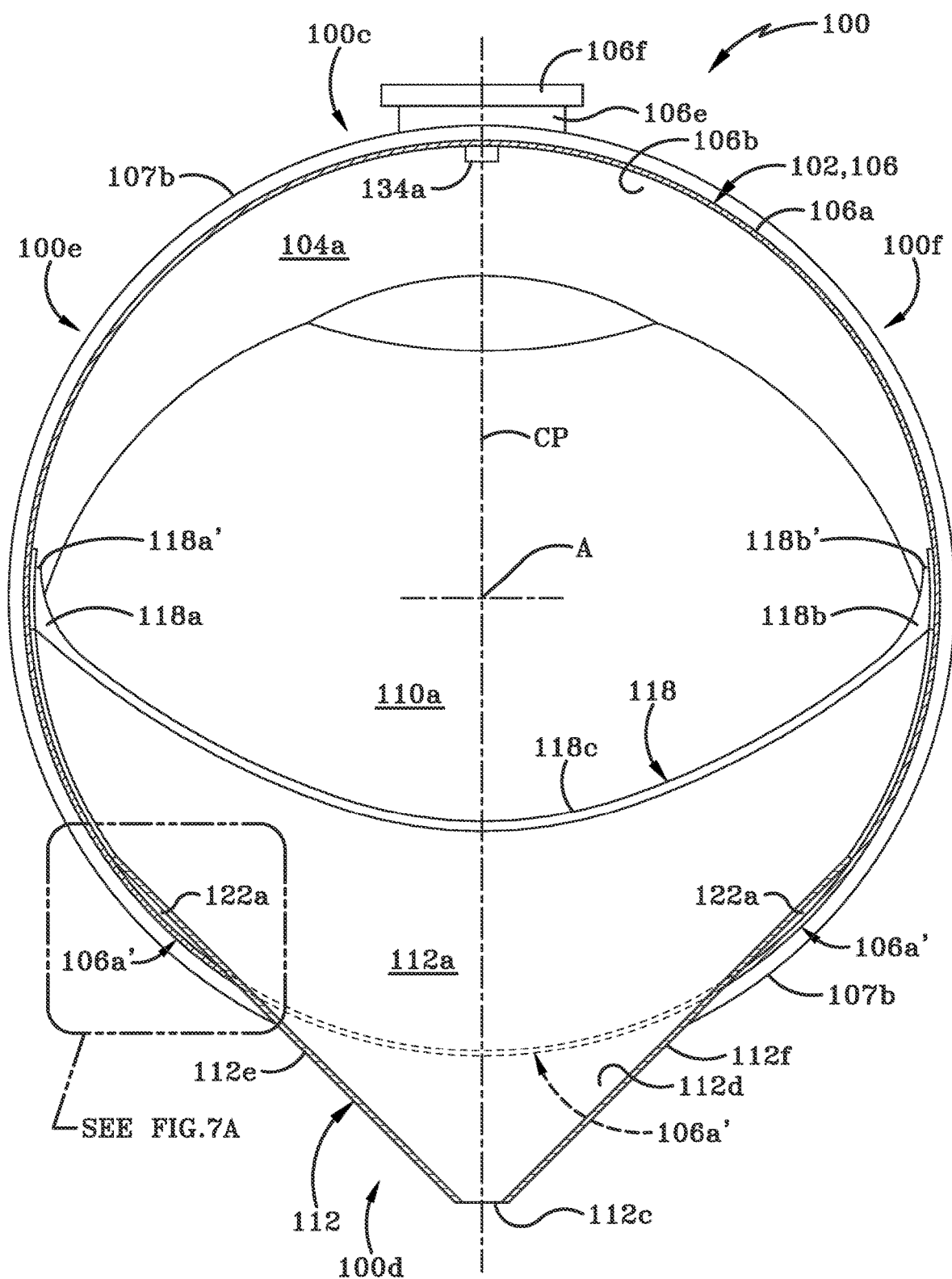
FIG. 7 is a lateral cross-section of the dry bulk tank taken along line 7-7 of FIG. 6.

Referring to FIGS. 6 and 7, front end housing 104 includes an exterior wall 104a that bounds and defines a front chamber 104b. However, unlike the PRIOR ART front end housing 16, front end housing 104 of trailer 100 does not include any openings in the exterior wall 104a that will allow air to flow directly between the front chamber 104b and the air surrounding the exterior of trailer 100. (This is in contrast to PRIOR ART front end housing 16 which has a plurality of openings 16c that permit fluid communication between the air surrounding trailer 10 and chamber 16b.) Because front end housing 104 lacks openings similar to openings 16c, front end housing 104 is sealed off from the atmosphere surrounding the tank assembly 102. An inlet 104c (FIGS. 5, 6, 7 and 9) is defined in the exterior wall 104a and the purpose of this inlet 104c will be discussed in greater detail later herein.

It will be understood that in some instances the front chamber 104b may be comprised of two or more chambers that are in fluid communication with each other but which are sealed from fluid communication with the air surrounding trailer 100. The front chamber 104b is illustrated as a single chamber for clarity of illustration only.

Central section 106 includes a circular exterior wall 106a. As indicated previously herein the exterior wall 106a gives the tank assembly 102 a circular lateral cross-sectional shape when tank assembly 102 is viewed either end 100a, 100b. Exterior wall 106a bounds and defines a generally circular interior space 106b. An inlet 106c is defined in a top region of exterior wall 106a proximate the top 100c of trailer 100. Inlet 106c may enter a top region of exterior wall 106a in central section 106 as shown in the illustrated embodiment in which case inlet 106c is in fluid communication with first compartment 124. In other embodiments, the inlet may be defined in a top region of the front end housing 104. As is evident from FIG. 6 an interior wall separates the first compartment 124 from front chamber 104b defined by front end housing 104. In this instance, inlet 106c may be is in fluid communication with first compartment 124 even though it appears from the exterior of the tank assembly 102 that inlet 106c enters front end housing 104.

The top region of exterior wall 106a also defines one or more manhole openings 106d therein. Inlet 106c and manhole openings 106d are in fluid communication with interior space 106b. Manholes 106e extend upwardly and outwardly from the top region of exterior wall 106a and covers 106f are selectively engageable with manholes 106ee. When covers 106f are removed then the manhole openings 106d and thereby interior space 106b are in fluid communication with the air surrounding trailer 100. When covers 106f are engaged on manholes 106e then interior space 106b is no longer in fluid communication with the air surrounding trailer 100. In the figures, inlet 106c is shown located forwardly of the forwardmost manhole 106e but it will be understood the inlet 106c may be provided in any suitable location on exterior wall 106a. The purpose of inlet 106c will be described later herein.

Rear end housing 108 includes an exterior wall 108a that defines a rear chamber 108b. However, unlike the PRIOR ART rear end housing 20, rear end housing 108 of trailer 100 does not include any openings in the exterior wall 108a that will allow air to flow between the rear chamber 108b and the air surrounding the exterior of trailer 100. (PRIOR ART rear end housing 20 has a plurality of openings 20c that permit fluid communication between the air surrounding PRIOR ART trailer 10 and chamber 20b.) Rear end housing 108 is therefore sealed off from the atmosphere.

It will be understood that in some instances the rear chamber 108b may be comprised of two or more chambers that are in fluid communication with each other but which are sealed from fluid communication with the air surrounding trailer 100. The rear chamber 108b is illustrated as a single chamber for clarity of illustration only.

Trailer 100, like the PRIOR ART trailer 10 includes one or more hoppers that extend downwardly from exterior wall 106a and form part of central section 106. Trailer 100 is illustrated as including a first hopper 110, a second hopper 112, and a third hopper 114. (It will be understood that fewer than three hoppers or more than three hoppers may be provided on trailer 100.)

As best seen in FIGS. 2 and 2A the conical exterior wall of first hopper 110 includes a front region 110a and an opposed rear region 110b. An opening 110c is defined at a bottom end of the conical exterior wall. The conical exterior wall of first hopper 110 bounds and defines an interior space 110d and opening 110c is in fluid communication with interior space 110d. A valve assembly 116 (FIG. 5) is provided at a bottom end of first hopper 110 and valve assembly 116 is movable between an open position and a closed position. Valve assembly 116 (FIG. 5) is moved to the closed position to retain materials within first hopper 110 and is moved to the open position to allow materials to flow through opening 110c and out of first hopper 110. Front region 110a of the conical exterior wall of first hopper 110 angles forwardly and upwardly and is welded at its uppermost end to an interior surface of the top region of exterior wall 106a. The front region 110a forms a rearmost wall of front end housing 104.

Figure 6A:
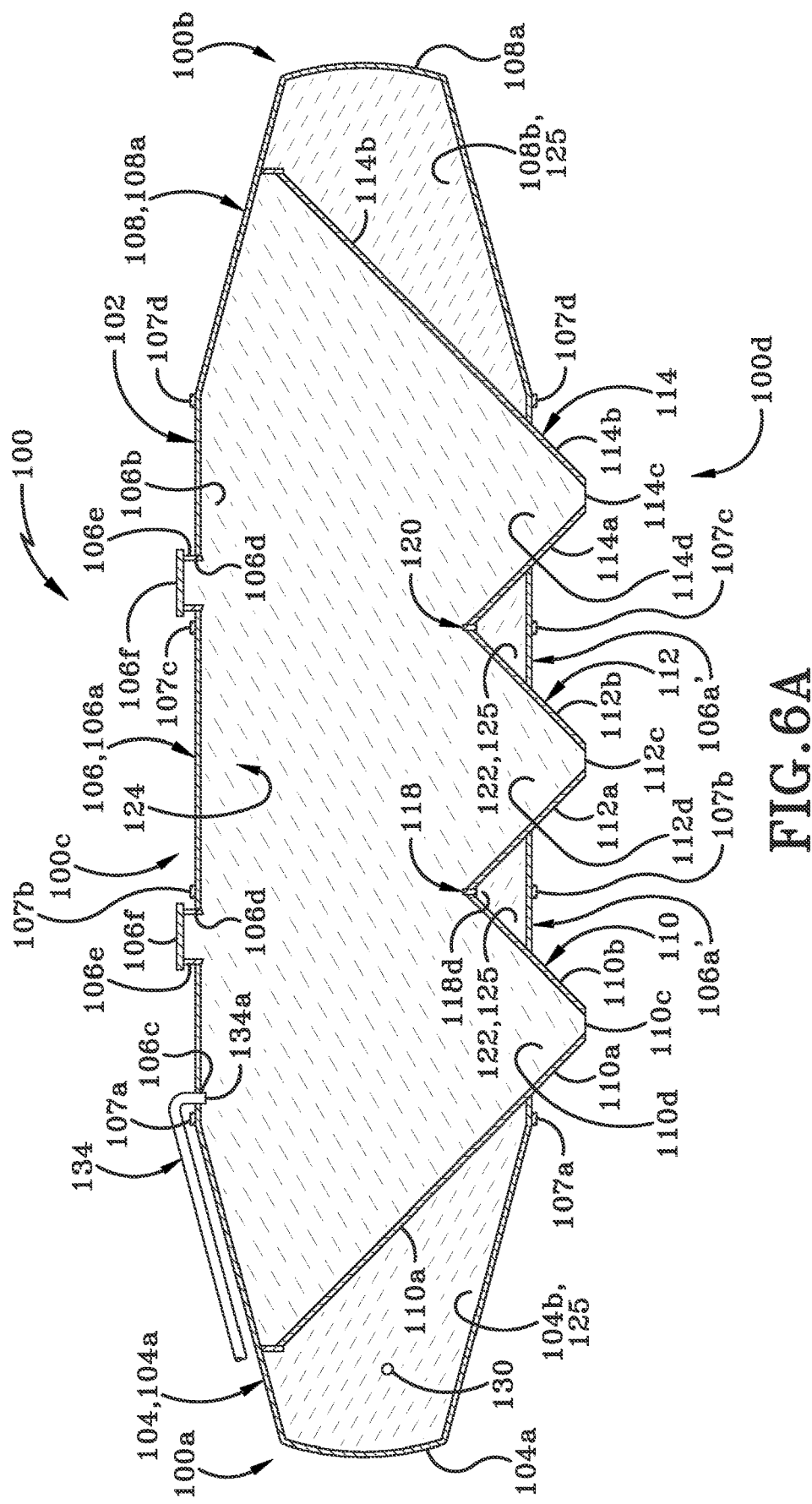
FIG. 6A is a longitudinal cross-section of the dry bulk tank showing the pressurization of the front end housing and bulk material carrying region and the flow of air from the pressurized front end housing through the lower chamber to the rear end housing.
Figure 7A:
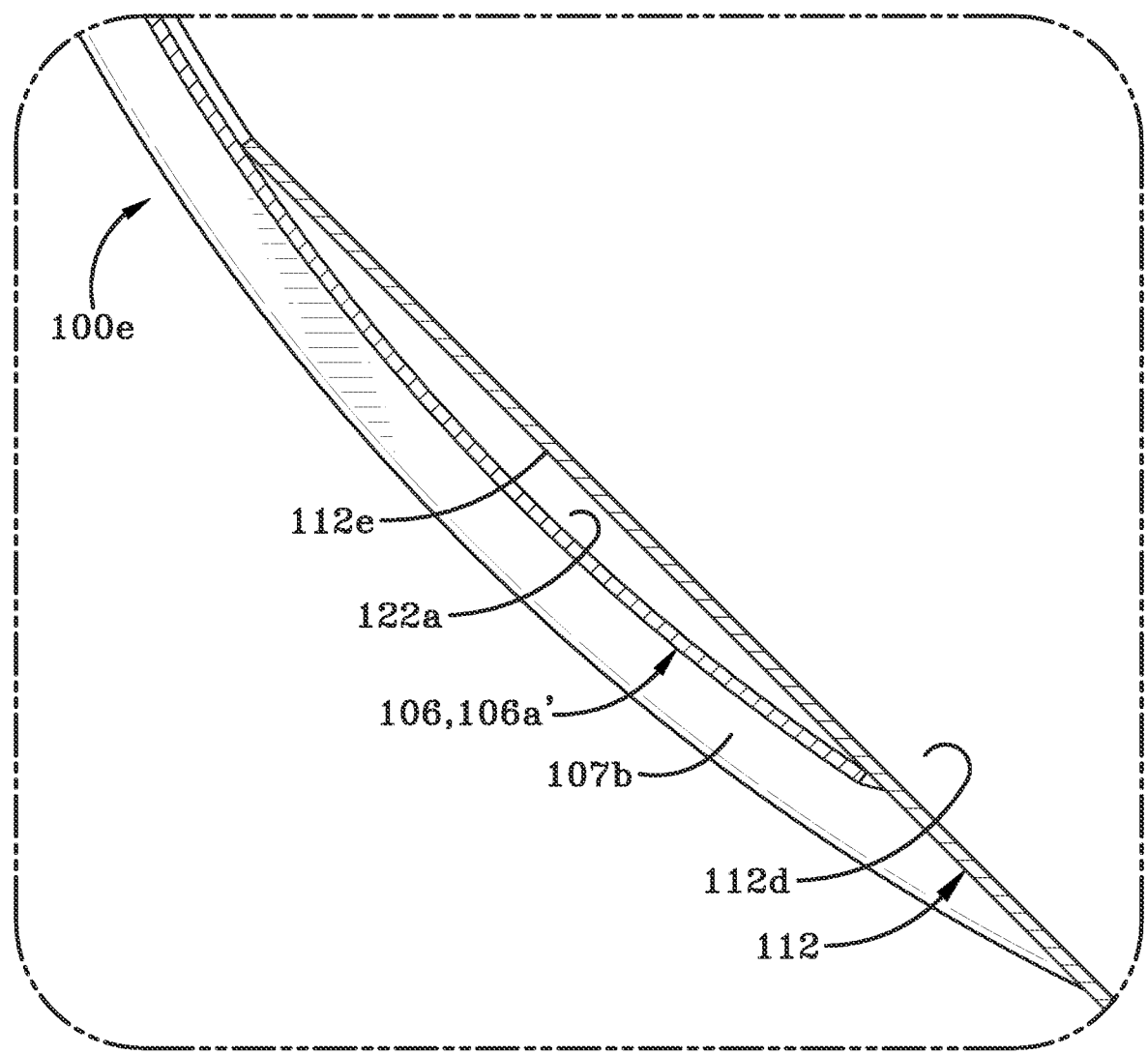
FIG. 7A is an enlargement of the highlighted region of FIG. 7.

Referring still to FIGS. 6 and 6A, the conical exterior wall of second hopper 112 includes a front region 112a and a rear region 112b and an opening 112c is defined in the bottom end of the conical wall. The conical exterior wall of second hopper 112 also includes side regions 112e (FIGS. 7 and 7A)

and 112f that extend between front region 112a and rear region 112b. The conical exterior wall of second hopper 112 bounds and defines an interior space 112d and opening 112c is in fluid communication with interior space 112d. A valve assembly 116 (FIG. 5) is provided at a bottom end of second hopper 112 and valve assembly 116 is movable between an open position and a closed position. Valve assembly 116 (FIG. 5) is moved to the closed position to retain materials within second hopper 112 and is moved to the open position to allow materials to flow through opening 112c and out of second hopper 112.

The conical exterior wall of third hopper 114 includes a front region 114a and a rear region 114b. An opening 114c is defined in the bottom end of the conical wall. The conical exterior wall of third hopper 114 bounds and defines an interior space 114d and opening 114c is in fluid communication with interior space 114d. A valve assembly 116 (FIG. 5) is provided at a bottom end of third hopper 114 and valve assembly 116 is movable between an open position and a closed position. Valve assembly 116 (FIG. 5) is moved to the closed position to retain materials within third hopper 114 and is moved to the open position to allow materials to flow through opening 114c and out of third hopper 114. Rear region 114b of third hopper 114 extends upwardly and rearwardly from the bottom 100d of trailer 100 to the interior surface of a top region of exterior wall 106a. Rear region 114b is welded to the interior surface of exterior wall 106a and forms a rearmost wall of central section 106 and a frontmost wall of rear end housing 108.

Referring to FIGS. 6-8, an upper end of rear region 110b of first hopper 110 and an upper end of front region 112a of second hopper 112 may be welded to each other and to a first interior rib 118. As shown in FIG. 8, first interior rib 118 extends transversely across the interior of tank assembly 14 and is oriented at right angles to the longitudinal axis of tank assembly 102. First interior rib 118 includes a first wing 118a and a second wing 118b that are connected together by a concavely curved bar 118c. First and second wings 118a, 118b taper in width from a widest region proximate bar 118c to a terminal end 118a' or 118b' respectively. It should be noted that a portion of each of the first wing 118a and second wing 118b extends for a distance upwardly beyond a center point "A" of the circular-shaped exterior wall 106a of central section 106. A space 118d is defined between bar 118c and the bottom interior surface of central section 106. Air is thus able to flow through space 118d from a region on a front-facing side of interior rib 118 through to a region on a rear-facing side of interior rib 118. A weld pad 2 may be interposed between each of the first and second wings 118a, 118b and the interior surface of the exterior wall 106a of central section 106.

A second interior rib 120 that is substantially identical to first interior rib 118 is located between second hopper 112 and third hopper 116. Second interior rib 120 serves the same purpose as first interior rib 118, namely, to strengthen the exterior wall while still permitting air to flow from front end housing 104 to rear end housing 108 and under central section 106.

It should be noted that where first hopper 110 and second hopper 112 are joined together, one of the ribs, namely rib 107b, is welded to the exterior surface of exterior wall 106a of central section 106 and first interior rib 118 is welded to the interior surface of exterior wall 106a. A portion of the exterior wall 106a is thus sandwiched between rib 107b and first interior rib 118. Similarly, where second hopper 112 joins third hopper 114, one of the ribs, namely rib 107c, is welded to the exterior surface of exterior wall 106a and second interior rib 120 is welded to the interior surface of exterior wall 106a. This arrangement ensures a structurally sound connection between adjacent hoppers 110, 112, 114.

A comparison between FIG. 1 which shows the PRIOR ART trailer 10 and FIG. 5 which shows the trailer 100 in accordance with the present disclosure reveals a number of things. Firstly, trailer 100 includes rib assembly 107 that comprises a plurality of circumferential ribs (i.e. circular ribs), namely ribs 107a-107d, instead of the inverted U-shaped ribs 38a-38d and horizontal bars 38e of strengthening assembly 38 provided on the PRIOR ART trailer 10.

Secondly, the first and second ribs interior 118 and 120 are located completely within the interior of the tank assembly 102. No portion of first interior rib 118 or second interior rib 120 extends outwardly beyond the bottom region of the exterior "skin" of the trailer 100. This is different to the PRIOR art trailer 10 where a portion of each of the first plate 28 and the second plate 30 extends downwardly for a distance below the bottom region of the exterior "skin" of trailer 10.

Thirdly, most of each of the first, second and third hoppers 110, 112, 114 of the trailer 100 are located inside the exterior wall 106a of trailer 100. Consequently, only small portions of the conical walls of the first, second and third hoppers 110, 112, 114 forms part of the exterior "skin" of trailer 100. By contrast, in the PRIOR ART trailer 10, most of each of the first, second and third hoppers 22, 24, 26 extends from the upper wall 18a and the conical walls of the hopper form part of the exterior "skin" of the trailer 10.

Fourthly, a part 106a' (FIGS. 5-8) of the exterior wall 106a of central section 106 extends around the outside of the conical walls of each of the first, second and third hoppers 110, 112, 114. For example, as can be seen in FIGS. 7 and 7A, part of the exterior wall 106a' is spaced a distance outwardly from side regions 112e and 112f of second hopper 112 such that a gap 122a is defined therebetween. Another part of the exterior wall 106a' extends between adjacent hoppers (such as between first hopper 110 and second hopper 112; and between second hopper 112 and third hopper 114). The lower portions of each hopper 110, 112, 114 thus extend outwardly from the part 106a' of exterior wall 106a. A middle chamber 122 (FIGS. 6 and 7) is therefore defined between the conical walls of first, second and third hoppers 110, 112, 114 and the part 106a' of exterior wall 106a. Gap 122a forms part of this middle chamber 122. Middle chamber 122 thus not only surrounds part of the exterior surface of the conical wall of each hopper but also extends between front end housing 104 and rear end housing 108. Front chamber 104b of front end housing 104 and rear chamber 108b of rear end housing 108 are thus placed in fluid communication with each other by middle chamber 122 (including gaps 122a). Front chamber 104b, middle chamber 122 and rear chamber 108b together form a second compartment 125 that is a sealed single chamber that is not in fluid communication with the air outside of trailer 100. By contrast, in the PRIOR ART trailer 10 there is no component similar to the middle chamber 122 of trailer 100 and in trailer 10 the chamber 16b and chamber 20b are discrete and separate and are not in fluid communication with each other. Furthermore, neither of the chamber 16b nor chamber 20b is sealed but both are, instead, open to the outside atmosphere.

Because front chamber 104b, middle chamber 122 and rear chamber 108b are in fluid communication with each other, when front chamber 104b is pressurized (as is shown in FIG. 6 and as will be described later herein), air flows from front chamber 104b through middle chamber 122 and into rear chamber 108b. This air flow is indicated by the arrows indicating airflow from the front of trailer 100 towards the rear thereof.

Referring to FIGS. 6 and 6A, interior space 106b defined by exterior wall 106a, interior space 110d defined by first hopper 110, interior space 112d defined by second hopper 112 and interior space 114d defined by third hopper 114 form a first compartment 124 for tank assembly 102. First compartment 124 is suitable for carrying dry bulk materials therein. The one or more manholes 106e provide a way for dry bulk materials to be loaded into first compartment 124 and the openings 110c, 112c, 112d provide a way for those dry bulk materials to be removed from first compartment 124.

An air piping system 126 is provided on trailer 100. Air piping system 126 is provided to aid in the removal of the bulk load carried within first compartment 124 of tank assembly 14. Air piping system 126 is also used to pressurize first compartment 124 and second compartment 125 (formed by front chamber 104b, middle chamber 122 and rear chamber 108b), as will be later described herein. The second compartment 125 effectively forms part of the air piping system 126 in that second compartment 125 acts as a conduit that permits movement of air between front end housing 104 and rear end housing 108 through middle chamber 122. Second compartment 125 therefore aids in circulating air within tank assembly 102, particularly providing a conduit that is located at least partially beneath first compartment 124. As has been discussed herein, first and second compartments 124, 125 share a common wall and air piping system 126 is provided to pressurize the air on both sides of that common wall.

Air piping system 126 provides the functions of aerating the bulk material within first compartment 124 and flushing that bulk material out of the hoppers 110, 112, 114 when tank assembly 102 is unloaded. Air piping system 126 may be utilized to pressurize first compartment 124 in order to apply downward pressure on the load of dry bulk material retained within the first compartment 124 in order to aid in the removal of bulk material from first compartment 124. Air piping system 126 simultaneously pressurizes the second compartment 125 for a number of purposes. Firstly, the substantial equalization of air pressure in first and second compartments 124, 125 helps to reduce some of the stresses and strains on the joints between the various material sections that form tank assembly 102. This may tend to increase the life of tank assembly 102. Secondly, the substantial equalization of pressure helps reduce relative movement between the various sections of the tank assembly 102. Substantial pressure equalization between first and second compartments 124, 125 may particularly help to reduce relative movement between adjacent sections of the tank assembly 102, which are joined together by a joint. In PRIOR ART trailers, there could be relative movement between adjacent sections of the tank assembly 102 in the amount of about one quarter of an inch. With the introduction of the substantial pressure equalization in first and second compartments 124, 125 as disclosed herein, the relative movement between adjacent sections of the tank assembly 102 (and tank assembly 202 as described later herein) has been reduced down to a few thousandths of an inch, for example around fifteen-thousandths of an inch movement would be typical. Because of the reduction in possible relative movement in the tank assembly 102 during loading and unloading because of the substantial equalization of pressure in first and second compartments 124, 125, the aluminum typically used to fabricate this type of tank assembly has been able to be thinner than was required in PRIOR ART tank assemblies. Reducing the thickness of the aluminum (or other metal used during fabrication) results in a tank assembly 102 and trailer 100 that weighs less than the PRIOR ART tank assembly or trailer. The reduction in relative movement also requires that the material used to produce tank trailer 102 need not be as strong as was required in PRIOR ART tank assemblies or trailers.

It should be noted that trailer 100 is not driven across the roads in a pressurized condition. Air piping system 126 is only activated during unloading of a load from first compartment 124 and is depressurized once unloading is finished.

Figure 14:
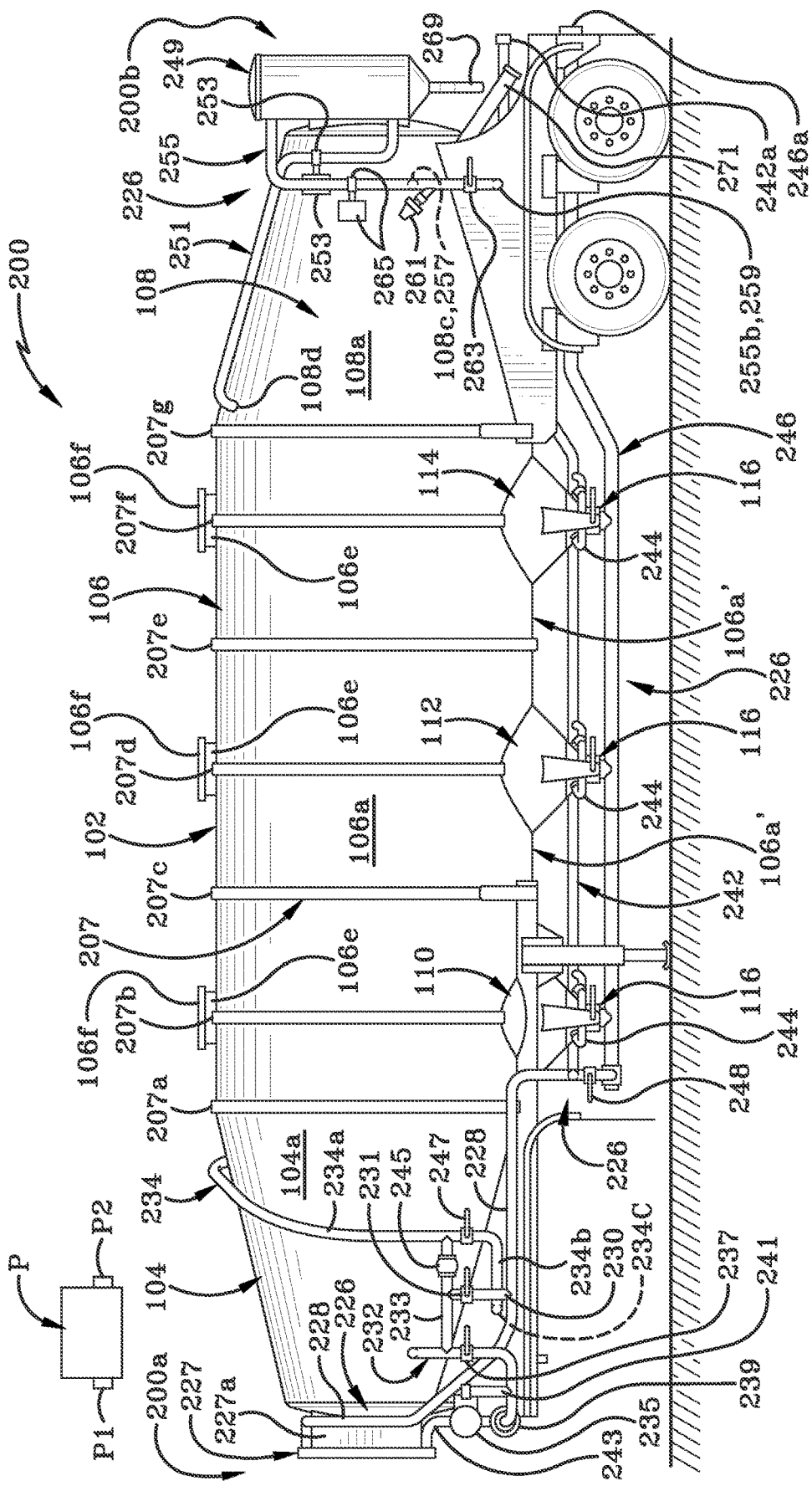
FIG. 14 is a side elevation view of a dry bulk tank in accordance with the present disclosure and having an air piping system that includes a system for pressurizing the tank and a system for generating a vacuum within the tank.

Air piping system 126 includes a plurality of different pipes, hoses, lines and valves (as will be discussed hereafter). Referring to FIGS. 5 and 9 in particular, air piping system 126 includes, amongst other components, an air intake pipe 128. Air piping system 126 may be selectively connected to a source of pressurized air. One suitable pressurized air source could be an air/pneumatic pump or compressor. By way of example only, FIG. 5 shows a pump "P" that is provided for operative engagement with the air piping system 126 on trailer 100. Pump "P" may be operatively engaged with a power take-off (PTO) on the trailer or on the towing vehicle. (It should be understood that this pump "P" is representative of any suitable air source that may be engaged with air piping system 126.) Pump "P" may be mounted on the towing vehicle or on a tractor or on tank assembly 102 or may be a self-contained unit that stands on the ground adjacent the trailer 100. For this reason, FIG. 5 (and FIG. 14) show pump "P' spaced a short distance apart from trailer 100 (or trailer 200 in FIG. 14). Pump "P" typically will be located upstream of air piping system 126 and first compartment 124. Pump "P" is illustrated as having an air intake "P1" and an exhaust outlet "P2". An operator may connect pump "P" by a hose (not shown) to first end 128a of air intake pipe 128. In particular, the hose will connect first end 128a of air intake pipe 128 to the exhaust outlet "P2" of pump "P". Air expelled by pump "P" will be pumped into and flow through the hose and into the air piping system 126 via air intake pipe 128. This air, provided under pressure by pump "P", will be used to pressurize first and second compartments 124, 125 as described herein.

A top air pipe 130 extends off air intake pipe 128 and a first check valve 129 is engaged with air intake pipe 128 in a location between first end 128a and top air pipe 130. Top air pipe 130 extends between air intake pipe 128 and inlet 104c into front end housing 104. A side branch 133 extends off top air pipe 130 and side branch 133 terminates in a blowdown pipe 134. A first valve 132 is engaged with top air pipe 130 in a location between air intake pipe 128 and side branch 133. A second check valve 135 is engaged with side branch 133 in a location between top air pipe 130 and blowdown pipe 134. Blowdown pipe 134 extends from side branch 133, over the top 100a of trailer 100 and enters first compartment 124 through inlet 106c defined in exterior wall 106a. This is shown in FIGS. 6 and 6A. A terminal end 134a of blowdown pipe 134 is located within the interior first compartment 124. Terminal end 134a defines an opening therein that enables blowdown pipe 134 and first compartment 124 to be placed in fluid communication. An emergency relief valve 136 is provided in blowdown pipe 134 and is located between side branch 133 and inlet 106c. A portion of blowdown pipe 134 extends downwardly from side branch 133 and this portion forms an exhaust pipe 138 that terminates in an outlet 138a (FIG. 9) that is open to the atmosphere. A second valve 140 is engaged with exhaust pipe 138 in a location between side branch 133 and outlet 138a.

First and second check valves 129, 135 permit air to flow in only one direction through the pipe with which the check valve in engaged. First check valve 129 permits air to flow from first end 128a of air intake pipe 128 in a direction towards top air pipe 130 and beyond but prevents air flow from top air pipe 130 in a direction back towards first end 128a. Second check valve 135 permits air to flow from top air pipe 130 towards blowdown pipe 134 but does not permit flow in the reverse direction. Second check valve 135 helps to ensure that bulk material in first compartment 124 does not accidentally flow through blowdown pipe 134 and into second compartment 125 where it would accumulate and reduce or eliminate the possibility to provide substantially similar or substantially equal air pressure in first compartment 124 and second compartment 125.

First valve 132 and second valve 140 are each independently movable between an open position and a closed position. When first valve 132 is in the open position air may flow from air intake pipe 128 into and through top air pipe 130 and subsequently through inlet 104c and into front chamber 104b of front end housing 104. Air will also flow from top air pipe 130 through side branch 133 and into blowdown pipe 134. Provided second valve 140 is closed, air will flow through upwardly through blowdown pipe 134, through inlet 106c and into first compartment 124. If air is provided under pressure through air intake pipe 128 then pressurized air will flow into front chamber 104b and first compartment 124. Front chamber 104b and first compartment 124 will be pressurized to the same extent; i.e., the air pressure in front chamber 104b and in first compartment 124 will be the same.

When first valve 132 is in the closed position, air does is unable to flow from air intake pipe 128 into and through top air pipe 130 or into and through side branch 133 or blowdown pipe 134.

If second valve 140 is moved to the open position then air is able to flow out of first compartment 124 through blowdown pipe 134, through exhaust pipe 138 and out of outlet 138a and into the atmosphere. Second valve 140 may therefore be opened in order to depressurize first compartment 124. Because second check valve 135 is provided in side branch 133, when second valve 140 is moved to the open position, air will also flow out of front chamber 104b, back through top air pipe 130. If first valve 132 is closed then the air flowing out of front chamber 104b will flow through side branch 133 and become entrained with the air flow toward exhaust pipe 138. So, opening second valve 140 depressurizes first compartment 124 front chamber 104b of front end housing 104. Second check valve 135 prevents air flow from blowdown pipe 134 back through side branch 133 through to top air pipe 130.

As has been discussed earlier herein, front chamber 104b is in fluid communication with middle chamber 122 and with rear chamber 108b of rear end housing 108 and forms the sealed second chamber 125. Consequently, when air flows into front chamber 104b under pressure, that air subsequently flows into middle chamber 122 and on into rear chamber 108b. Pressurization of first compartment 124 and front chamber 104b also results in pressurization of middle chamber 122 and rear chamber 108b. Depressurization of first compartment 124 and front chamber 104b also results in simultaneous depressurization of middle chamber 122 and rear chamber 108b.

When pressurized air flows into the first compartment 124 and second compartment 125 (i.e., front chamber 104b/middle chamber 122/rear chamber 108b), then the air pressure moves in a same direction to where the air pressure on both sides of the conical walls of the hoppers 110, 112, 114 tends to become substantially similar or substantially equal. Because of this substantially similar or substantially equalized pressure, the walls bounding and defining first compartment 124 and hoppers 110, 112, 114 are under substantially less stress and strain than would be the case if only the first compartment 124 was able to be pressurized and are less inclined to move relative to each other. Prior to moving the air pressure in the first compartment and the second compartment in the same direction, a force exerted by the air pressure in the first compartment might tend to cause a common section of wall between the two compartments to move. If the air pressure in the first compartment is higher, then the section of common wall might tend to move outwardly and into the second compartment. If the air pressure in the second compartment is higher, then the section of common wall might tend to move inwardly into the first compartment. As the air pressures in the first compartment and the second compartment move to a condition where they tend to become substantially similar or substantially equal, then the forces on either side of the section of common wall tend to equalize and therefore movement in the section of common wall tends to decrease in magnitude.

When it is desired to depressurize first compartment 124, pump "P" is switched off and first valve 132 is moved to the closed position and second valve 140 is moved to the open position. Air will then flow into opening in the end 134a of blowdown pipe 134, through blowdown pipe 134 and out of exhaust pipe 138 to outside trailer 100.

If during operation the first compartment 124 and the front chamber 104b, middle chamber 122 and rear chamber 108b reach a critical predetermined threshold, emergency relief valve 136 will be automatically triggered and moved to an open position so that air can escape from top air pipe 130 and blowdown pipe 134. Emergency relief valve 136 may also be operatively linked to pump "P" to shut the same off if the valve 136 is triggered.

Referring still to FIG. 5, air piping system 126 further includes an aerator supply pipe 142 that originates at 142a in air intake pipe 128 and terminates at 142b proximate rear end 100b of trailer 100. Aerator supply pipe 142 is connected to an aerator (not shown) that is engaged with each of the first, second and third hoppers 110, 112, 114. The aerator may be any type of device that fluidizes the bulk material retained within the associated first, second or third hopper 110, 112, 114. For example, the aerator may be rubber fluidizing disc or an airsweep. Aerator hoses 144 extend between aerator supply pipe 142 and each aerator. When activated, air will flow from air intake pipe 128, through aerator supply pipe 142, through the associated aerator hoses 144, and aerator, and into the chamber of the associated hopper 110, 112 or 114. This air flowing into the chamber of the hopper will stir up the bulk material in the chamber of the hopper in question. The air flow helps to fluidize the bulk material so that the bulk material is more readily able to flow out of an opening at the bottom of the associated hopper 110, 112 or 114.

Air piping system 126 further includes a discharge pipe 146 that originates in air intake pipe 128. A discharge valve 148 is engaged with air intake pipe 128 proximate a first end 146a of discharge pipe 146 and discharge valve 148 is movable between an open position and a closed position.

Discharge pipe 146 is also engaged with the valve assemblies 116 located at the bottom end of each of the first, second and third hoppers 110, 112, and 114. Each valve assembly 116 is selectively movable between an open position and a closed position. Discharge pipe 146 terminates in an open end 146b that is located at a rear end 100b of trailer 100. When one of the valve assemblies 116 is moved to the open position, the chamber of the associated hopper 110, 112, or 114, and thereby first compartment 124, is placed in fluid communication with discharge pipe 146. When the valve assembly 116 is moved to the closed position then fluid communication between discharge pipe 146 and the chamber of the associated hopper 110, 112, or 114 and thereby with first compartment 124 is broken.

When discharge valve 148 is in the open position, discharge pipe 146 is placed in fluid communication with air intake pipe 128 and air may flow from pump "P" through air intake pipe 128 and through discharge pipe 146 under pressure. If the valve assembly 116 associated with first hopper 110, for example, is moved to the open position, bulk material will flow out of the first compartment 124 through the valve assembly 116 of first hopper 110 and into discharge pipe 146. The pressurized air flowing through discharge pipe 146 will entrain some of the bulk material and cause the bulk material to flow through discharge pipe 146 and out of open end of the discharge pipe 146 and through a hose attached thereto and into a storage compartment at the facility where the material is being unloaded.

Trailer 100 in accordance with the present invention is used in the following manner. When trailer 100 arrives at a facility to be loaded with particulate bulk material, trailer 100 is positioned so that at least one of manholes 106e is located directly under an opening of a loading hose or pipe. Cover 106f of the at least manhole 106e is removed and dry, particulate, bulk material is loaded into first compartment 124 through the at least one manhole 106e. Cover 106f is then replaced on each of the at least one manhole 106e to seal first compartment 124. Trailer 100 is then driven across the roads to a second facility where the bulk particulate material is to be delivered.

The operator will connect a hose from a storage tank at the second facility to the end 146b of discharge pipe 146 at rear end 100b of trailer 100. Discharge valve 148 is moved to the closed position if it is not already in that position. First and second valves 132 and 140 are also placed in the closed position if they were not already in that position. A hose (not shown) is connected between pump "P" (FIG. 5) and first end 128a of air intake pipe 128 and pump "P" is actuated. Air flows through air intake pipe 128 under pressure and, because discharge valve 148 is closed, the air will flow into aerator supply pipe 128. A first one of the aerators may be activated so that air will flow from aerator supply pipe 128, through aerator hoses 144 and through the associated aerator to agitate the particulate material within the associated hopper 110, 112 or 114. Air will therefore flow from air intake pipe 128, through aerator hoses 144, through the activated aerator and into the chamber of the associated hopper 110, 112 or 114. While the aerator is activated, discharge valve 148 is moved to the open position and the valve assembly 116 on the hopper 110, 112 or 114 that has been aerated will be moved to the open position. (The aerator may be deactivated prior to or after the valve assembly 116 on that hopper has been moved to the open position.) The first valve 132 may also moved to the open position so that air flows from air intake pipe 128, through top air pipe 130, through side branch 133 and blowdown pipe 134 and into the upper end of first compartment 124 thereby pressurizing first compartment 124. At the same time as first compartment 124 is being pressurized, air flows through top air pipe 130 and into the front chamber 104b of front end housing 104 and thereby into middle chamber 122 and rear chamber 108b. Front chamber 104b, middle chamber 122 and rear chamber 108b are therefore pressurized to the same extent as first compartment 124. When valve assembly 116 is moved to the open position, the fluidized bulk material retained in the opened hopper 110, 112 or 114 flows out through the opened valve assembly 116 and into the discharge pipe 146. Air flowing through discharge pipe 146 picks up the bulk material from the opened hopper and carries it through the discharge pipe 146, out of the open end 146b, and into and through the hose connected to the storage tank in the second facility.

When substantially all of the loose material in the first hopper has flowed into the discharge pipe 146, the valve assembly 116 associated with that hopper will be closed as will the discharge valve 148. The aerator associated with a next hopper will be activated and the process will be repeated until that next hopper is substantially emptied. The steps will be repeated once again for the final hopper. It should be understood that it is possible in trailer 100 to activate more than one aerator and open more than one hopper at a time.

When substantially all of the bulk material has been removed from the first compartment 124 through the three hoppers 110, 112, 114, discharge valve 148 will be kept in the open position so that air continues to flow through discharge pipe 146. First valve 132 will also remain open so that air is moved from air intake pipe 128 through top air pipe 130 into front chamber 104b/middle chamber 122/rear chamber 108b, and through side branch 133 and blowdown pipe 134 and into first compartment 124. The air flowing into first compartment 124 through blowdown pipe 134 will help dislodge any material that remains in any of the hoppers 110, 112, 114. That dislodged material will flow into the discharge pipe 146 and through the open end thereof and into the hose connected thereto.

Pump "P" will be switched off and first valve 132 will be closed and second valve 140 will be opened to depressurize first compartment 124 and front chamber 104b/middle chamber 122 and rear chamber 108b. All valves 132, 140 and 148 will then be closed and the hoses engaged with first end 128a of air intake pipe 128 and with the open end of discharge pipe 146 will be disengaged. Trailer 100 is then free to travel back to the loading facility to take on its next load.

In summary, trailer 100 differs from trailer 10 in a number of respects that enable trailer 100 to be structurally stronger, lighter in weight (and therefore able to carry a heavier load) and to function efficiently. Trailer 100 has a true cylindrical shape relative to the generally oval or elliptical PRIOR ART trailer 10. This true cylindrical shape (i.e. one that has a circular cross-section when viewed from the front or back) is much stronger than an oval or elliptical shape because a cylinder has fewer stress points than an ellipse or an oval.

PRIOR ART trailer 10 and trailer 100 in accordance with the present disclosure were tested for deformation and stress using a computerized engineering analysis known as ANSYS® (ANSYS® is a registered trademark of Ansys, Inc. of Canonsburg, Pa., USA). FIGS. 10 and 11 (which are executed in color) show an ANSYS® Deformation Comparison and FIGS. 12 and 13 (which are executed in color) show an ANSYS® Stress Comparison between PRIOR ART trailer 10 and trailer 100 of the present disclosure.

In the Deformation Comparison of FIGS. 10 and 11, areas of highest deformation or movement are shown by the presence of red color and are identified by the number 150. The high deformation areas 150 identify region of high movement even though trailer 10 includes strengthening assembly 38 and first and second plates 28, 30. Areas of progressively lesser deformation or movement are colored orange, then yellow, then green, then blue. Areas of the lowest deformation are colored dark blue and are identified by the number 152. FIG. 10 shows very clearly that in the PRIOR ART trailer 10, despite the presence of strengthening assembly 38 and plates 28, 30, the regions of highest deformation 150 are located on the front and rear regions of each hopper's conical wall, such as front and rear regions 22a, 22b of first hopper 22. In particular, the high deformation regions 150 are located a short distance below the joints where the hopper's conical walls join upper wall 18a and first and second plates 28, 30. The area of lowest deformation 152 on trailer 10 is the upper wall 18a.

By contrast, FIG. 11 shows trailer 100 has no obvious regions of high deformation on the cylindrical wall 106 of tank assembly or on any of the hoppers 110, 112, 114 or adjacent any of the joints between wall 106 and hoppers 110, 112, 114. In other words, there are no regions that are colored red or orange. There is therefore less movement between component parts of trailer 100 than is the case with PRIOR ART trailer 10. FIG. 11 shows that there are regions of lower deformation in trailer 100 i.e., areas colored yellow and green that are identified by the number 154. These lower deformation regions 154 are located toward the bottom of tank assembly 102 where hoppers 110, 112, 114 exit the tank wall 106 and in regions located between first and second interior ribs 118 and 120. Trailer 100 is therefor subject to less deformation than was the case with PRIOR ART trailer 10. This means in the real world that trailer 100 is stronger than PRIOR ART trailer 10 and therefore better able to withstand the rigors of transporting loads. Additionally, by substantially equalizing the pressure, thinner material can be used to manufacture trailer 100, thereby substantially reducing the trailer weight and allowing the trailer 100 to haul more payload while staying in compliance with highway motor laws.

Furthermore, front chamber 104b, middle chamber 122 and rear chamber 108b are provided in regions of trailer 100 that might experience the lower deformation 154. The stresses that might be experienced in these lower regions of tank assembly 102 when first compartment 124 is pressurized tend to be offset by simultaneously pressurizing front chamber 104b, middle chamber 122 and rear chamber 108b.

The cylindrical shape of outer wall 106 and the pressurization of areas below, in front of and behind first compartment 124 also enables the manufacturer to use thinner sheet material in the fabrication of trailer 100 than is the case when producing the ovoid PRIOR ART trailer 10. Thinner metal may be used for trailer 100 because the metal and the joints between the various components do not have to withstand the same amount of relative movement as was the case in PRIOR ART trailer 10. By way of example, trailer 100 is now about six-hundred pounds lighter than PRIOR ART trailer 10 because of the thinning of the exterior "skin" and the removal of various components of the strengthening assembly 38. The front end housing 104 on trailer 100 is also slightly differently configured to front end housing 16 of PRIOR ART trailer 10. Front end housing 104 is more symmetrical than front end housing 16 and the pressurized area in and behind front end housing 104 will also substantially reduce the weight and stress on the front end housing 104.

Figure 12:
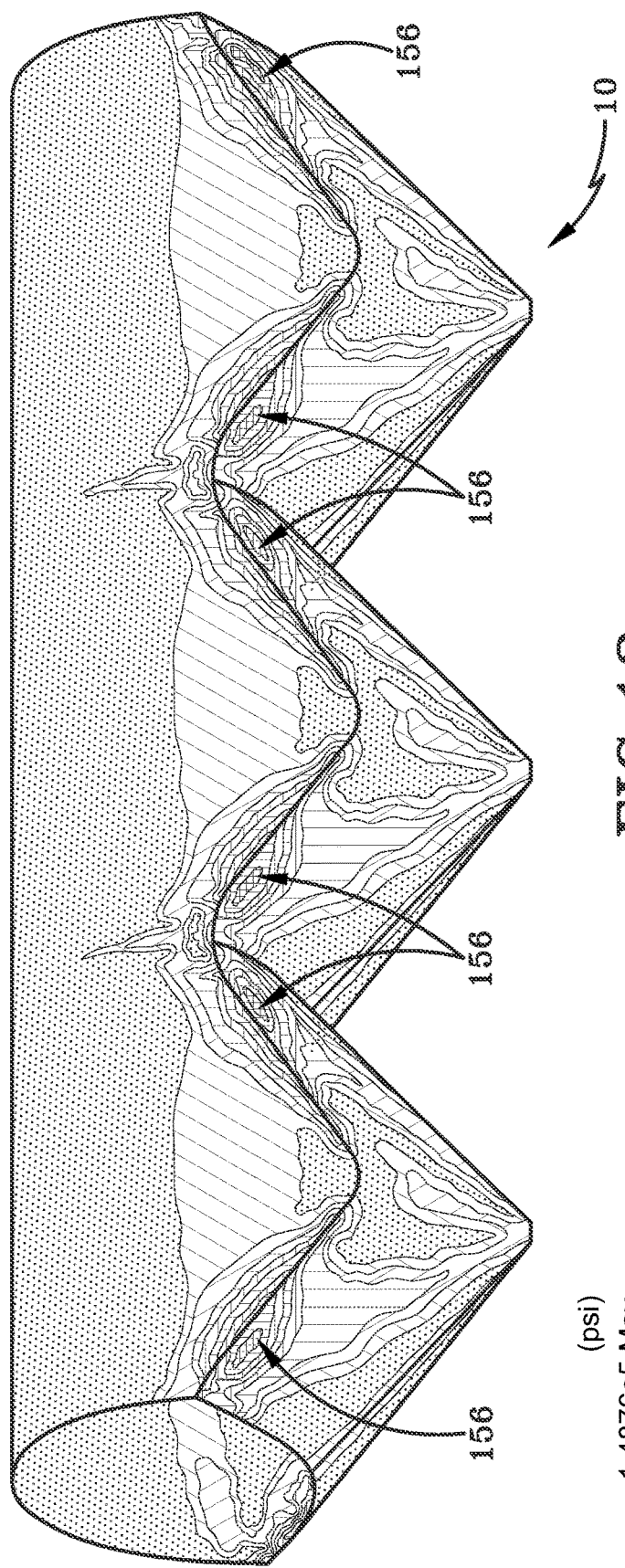
FIG. 12 is executed in color shows an ANSYS® Stress Analysis of a PRIOR ART dry bulk tank.
Figure 12:
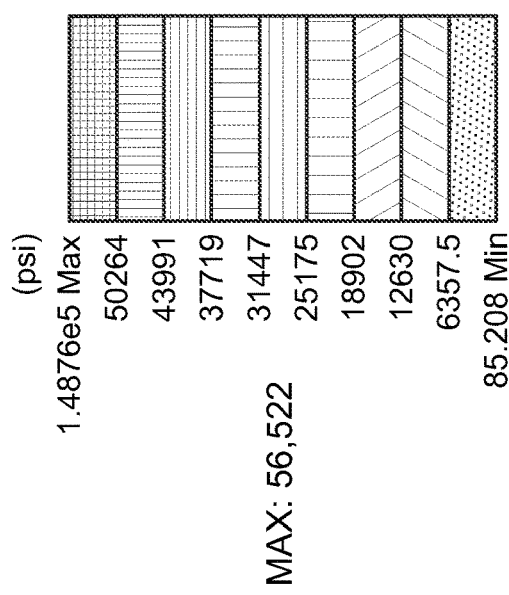
Figure 13:
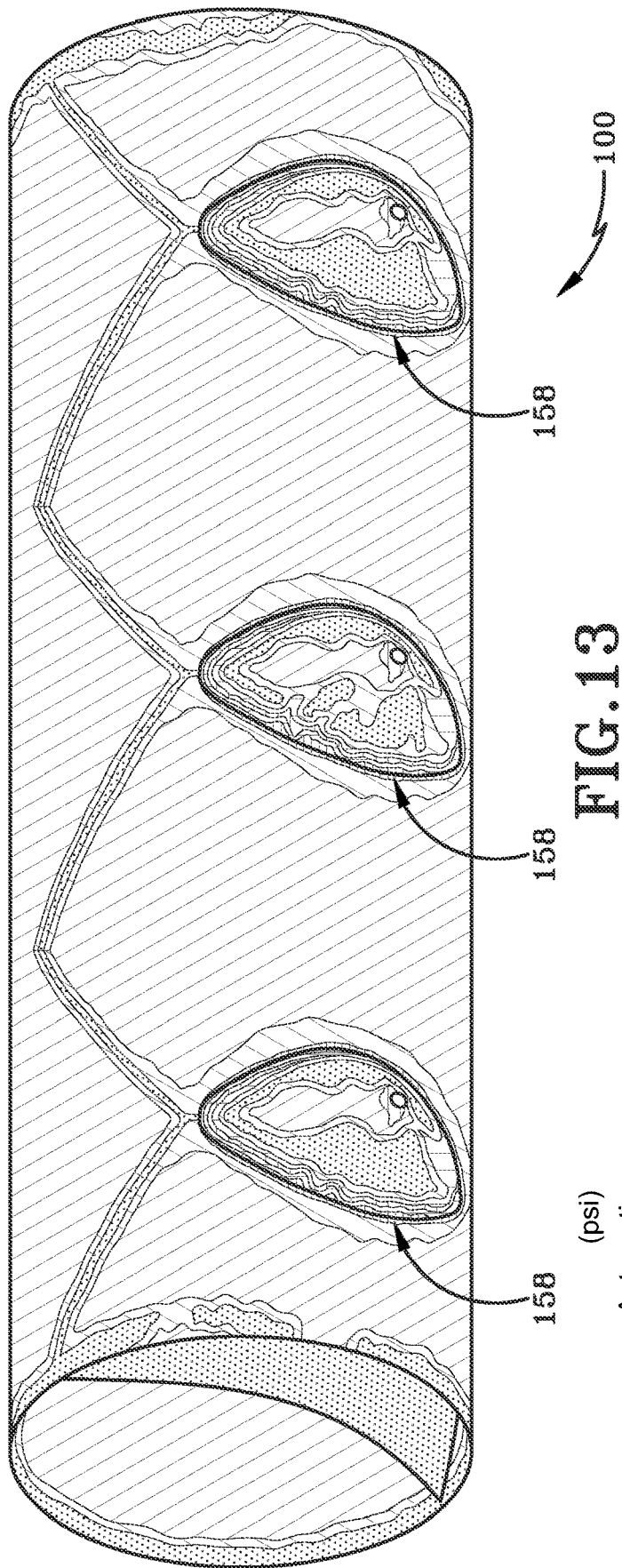
FIG. 13 is executed in color shows an ANSYS® Stress Analysis of the dry bulk tank in accordance with the present disclosure.

FIGS. 12 and 13 show an ANSYS® Stress Analysis of PRIOR ART trailer 10 and an ANSYS® Stress Analysis of a trailer 100, respectively. Again, regions of highest stress in these two analyses are identified by the color red and progressively lower stresses are indicated by the color orange, then yellow, then green, then blue. In both PRIOR ART trailer 10 and trailer 100 in accordance with the present disclosure, the maximum stresses are located where the hoppers join the wall that forms the rest of the tank body i.e., upper wall 18a in PRIOR ART trailer 10 and wall 106 in trailer 100. In PRIOR ART trailer 10 the regions of maximum stress are identified by the number 156 and are clearly where the metal that forms upper wall 18a is welded to the metal that forms the hoppers 22, 24, 26. The maximum stress measured at one of these regions 156 is shown on the left side of FIG. 12 to be 56,522.

FIG. 13 shows that the regions of maximum stress in trailer 100 are at the joints where hoppers 110, 112, 114 are welded to wall 106. These regions are identified by the number 158. However, the maximum stress measured at one of these regions 158 is 30,454; so the maximum stress measured on trailer 100 is almost half of the maximum stress measured on PRIOR ART trailer 10.

FIGS. 14-18 show a second embodiment of a dry bulk trailer in accordance with the present invention with the trailer being generally indicated at 200. Trailer 200 is substantially identical to trailer 100 in structure and function with a few exceptions/additions that will be discussed hereafter in greater detail.

Trailer 200 comprises a tank assembly having a front end housing 104, a central section 106 and a rear end housing 108 that are substantially identical to front end housing 104, central section 106 and rear end housing 108 of trailer 100. Central section 106 defines a first compartment 124 for carrying a load. Trailer 200 further includes a second compartment 125 made up of front chamber 104b defined by front end housing 104, middle chamber 122 defined around regions of the exterior surfaces of first, second and third hoppers 110, 112, 114; and rear chamber 108b defined by rear end housing 108. Front chamber 104b, middle chamber 122 and rear chamber 108b of trailer 200 are in fluid communication with each other in the identical manner to front chamber 104b, middle chamber 122 and rear chamber 108b of trailer 100 and therefore form a second compartment 125 that is sealed off from the atmosphere surrounding trailer 200.

Trailer 200 includes a rib assembly 207 that is welded to an exterior surface of central section 106. Rib assembly 207 is similar to rib assembly 107 in that it comprises a number of ribs that are spaced a distance longitudinally away from each other. Rib assembly 207 therefor includes a first rib 207a that is located adjacent a front end of first hopper 110, a second rib 207c that is located where first hopper 110 joins second hopper 112, a third rib 207e that is located where second hopper 112 joins third hopper 114, and a fourth rib 207g that is located at a rear end of third hopper. These ribs 207a, 207c, 207d and 207g are substantially identical to ribs 107a, 107b, 107c, and 107d, respectively, and are circumferential in nature. In other words, each of the first, second, third and fourth ribs 207a, 207c, 207e, 207g is welded to the exterior surface of wall 106a and circumscribes the circumference of central section 106. Rib assembly 207, unlike rib assembly 107, also includes a fifth rib 207b, sixth rib 207d, and seventh rib 207e that are welded to the exterior surface of wall 106a. Fifth rib 207b is located generally midway between first and second ribs 207a, 207c; sixth rib 207d is located generally midway between second and third ribs 207c, 207e; and seventh rib 207f is located generally midway between third and fourth ribs 207e and 207g. Fifth, sixth and seventh ribs 207b, 207d, and 207f are not circumferential ribs that circumscribe the circumference of central section 106 but are instead generally C-shaped ribs. Fifth, sixth and seventh ribs 207b, 207d, 207f aid in providing additional strengthening to central section 106 of trailer 200 so that central section 106 is better able to withstand trailer 200 being placed under vacuum conditions, as will be described later herein.

Trailer 200 also differs from trailer 100 in that the air piping system 226 provided thereon is not only is useful for pressurizing first and second compartments 124, 125 of tank assembly 102 in a similar manner to air piping system 226 but, in addition, may be used to place first and second compartments 124, 125 of tank assembly 102 under a vacuum condition. In particular, air piping system 226 may be used to pressurize first compartment 124 and the chambers 104b, 122 and 108b, or may in other instances be used to place first compartment 124 and chambers 104b, 122 and 108b under vacuum. When vacuum is applied to tank assembly 102, dry bulk material may be loaded into first compartment 124. When unloading tank assembly 102, pressure may be applied to help remove a load of dry bulk material from first compartment 124. The simultaneous placing of chambers 104b, 122 and 108b and first compartment 124 under vacuum helps to reduce some of the stresses and strains on the joints between the various sections of the tank assembly 202 and thereby aids in increasing the life of tank assembly 202. As with air piping system 126, activating air piping system 226 (whether to pressurize the first and second compartments 124, 125 or to create a vacuum therein) tends to reduce relative movement between component parts of tank assembly 202 (or trailer 200). This also aids in increasing the life of tank assembly 202.

Air piping system 226 includes a plurality of different pipes, hoses, lines and valves (as will be discussed hereafter). As discussed with reference to trailer 100, second compartment 125 also forms part of the air piping system 226. Air piping system 226 may be selectively connected to a source of pressurized air or to a system that is capable of creating a vacuum condition. The device to which air piping system 226 is operatively engaged may be one and the same device that is simply used in two different ways. One suitable such device is the air/pneumatic pump or compressor represented by pump "P" in FIG. 14. Pump "P" may include an air intake port "P1" and an exhaust outlet "P2". (It will be understood that any suitable pressurized air source or vacuum source may be utilized to cause air to flow through air piping system 226 or to extract air therefrom.) Pump "P" may be mounted on the towing vehicle or tractor or on tank assembly 202 or elsewhere such as on the ground adjacent the trailer 200. Pump "P" typically will be located upstream of air piping system 226 and first compartment 124. The air/pneumatic pump or compressor "P" may be used in a first state to pressurize at least a part of air piping system 226. Furthermore, pump "P" may be used in a second state to remove air from within trailer 200. In particular, air piping system 226 may be engaged with the exhaust "P2" of pump "P" to provide a source of pressurized air through air piping system 226. Air piping system 226 may, alternatively, be selectively connected to the air intake "P1" of pump "P" and, when actuated, pump "P" will extract air from trailer 200 through air piping system 226. Any type of vacuum system may be utilized instead of pump "P". Pump "P" in FIG. 14 should be understood to be representative of any suitable system that may be used to adjust (particularly to substantially equalize) the air pressure within first and second compartments 124, 125.

The specifics of air piping system 202 and its use will be described in greater detail below.

Referring to FIGS. 14 to 17, air piping system 226 includes a cooling assembly 227 located proximate a front end 200a of trailer 200. Cooling assembly 227 is mounted onto front end housing 104 by one or more mounting brackets 227a and may include a radiator-type member with a plurality of fins and one or more cooling fans mounted between front end 200a and the radiator-type member. Cooling assembly 227 is particularly useful to cool down air that will be blown into first compartment 124 during unloading. Air flowing from pump "P" used to pressurized first compartment 124 tends to be quite hot. If the bulk material carried in the first compartment may be damaged by being heated (as would be the case if the bulk material load is small plastic pellets, for instance), then the cooling assembly 227 ensures that at least some of the heat from pump "P" is at least somewhat extracted prior to contacting the bulk material.

An air intake pipe 228 is operatively engaged with cooling assembly 227 and a number of pipes branch off air intake pipe 228 downstream of cooling assembly 227. In particular, a top air pipe 230, an aerator supply pipe 242 and a discharge pipe 246 connect to air intake pipe 228. A discharge valve 248 is provided in air intake pipe 228 in a location between where aerator supply pipe 242 and discharge pipe 248 connect to air intake pipe 228. Aerator hoses 244 extend between aerator supply pipe 242 and aerators on first, second and third hoppers 110, 112, 114. Aerator supply pipe 242 terminates in an end 242a proximate rear end 200b of trailer. Discharge pipe 248 similarly terminates in an end 246a proximate rear end 200b of trailer 200.

Referring to FIGS. 16A, 17A, 17B and 18, the parts of air piping system 226 proximate front end 200a of trailer 200 are shown in greater detail. Top air pipe 230 includes a top air valve 231 that is located between air intake pipe 228 and a branch pipe 233 in which top air pipe 230 terminates. Branch pipe 233 is generally horizontally-oriented and top air pipe 230 is generally vertically-oriented. Branch pipe 233 terminates in a connector pipe 232 at a first end and in a blow-down pipe 234 at a second end. A first end of connector pipe 232 enters front end housing 104 through inlet 104c and is thereby placed in fluid communication in front chamber 104b. Connector pipe 232 extends downwardly from inlet 104c and then forwardly toward front end 200a of trailer 200 and ultimately connects to a filter 235. Filter 235 is mounted to front end housing 104 by way of a mounting bracket 235a and may be any suitable type of filter such as a spin flow filter. It should be noted that filter 235 is utilized during pressurization of first compartment 124 and the second compartment during unloading of the bulk material from first compartment 124 but is bypassed when first compartment 124 and the second compartment are placed under vacuum conditions during loading.

Figure 16A:
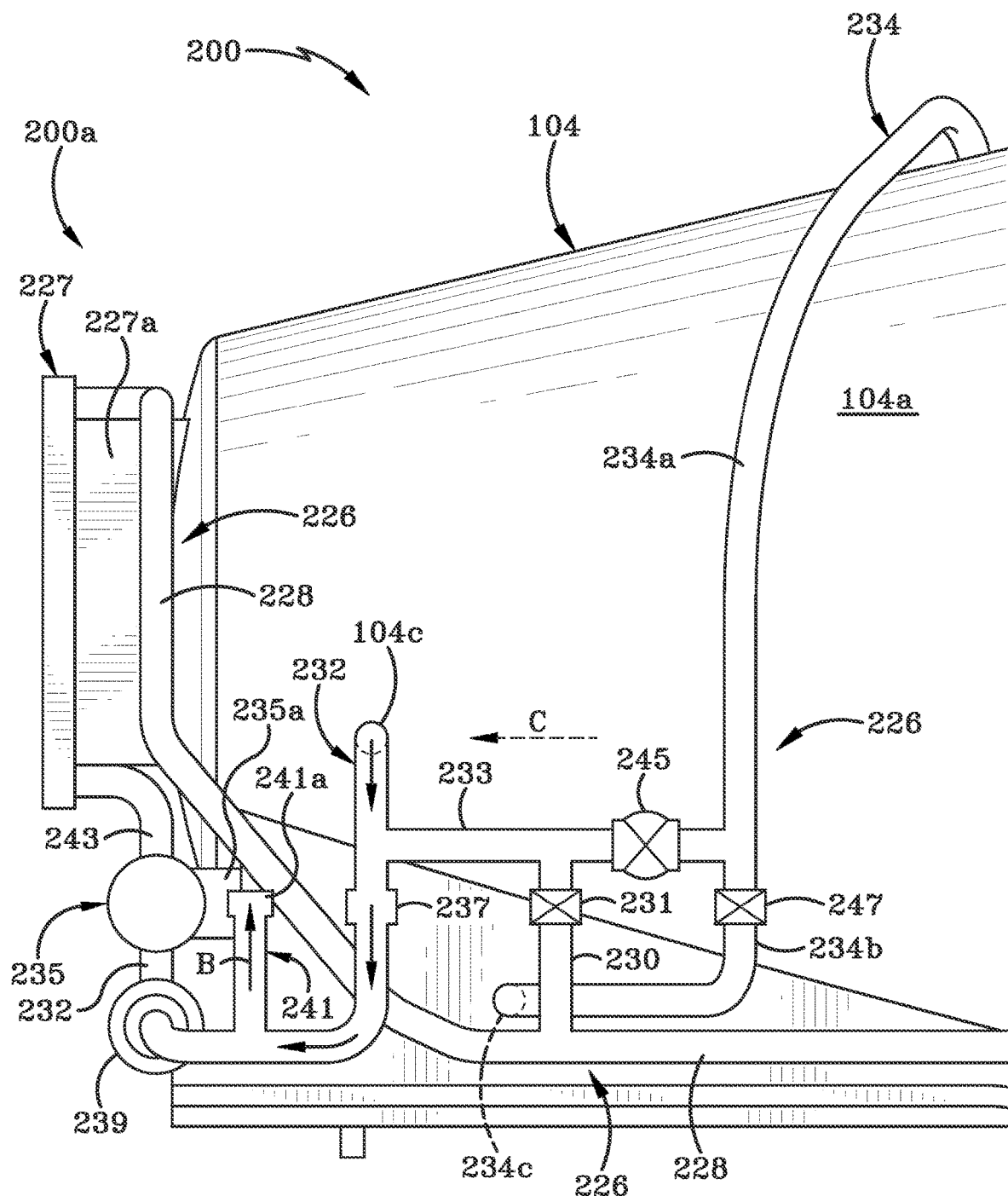
FIG. 16A is an enlarged side elevation of the front end of the dry bulk tank of FIG. 14 showing air flow through the air piping system when the tank is placed under vacuum.

Connector pipe 232 includes a valve 237 and a check valve 239. Check valve 239 is positioned in a section of connector pipe 232 located between valve 237 and filter 235. An intake pipe 241 joins connector pipe 232 at a location between valve 237 and check valve 239. Intake pipe 241 terminates in an end 241a. (A cap or cover may be selectively placed on end 241a when not in use.) As shown in FIGS. 16A and 17B a pipe 243 extends between filter 235 and cooling assembly 227.

Figure 15:
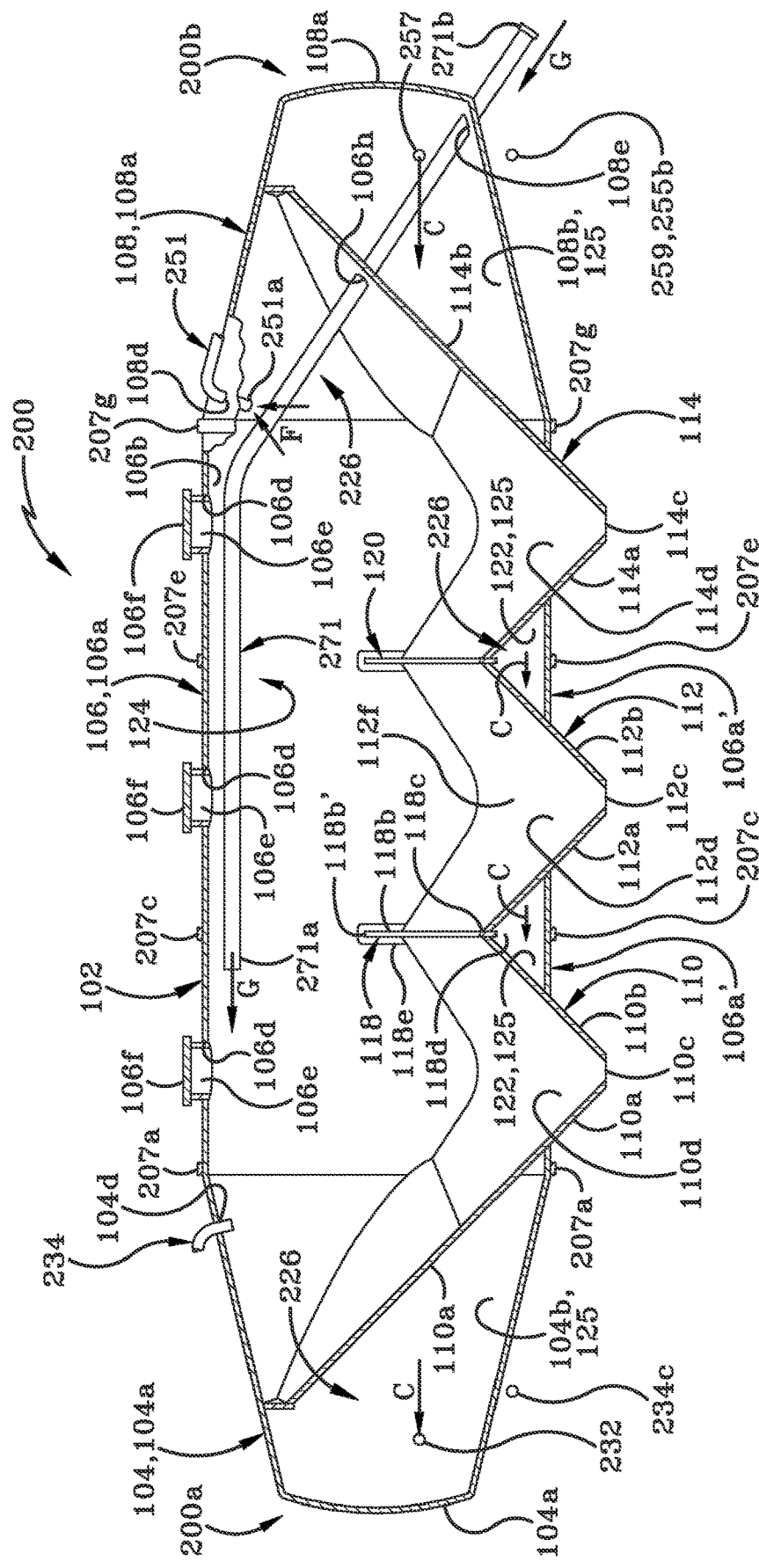
FIG. 15 is a longitudinal cross-section of the dry bulk tank of FIG. 14 with the shrouds above the two wheel assemblies removed so that the ends of the exhaust pipe and intake pipe may be seen.

As indicated above, branch pipe 233 connects to blowdown pipe 234. A check valve 245 (FIG. 16A) is located in branch pipe 233 between top air pipe 230 and blowdown pipe 234. Blowdown pipe 234 includes a first section 234a (FIG. 16A that extends upwardly from branch pipe 233 and passes through inlet 104d defined in a top wall of front end housing 104 but entering first compartment 124 (FIG. 15) of trailer 200. Blowdown pipe 234 is thereby placed in fluid communication with first compartment 124. A second section 234b of blowdown pipe 234 extends downwardly from branch pipe 233 and terminates at an outlet 234c that is located a distance below an exterior surface of front end housing 104 (FIG. 15). A valve 247 is located in blowdown pipe 234 in a position between branch pipe 233 and outlet 234c.

Figure 16B:
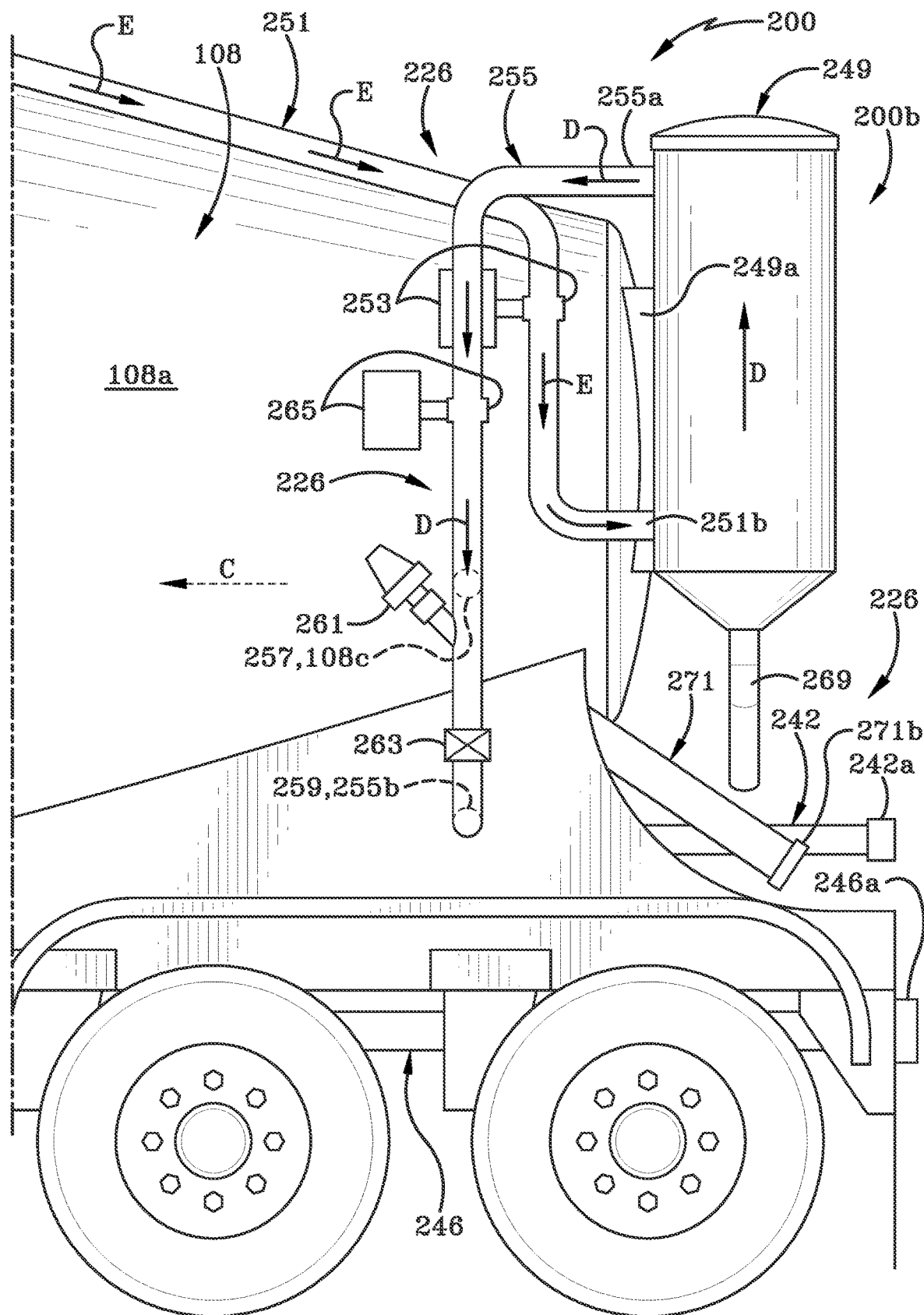
FIG. 16B is an enlarged side elevation of the rear end of the dry bulk tank of FIG. 14 showing air flow through the back end of the dry bulk tank when the tank is placed under vacuum.

Air piping system 216 further comprises a plurality of pipes, valves, check valves etc. that are utilized mainly by the vacuum assembly provided on trailer 200. The vacuum assembly includes a filter assembly 249 that is mounted by mounting brackets 249a on a rear end housing 108 proximate rear end 200b of trailer 200. An exit pipe 251 that connects to filter assembly 249 has a first end 251a (FIG. 15) which extends through a port 108d defined in top portion of exterior wall 108a of trailer 200. Exit pipe 251 is thereby placed in fluid communication with first compartment 124. A second end 251a of exit pipe 251 connects to filter assembly 249 and is thereby placed in fluid communication therewith. As best seen in FIG. 16b, second end 251a of exit pipe 251 connects to a lower region of filter assembly 249. A valve is provided in exit pipe 251 in a location adjacent filter assembly 249 and thereby closer to second end 251b than to first end 251a of exit pipe 251.

A connector pipe 255 (FIG. 16B) has a first end 255a that connects to an upper region of filter assembly 249 then extends forwardly and then downwardly so that a portion of connector pipe 255 is oriented substantially vertically. A first branch pipe 257 extends outwardly from connector pipe 255 and enters rear end housing 108 of trailer 200 through an entry port 108c (FIG. 15). A bottom region of connector pipe 255 turns through a right angle to form a second branch pipe 259 that is located a distance vertically beneath first branch pipe 257. Second branch pipe 259 has an exit port 255b that is located below a bottom surface of rear end housing 108 of trailer 200 as can be seen in FIG. 15. An emergency relief valve 261 is located between first and second branch pipes 257, 259. If during operation the first compartment 124 and the front chamber 104b, middle chamber 122 and rear chamber 108b reach a critical predetermined threshold, emergency relief valve 261 will be automatically triggered and moved to an open position so that air can flow into storage chamber, front chamber 104b, middle chamber 122 and rear chamber 108b through connector pipe 255. Emergency relief valve 261 may also be operatively linked to pump "P" to shut the same off if the valve 261 is triggered.

A first valve 263 is located on connector pipe 255 between relief valve 261 and second branch pipe 259. A second valve 265 is located on connector pipe between first branch pipe 257 and first end 255a. A filter pipe 269 extends downwardly from a bottom of filter 249. Bulk material may be sucked into exit pipe 251 during loading and thereby flow into filter 249. This bulk material may clog filter 249. Filter pipe 269 may be used to blow air or any accumulated dust or particulate matter out of filter 249. It should be noted that filter 249 is only utilized when vacuum is applied to trailer 200 during a loading operation. Filter 249 is bypassed when first compartment 124 and the second compartment (front compartment 104b, lower compartment 122 and rear compartment 108b) are pressurized.

A fill pipe 271 extends through a first inlet 108e defined in rear end housing 108 and through a second inlet 106h defined in rear region 114b. Consequently, a first portion of fill pipe 271 is located within first compartment 124, a second portion of fill pipe 271 is located within rear chamber 108b, and a third portion of fill pipe 271 is located outside of the exterior surface of trailer 200. Fill pipe 271 has a first end 271a (FIG. 15) located in first compartment 124 and a second end 271b that is located outside of the exterior surface of trailer 200 (FIG. 16B).

Air piping system 226 is used on trailer 200 as follows. When it is desired to load bulk material into first compartment 124, the vacuum assembly is utilized. A hose (not shown) will be connected to second end 271b of fill pipe 271 and will further be connected to a storage container containing a quantity of bulk material to be loaded into trailer 200. The storage container, for example, may be a rail car.

Referring to FIGS. 15 and 16A, various valves and check valves proximate front end 200a and rear end 200b of trailer 200 need to be set at appropriate positions for vacuum conditions to be applied to trailer 200. Check valves 239 and 245 (FIG. 16A) are moved to a closed position. The closed position is indicated in FIG. 16A by an "x" being placed on check valve 245. The "x" on check valve 239 is not able to be seen in FIG. 16A because of the orientation of the valve in the figure. Check valve 245 closes when trailer 200 is placed into a vacuum condition so that bulk material cannot flow down blowdown pipe and into the front chamber 104b and thereby begin to accumulate in second compartment 125. Check valve 239 is also closed when trailer 200 is placed into a vacuum condition to ensure bulk material cannot flow into filter 235 or cooling assembly 227. When trailer 200 is to be placed under vacuum, top air valve 231 and valve 247 are also moved to a closed position (indicated by the "x" on each valve). Valve 237 is moved to an open position (indicated by the fact that no "x" is illustrated on the valve in FIG. 16A). Referring to FIG. 16B, first valve 263 is moved to the closed position (indicated by the "x"), second valve 265 and valve 253 are moved to the open position (indicated by the lack of an "x".

As indicated previously herein, pump "P" (FIGS. 5 and 14) may be provided on the vehicle towing tank trailer 200 or mounted on trailer 200 itself or be placed on the ground adjacent trailer 200. Pump "P" may include an air intake "P1" and an exhaust outlet "P2". An operator may connect pump "P" by a hose (not shown) to first end 241a of intake pipe 241. The operator will connect the hose to air intake "P1" if he or she wishes to create a vacuum in the first and second compartments 124, 125 or will connect the exhaust "P2" on pump "P" to pressurize first and second compartments 124, 125.

It should be noted that in trailer 200 the single intake pipe 241 is used to connect air piping system 226 to pump "P". In PRIOR ART trailers that have included an air system for pressuring a trailer storage compartment and/or providing a vacuum therein, a source of pressurized air would have to be connected to a first inlet on the trailer and the vacuum source would have to be connected to a second inlet on the trailer. Typically, in these PRIOR ART trailers the first inlet would be located proximate a first end of the trailer and the second inlet would be provided proximate a second end of the trailer. The operator would therefore have to drag a long heavy hose to connect it to the first inlet when the trailer was to be pressurized and would have to detach the hose and move it to the other end of the trailer if the trailer was to be placed under vacuum. In trailer 200 in accordance with the present disclosure, the hose can remain attached to the same single intake pipe 241 and it is simply the valves on trailer 200 that are switched (manually and/or automatically) to switch the air piping system 226 from one that creates a vacuum in the trailer 200 to one that pressurizes the trailer 200. This greatly reduces the effort and time involved for loading and unloading a trailer 200 in accordance with the present invention relative to PRIOR ART TRAILERS.

Referring to FIGS. 16A and 16B, in trailer 200, air piping system 226 may be actuated to create a vacuum in first compartment 124 to load bulk material therein. Pump "P" is actuated and begins to draw air through intake pipe 241 and out of first end 241a thereof. Movement of air in the direction of arrow "B" through intake pipe 241 causes air to be drawn through connector pipe 232 towards intake pipe 241 and thereby draws air out of front chamber 104b of trailer 200. As air flows out of front chamber 104b through connector pipe 232, air is drawn through the second compartment 125 created by front chamber 104b, middle chamber 122 and rear chamber 108b. This air flow through second compartment 125 is indicated by arrows "C" in FIGS. 16A and 16B and in FIG. 15.

Referring to FIG. 16B, as air flows out of rear chamber 108b and into middle chamber 122 towards front chamber 104b, air is drawn through first branch pipe 257 and down connector pipe 255 in the direction of arrow "D". This air flow through connector pipe 255 draws air through filter 249 in the direction of arrow "D" which pulls air into lower region of filter 249 from exit pipe 251. Air is pulled through exit pipe 251 in the direction of arrow "E" and cause air to be sucked out of first compartment 124 through first end 251a in the direction of arrow "F" (FIG. 15). Continued operation of pump "P" will begin to evacuate all of the air from first compartment 124, setting up a vacuum condition therein. It should be noted that at the point a vacuum condition exits in the first compartment 124 it also is substantially simultaneously created in second compartment 125. The air pressure on the either side of the common wall separating the first compartment 124 from the second compartment 125 is thus substantially equal. Because of this there is very little relative movement between the various components that make up of trailer 200 and very little stress or stress placed on these components during the loading operation of bulk material which will be described below. Furthermore, because of the reduction in stress, strain and movement, the thickness of the walls that bound and define first compartment 124 and second compartment 125 can be fabricated from thinner metal than would be required if second compartment 125 was not placed under vacuum along with first compartment 124.

It should further be noted that the movement of valves 253 and 263 between a closed position and an open position is preferably automated. Automatic operation of valves 253, 263 may be desirable because of the height at which the two valves are positioned on trailer 200. It will be understood that the valves 253, 263 may instead be manually controllable by the operator. The operator does not need to climb up on to the truck to shift these valves between the open and closed position. The operator may be provided with a handheld controller when he or she can electronically operate valves 253, 263 and one or more or all of the other valves on trailer 200.

If valves 253, 263 open automatically, when pump "P" is actuated to create a vacuum condition within first compartment 124 and as the air is sucked through connector pipe 255 in the direction of arrow "D" and contacts valve 265, valve 265 will moves automatically to the open position. This movement of valve 265 may automatically trigger opening of valve 253. Alternatively, the movement of air as it is sucked out of exit pipe 251 and into filter 249, may cause valve 253 to automatically move to the open position. (Similarly, when trailer 200 is pressurized during unloading as will be described hereafter, as air flows in a reverse direction to arrow "D" and contacts valve 265, valve 265 may move to the closed position and valve 253 may then also be automatically triggered to move to a closed position.)

The vacuum condition in first compartment 124 will cause air to be drawn into first compartment 124 through fill pipe 271 in the direction of arrow "G" (FIG. 15). As indicated earlier herein, second end 271b of fill pipe 271 is connected via a hose to a storage container which has a quantity of bulk material therein. As air flows through fill pipe 271 in the direction of arrow "G" to try and neutralize the vacuum condition in first compartment 124, bulk material becomes entrained in the air flowing through hose connected to second end 271b and is sucked into fill pipe 271. The bulk material flows through fill pipe 271 and becomes deposited into first compartment 124. As the first compartment 124 fills with bulk material, the vacuum pressure in fill pipe 271 drops to the point that no further bulk material is drawn into fill pipe 271. Since trailer 200 does not travel in a vacuum condition, first valve 263 is moved to the open position. This allows air to flow back into connector pipe 255 and thereby into first compartment 124 and into the second compartment (i.e., rear chamber 108b, middle chamber 122 and front chamber 104b). Pump "P" will also be deactivated and all the various valves and check valves will be moved to a position that prevents bulk material from escaping from first compartment 124 or contaminants entering the second compartment.

Figure 17A:
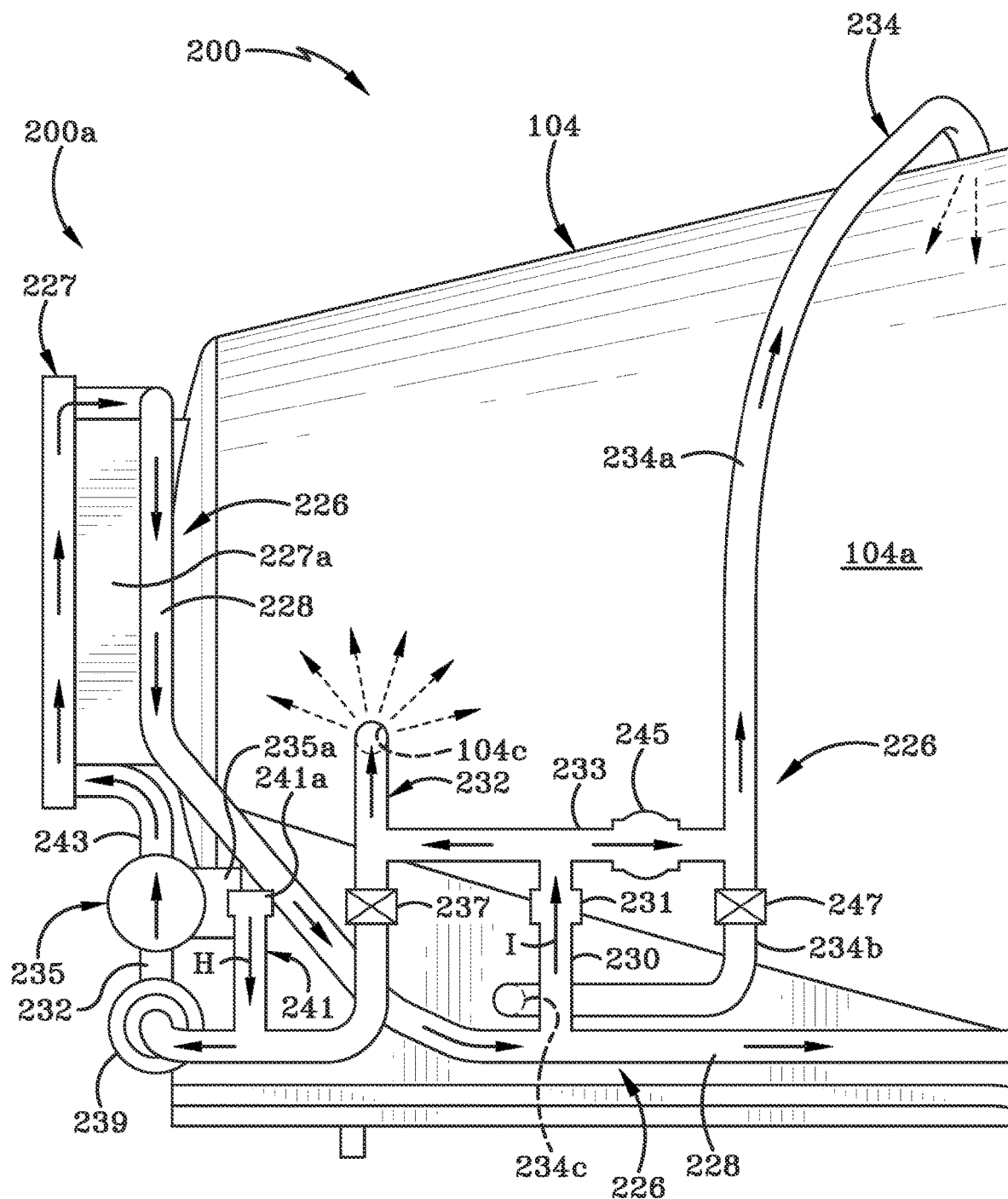
FIG. 17A is an enlarged side elevation of the front end of the dry bulk tank of FIG. 14 showing the air flow through the front end of the dry bulk tank when the tank is pressurized.
Figure 17B:
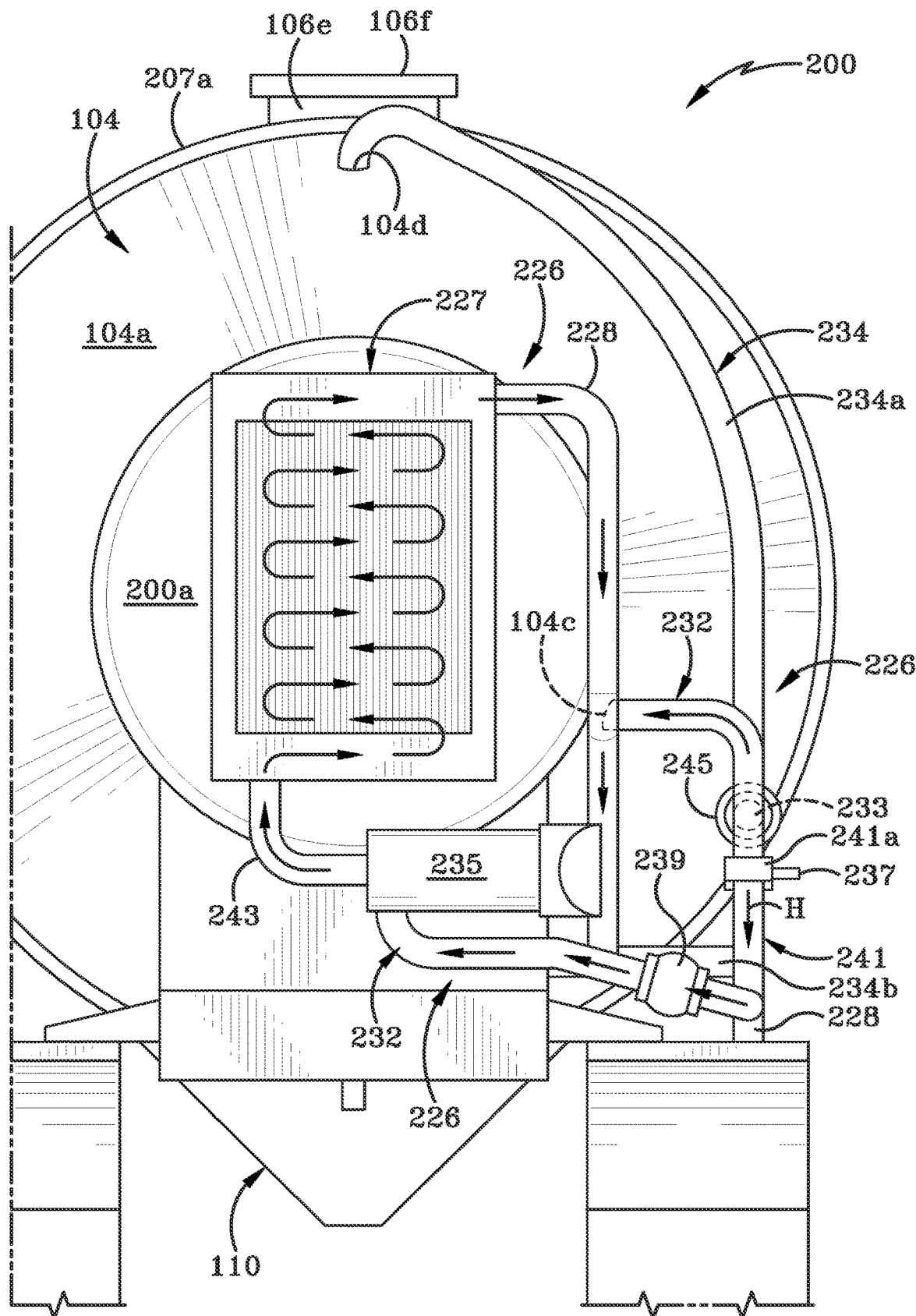
FIG. 17B is an enlarged front elevation of the dry bulk tank of FIG. 14 showing the air flow through the front end of the dry bulk tank when the tank is pressurized.
Figure 17C:
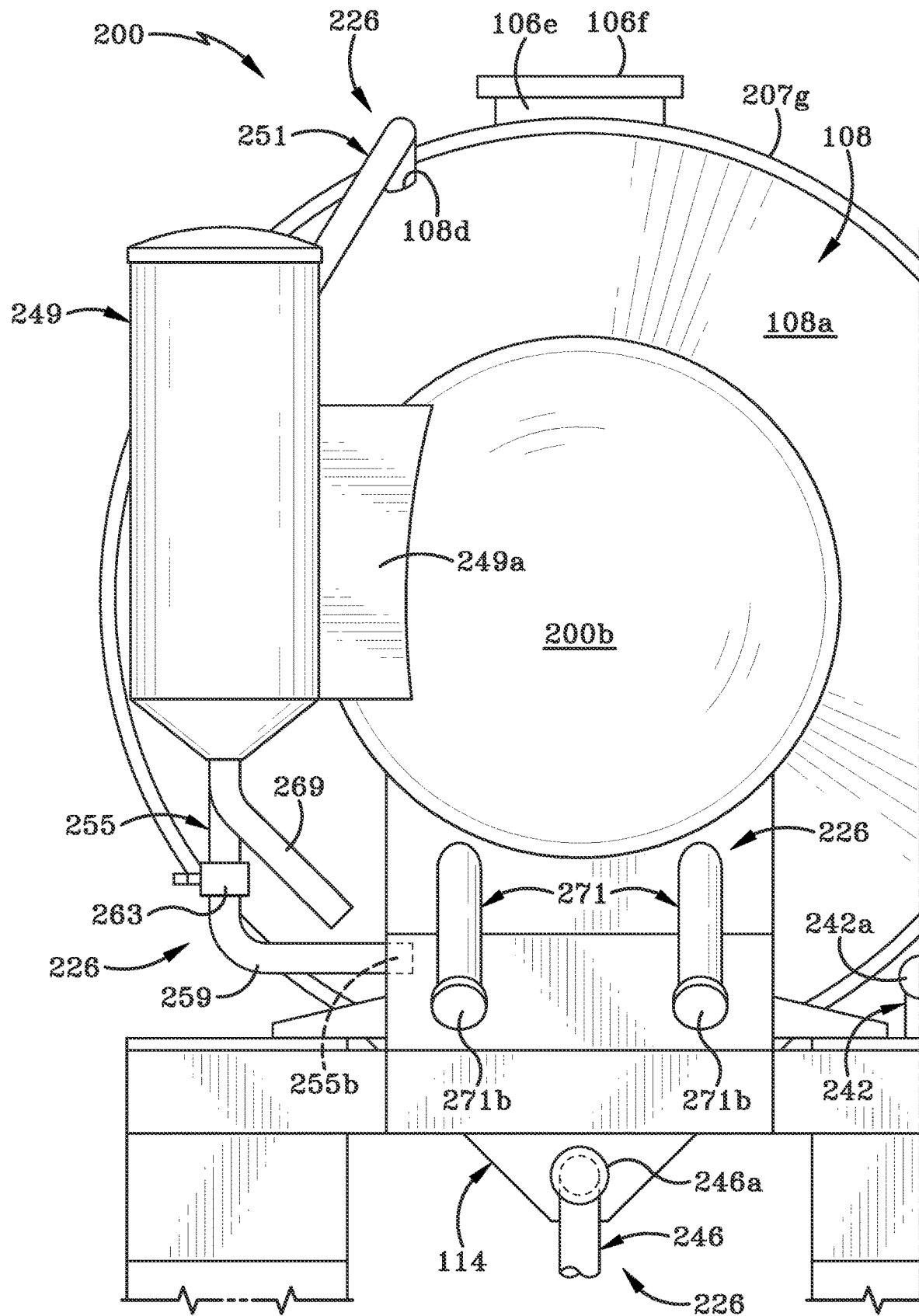
FIG. 17C is an enlarged rear elevation view of the dry bulk tank of FIG. 14.
Figure 18:
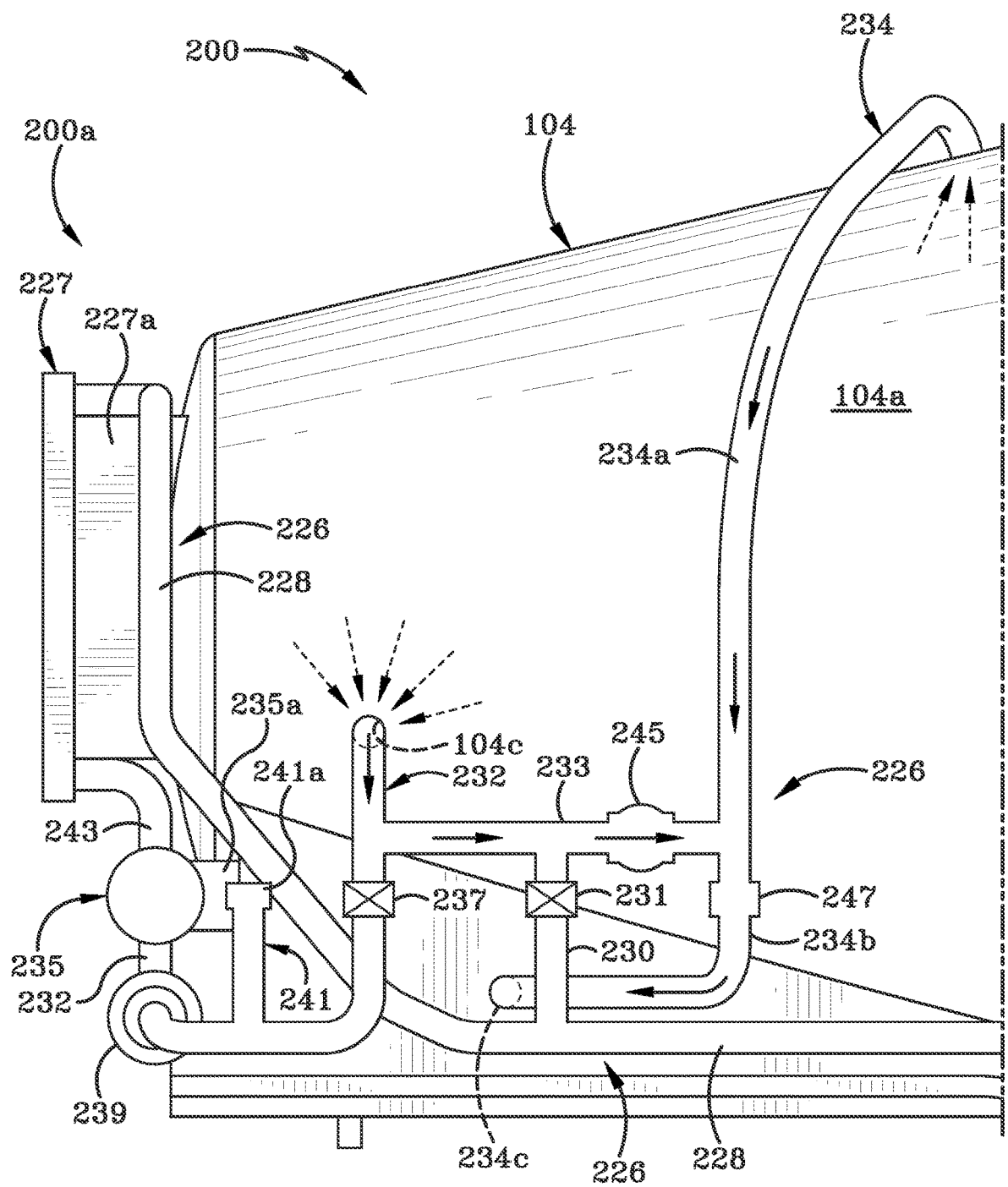
FIG. 18 is an enlarged side elevation of the front end of the dry bulk tank of FIG. 14 showing the air flow through the front end of the dry bulk tank when the tank is depressurized.

In some embodiments, such as is illustrated in FIG. 17C, trailer 200 may be provided with more than one fill pipe 271. FIG. 17C shows two fill pipes 271, 271 that extend rearwardly from the rear end 200b of trailer 200. Each of the two fill pipes 271, 271 extends into first compartment 124 and has a first ends 271a that is located within first compartment 124. Each of the two fill pipes has a second end 271b that may be selectively connected via a hose to a storage bin containing a quantity of bulk material. The difference between the two fill pipes 271, 271 is that the one fill pipe is longer than the other. The difference between the two lengths is related to how much of each fill pipe 271, 271 is located within first compartment 124. FIG. 15 shows one of the fill pipes 271 where the first end 271a thereof is located closer to front end 200a of trailer 200 than to the rear end 200b thereof. It should be understood that the second fill pipe 271 may have its first end 271a located closer to the rear end 200b of trailer 200 than to front end 200a thereof. This difference in the location of the first ends 271a within first compartment 124 helps to ensure a quicker and easier loading of first compartment 124. The longer fill pipe 271 that has a first end 271a closer to the front end 200a of trailer 200 will be connected to the storage bin first to load the front region of first compartment 124. The operator will then move the hose connecting the trailer 200 to the storage bin to the shorter second fill pipe 271 and then load the rear region of the first compartment 124. This method helps to progressively fill first compartment 124 in a way that tends to reduce the likelihood there will be a reduction in vacuum pressure during loading. If vacuum pressure drops below a certain level, then air flow through fill pipe(s) 271 may be insufficient to suck bulk material from the storage bin or to move bulk material through fill pipe(s) 271. It should also be noted that if filter 249 becomes clogged, vacuum pressure may drop to a point that loading through fill pipe 271 slows or ceases. Filter 249 has to be cleaned regularly to ensure sufficient vacuum pressure is available for loading first compartment 124 with bulk material.

When the trailer 200 reaches its destination and it is time to unload the bulk material from trailer 200, both the first compartment 124 and the second compartment are pressurized in a similar manner as to what has been described with respect to trailer 100. Referring to FIG. 16B, valves 253 and 263 are moved to the closed position to enable pressurization of first compartment 124, front chamber 104b, middle chamber 122 and rear chamber 108b.

Referring to FIG. 17A, check valves 239 and 245 are moved to the open position. Top air valve 231 is moved to the open position and valves 237 and 247 are moved to the closed position (as indicated by the "x"). It should be noted that check valve 245 is open when top air valve 231 is open so that air may flow into blowdown pipe 234 but bulk material cannot move in the opposite direction.

A pump is connected to first end 241a of intake pipe 241. Air flows from pump "P" into intake pipe 241 in the direction of arrow "H". From intake pipe 241, air flows through check valve 239, through filter 235, through pipe 243, through cooling assembly 227, and into discharge pipe 228. Air flows through discharge pipe 228 and when the air flow reaches top air pipe 230, some of the air flows into top air pipe 230 and some flows through discharge pipe 228. The air flow into top air pipe 230 is indicated by arrow "I". The air flow "I" splits where top air pipe 230 connects to branch pipe 233 and some air flows through branch pipe 233 and into connector pipe 232. Since valve 237 is closed, the air flows upwardly through connector pipe 232 and into front chamber 104b and subsequently into middle chamber 122 and rear chamber 108b.

Air also flows through branch pipe 233, through check valve 245 and into blowdown pipe 234a. The air flowing into first compartment 124 from blowdown pipe 234 applies pressure onto the dry bulk material carried in first compartment 124 forcing the material downwardly toward the first, second and third hoppers 110, 112, 114.

The valve 248 (FIG. 14) in discharge pipe 228 may initially be placed in a closed position so that air flowing through discharge pipe 228 beyond top air pipe 230 will be diverted into aerator supply pipe 242, through aerator hoses 244 and into the aerator on first, second or third hopper 110, 112, 114 as has been described with respect to trailer 100. When valve 248 is moved to the open position, air will also flow through discharge pipe 246 and as each valve assembly on the associated hopper 110, 112, 114 is opened, bulk material will be flow into discharge pipe 246 and become entrained in the air flowing therethrough and will flow into a hose connected to end 246a of discharge pipe 246. Once all the bulk material has been unloaded from the pressurized first compartment 124, valve 247 is opened so that first compartment 124 and the second compartment will be depressurized and will return to atmospheric pressure.

It has been disclosed herein that the second compartment comprises front chamber 104b of front end housing 104; middle chamber 122 (and 122a) and rear chamber 108b of rear end housing 108 that are all in fluid communication with each other and are all pressurized or placed under vacuum when the first compartment for the load is pressurized or placed under vacuum. However, in other embodiments a divisional wall may be provided between front chamber 104b and middle chamber 122 and/or between rear chamber 108b and middle chamber 122 and only one or two of front chamber 104b, middle chamber 122 (with 122a), or rear chamber 108b may be pressurized or placed under vacuum with the first compartment.

It is further contemplated that in yet other embodiments, additional chambers or compartments may be provided exteriorly of the first compartment and those additional chambers or compartments may be placed under pressure in one embodiment or under vacuum in another embodiment. It is further contemplated that in other examples, the second first compartment may comprise a layer of sheet material that is applied around substantially the entire exterior surface of the wall that defines the first compartment such that a gap is formed between the layer of sheet material and the wall that defines the first compartment. Pressurized air might be pumped into that gap in one embodiment and a vacuum might be applied to that gap in other embodiments. In this instance, the wall surrounding the entire first compartment (except for the manholes and inlets) may have substantially similar or substantially equal pressure or substantially similar or substantially equal vacuum applied to both sides of the wall and the wall will therefore be under substantially constant pressure.

It should be understood that the terms "substantially similar" and "substantially equal" are utilized herein as representing a state where the air pressures in the first and second compartments tend to move as close as physically possible to the same pressure or state of vacuum.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A method of decreasing stress and deformation in a bulk tank comprising:
    forming an exterior wall of the bulk tank into a cylinder;
    providing one or more hoppers; wherein each of the one or more hoppers includes a conical wall having an upper region and a lower region, wherein the upper region is located within an interior cavity defined by the bulk tank's exterior wall; and the lower region extends downwardly and outwardly through a bottom section of the exterior wall;
    locating a discharge region of each of the one or more hoppers a vertical distance below the bottom section of the exterior wall;
    defining a first compartment in the bulk tank, wherein the first compartment is bounded by an upper portion of the exterior wall and the conical wall of each of the one or more hoppers;
    defining a sealed compartment in abutting contact with the first compartment wherein the sealed compartment is located between the upper region of the conical wall of each of the one or more hoppers and the bottom section of the exterior wall; and
    creating substantially equal air pressure in the first compartment and the sealed compartment.

2. The method as defined in claim 1, wherein the providing of the one or more hoppers comprises providing a first hopper and a second hopper; and the method further comprises extending a section of the bottom section of the exterior wall of the cylinder between an exterior surface of the conical wall of the first hopper and an exterior surface of the conical wall of the second hopper.

3. The method as defined in claim 1, wherein the creating of the substantially similar or substantially equal air pressure includes pumping air into each of the first compartment and the sealed compartment.

4. The method as defined in claim 1, wherein the creating of substantially similar or substantially equal air pressure includes vacuuming air from each of the first compartment and the sealed compartment.

5. The method as defined in claim 1, further comprising:
providing the bulk tank as part of a trailer that is movable between a first location and a second location.

6. The method as defined in claim 1, further comprising:
resisting deformation of a wall separating the first compartment from the sealed compartment.

7. The method as defined in claim 1, wherein the step of creating substantially similar or substantially equal air pressure in the first compartment and the sealed compartment is undertaken before loading a load into the first compartment and before unloading a load from the first compartment.

8. The method as defined in claim 1, further comprising:
extending an apex region of each generally conical wall through the bottom section of the exterior wall;
returning the first compartment and the sealed compartment to atmospheric pressure after loading and unloading the first compartment.

9. The method as defined in claim 8, wherein returning the first compartment and sealed compartment to atmospheric pressure includes:
opening a valve; and
allowing air in the sealed compartment to flow out of the sealed compartment through an exhaust pipe and into the atmosphere.

10. The method as defined in claim 1, wherein the providing of the one or more hoppers comprises providing at least a first hopper located in front of a second hopper.

11. The method as defined in claim 10, wherein the defining of the sealed compartment further includes defining a front chamber located forwardly of the first hopper, defining a middle chamber located between the first hopper and the second hopper; and defining a rear chamber located rearwardly of the second hopper.

12. The method as defined in claim 11, further comprising:
reducing deformation in a lower region of the bulk tank that includes the first and second hoppers and the bottom section of the exterior wall by substantially simultaneously equalizing the pressure in the front chamber, middle chamber and rear chamber.

13. A method of decreasing stress and deformation in a bulk tank comprising:
forming an exterior wall of the bulk tank generally into a cylinder;
providing a hopper having a conical wall that is located partially within an interior cavity defined by the exterior wall and which extends partially outwardly through the exterior wall such that an apex of the hopper is located a distance away from the exterior wall;
defining a first compartment including an interior cavity of the cylinder and an interior cavity of the hopper; wherein the interior cavity of the hopper is bounded and defined by the conical wall,
defining a second compartment between a portion of the conical wall of the hopper and an interior surface of the exterior wall;
connecting the first compartment and second compartment to one another with an air piping system; and
creating substantially similar or substantially equal air pressure in the first compartment and the second compartment.

14. The method as defined in claim 13, wherein the creating of the substantially similar or substantially equal air pressure includes pumping air into each of the first compartment and the second compartment.

15. The method as defined in claim 13, wherein the creating of substantially similar or substantially equal air pressure includes vacuuming air from each of the first compartment and the second compartment.

16. The method as defined in claim 13, further comprising:
providing the bulk tank as part of a trailer that is movable between a first location and a second location.

17. The method as defined in claim 13, further comprising:
resisting deformation of the portion of the conical wall separating the first compartment from the second compartment.

18. The method as defined in claim 13, further comprising:
reducing a tendency of the exterior wall and the conical wall of the hopper from moving relative to each other by substantially equalizing air pressure in the first compartment and second compartment.

19. The method as defined in claim 13, further comprising:
reducing a thickness and weight of metal used to fabricate the exterior wall and the conical wall while maintaining the strength of bulk tank to carry a load.

20. The method as defined in claim 13, further comprising:
resisting a tendency of the portion of the conical wall of the hopper between the first compartment and the second compartment to move during loading and unloading by substantially equalizing air pressure in the first compartment and the second compartment.

* * * * *